United States Patent
Masaki et al.

(10) Patent No.: US 6,356,309 B1
(45) Date of Patent: Mar. 12, 2002

(54) VIDEO CODING DEVICE AND VIDEO TRANSMISSION SYSTEM USING THE SAME, QUANTIZATION CONTROL METHOD AND AVERAGE THROUGHPUT CALCULATION METHOD USED THEREIN

(75) Inventors: Shoichi Masaki, Katano; Akio Kurobe, Tondabayashi; Mayumi Shinoda, Hirakata, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 08/686,866

(22) Filed: Aug. 1, 1996

(30) Foreign Application Priority Data

Aug. 2, 1995 (JP) .............................. 7-197734
Oct. 27, 1995 (JP) .............................. 7-280886
May 10, 1996 (JP) .............................. 8-116764

(51) Int. Cl.⁷ ............................. H04N 7/00; H04N 7/14
(52) U.S. Cl. ..................... 348/439; 348/440; 348/466; 382/251; 725/143
(58) Field of Search ........................ 348/439, 440, 348/468, 466, 460, 461, 12, 13, 6; 455/5.1, 6.1; 714/48; 370/229, 231, 233, 234, 235; 382/251, 232, 233; H04N 7/10, 7/14, 11/12, 11/02

(56) References Cited

U.S. PATENT DOCUMENTS

| 5,164,828 A | | 11/1992 | Tahara et al. |
| 5,231,484 A | | 7/1993 | Gonzales et al. |
| 5,486,862 A | * | 1/1996 | Yagasaki ..................... 348/339 |
| 5,689,307 A | | 11/1997 | Sugahara et al. |
| 5,758,076 A | * | 5/1998 | Wu et al. ............... 395/200.13 |
| 5,805,228 A | * | 9/1998 | Proctor et al. ............... 348/422 |

FOREIGN PATENT DOCUMENTS

| EP | 0 647 068 | 4/1995 |
| JP | 3-78383 | 4/1991 |
| JP | 4-323961 | 11/1992 |
| JP | 5-130587 | 5/1993 |
| JP | 5-336513 | 12/1993 |
| JP | 6-030396 | 2/1994 |
| JP | 7-107482 | 4/1995 |
| JP | 7-312753 | 11/1995 |

OTHER PUBLICATIONS

ROC (Taiwan) Patent Application No. 81102117, Amended Specification (Jun. 1993).

(List continued on next page.)

Primary Examiner—Andrew Faile
Assistant Examiner—Vivek Srivastava
(74) Attorney, Agent, or Firm—Wenderoth, Lind & Ponack, L.L.P.

(57) ABSTRACT

Video data coded in a coding device 12 is temporarily stored in a temporary buffer 13 before transmitted to a transmission buffer 171. A frame dropping/quantization control device 16 cancels the video data in the temporary buffer 13 if the amount of information of the video frame stored in the temporary buffer 13 is larger than a predetermined threshold, and further, sets a quantization step size with a quantization step size larger than the quantization step size used to code the video frame stored in the temporary buffer 13 and outputs it to the coding device 12. This suppresses the transmission delay time even when the amount of generated information rapidly increases due to a sudden motion of an object or when the communication conditions change, which allows display of a moving picture with smooth motion

129 Claims, 23 Drawing Sheets

OTHER PUBLICATIONS

Yoichi Kato et al.: "A Coding Control Algorithm for Motion Picture Coding Accomplishing Optimal Assignment of Coding Distortion to Time and Space Domains", Electronics & Communications in Japan, Part I—Communications, vol. 72, No. 9 Part 01, Sep. 1, 1989, pp. 63–73.

ITU Recommendation H.261.

Yasuhiro Takishima et al. "A Study on Control Method for Low Bit Rate Video Coding", The Institute of Electronics, Information and Communication Engineers, Spring National Meeting, D–311, pp. 7–63, 1990.

Hisashi Ibaraki et al. "Improvement Techniques of Picture Coding Quality Deteriorations for Mobil Communications", The Institute of Image Electronics of Japan, vol. 23, No. 5, pp. 445–453, 1994.

* cited by examiner

VIDEO CODING DEVICE AND VIDEO TRANSMISSION SYSTEM USING THE SAME, QUANTIZATION CONTROL METHOD AND AVERAGE THROUGHPUT CALCULATION METHOD USED THEREIN

BACKGROUND OF THE INVENTION

1. Field of the Invention

The present invention relates to a video coding device, and more particularly to a device for coding and transmitting moving pictures.

2. Description of the Background Art (First Conventional Example)

Conventional video compression coding systems for moving picture communication at a low bit rate include ITU Recommendation H.261. FIG. 18 is a block diagram showing the structure of a video coding device for realizing the video coding system recommended in H.261. Structures and operations of parts of this first conventional example will be described below.

In FIG. 18, a video coding device 90 includes a video input portion 11, a coding device 12, a transmission control device 17 and an output device 18. The transmission control device 17 includes a transmission buffer 171 and a transmission control portion 172.

The video input portion 11, composed of a camera etc., performs input of video. The coding device 12 codes the video inputted from the video input portion 11 according to the video coding method recommended in H.261. The transmission buffer 171 stores the video data coded in the coding device 12. The transmission control portion 172 transmits the coded video data stored in the transmission buffer 171 to a video receiving device 1000 at a predetermined transmission rate through the output device 18.

FIG. 19 is a block diagram showing more detailed structure of the coding device 12 in FIG. 18. In FIG. 19, the coding device 12 includes a video input device 100, a coding control portion 101, a SW (switch) 102, a scan conversion portion 103, a differential portion 104, a quantization portion 105, a motion vector detecting portion 106, a motion compensation portion 107, a frame memory 108, a inverse quantization portion 109, an addition portion 10a, a multiplexer 10b and a code output device 10c.

The SW 102 switches whether to code or not a video frame inputted from the video input portion 11 (that is, frame dropping or not). The coding control portion 101 carries out frame dropping control for controlling whether the video frame inputted at the video input portion 11 is to be coded and transmitted, or to be dropped without coded and quantization control for determining the most suitable quantization step size from both the reproducibility of the motion and the video quality. The scan conversion portion 103 scan-converts the moving picture data inputted from the video input device 100 and outputs it as data in block unit composed of a plurality of pixels. The motion vector detecting portion 106 detects the motion vector of the data block outputted from the scan conversion portion 103. The frame memory 108 stores local decoded moving picture data one frame before. The motion compensation portion 107 retrieves a prediction value from the moving picture data in the frame memory 108 on the basis of the motion vector information which is an output of the motion vector detecting portion 106 and outputs the same.

The differential portion 104 calculates the difference between the data block from the scan conversion portion 103 and the prediction value from the motion compensation portion 107 to output a prediction error. The quantization portion 105 quantizes the prediction error from the differential portion 104. The inverse quantization portion 109 inversely quantizes the prediction error quantized in the quantization portion 105. The addition portion 10a adds the prediction error inversely quantized in the inverse quantization portion 109 and the prediction value from the motion compensation portion 107 to calculate decode moving picture data and stores it in the frame memory 108. The multiplexer 10b multiplexes the prediction error quantized in the quantization portion 105 and the motion vector detected in the motion vector detecting portion 106.

Coding operation of the conventional video coding device constructed as described above will now be described. The frame dropping control and the quantization control by the coding control portion 101 will be described later.

The moving picture frame inputted from the video input portion 11 is inputted to the coding,device 12. In the coding device 12, the moving picture signal inputted from the video input device 100 is scan-converted by the scan conversion portion 103 and then inputted to the motion vector detecting portion 106 for each block formed of a plurality of pixels. The motion vector detecting portion 106 compares the local decoded video data one frame before stored in the frame memory 108 and the block inputted from the scan conversion portion 103 to obtain motion vector and outputs it to the motion compensation portion 107 and the multiplexer 10b. The motion compensation portion 107 finds a corresponding prediction value from the video data in the frame memory 108 on the basis of the inputted motion vector information and outputs it to the differential portion 104 and the addition portion 10a.

The differential portion 104 calculates a difference between the block outputted from the scan conversion portion 103 and the prediction value outputted from the motion compensation portion 107 to find a prediction error and outputs it to the quantization portion 105. The quantization portion 105 quantizes this prediction error with a quantization step size determined in the coding control portion 101 and outputs it to the multiplexer 10b and the inverse quantization portion 109. The inverse quantization portion 109 inversely quantizes the prediction error and outputs it to the addition portion 10a. The addition portion 10a adds the inversely quantized prediction error and the prediction value outputted from the motion compensation portion 107 to decode the video data and stores it in the frame memory 108. The quantized prediction error and the motion vector are multiplexed in the multiplexer 10b and stored in the transmission buffer 171 through the code output device 10c. The transmission control portion 172 transmits the coded video data in the transmission buffer 171 at a predetermined transmission rate to the video receiving device 1000 through the output device 18.

Next, the frame dropping control performed in the coding control portion 101 will be described. Conventionally, as the frame dropping control system, the system of determining whether frame dropping is required or not on the basis of comparison between the accumulated amount in the transmission buffer and a determination threshold is proposed. (Refer to Yasuhiro Takishima et al. "A Study on Control Method for Low Bit Rate Video Coding," The Institute of Electronics, Information and Communication Engineers, Spring National Meeting, D-311, pp.7–63, 1990.) The coding control portion 101 performs frame dropping control using the technique disclosed in this paper.

FIG. 20 is a sequence diagram showing operation of the conventional frame dropping control system. Referring to FIG. 20, the coding control portion 101 carries out coding of video frame if the accumulated amount in the transmission buffer 171 is smaller than a certain threshold at the start of coding (that is, it connects the devices 1–2 of the SW 102) and if it is larger than the certain threshold, it does not code that video frame, but drops the frame. (That is to say, it connects the devices 1–3 of the SW 102.) In FIG. 20, at the points (T1, T3) at which coding of the frame 2 and the frame 4 is started, the accumulated amount in the transmission buffer 171 exceeds the threshold, so that the frames 2 and 4 are dropped.

Next, the quantization control made in the coding control portion 101 will be described. Conventionally, the coding control system of determining a quantization step size for a coded frame using a coding rate of already coded video frames is proposed. (Refer to Japanese Patent Laying-Open No.7-107482.) The coding control portion 101 adopts the coding control system disclosed in this reference to achieve quantization control to enhance video quality as far as reproducibility of motion is not deteriorated. The conventional coding control system for determining the quantization step size for a coded object frame using the coding rate will now be described.

FIG. 21 shows an example of coding control in the conventional coding control system. In FIG. 21, lines 101A–101D show coding rate-quantization accuracy characteristics, the line 102 shows the upper limit values of the visually most suitable coding rates, the line 103 shows the lower limit values of the visually most suitable coding rates, 104A shows the first quantization accuracy, 104B shows the second quantization accuracy, 104C shows the third quantization accuracy, the character ● shows the visually most suitable operating points, and the character ○ shows transient operating points. The vertical axis shows the coding rate and the horizontal axis shows the quantization accuracy. On the horizontal axis, the quantization accuracy becomes lower and spacial distortion of the displayed video becomes larger as it gets to the right. On the vertical axis, the coding rate becomes lower and the possibility of frame dropping becomes higher as it gets down. That is to say, the timewise distortion of the displayed video becomes larger.

Here, the coding rate is a value showing the ratio of coding video frames. If all video frames inputted from the video input portion 11 in FIG. 18 are coded, the coding rate is 1.0, and if they are coded once for every two frames (one frame dropping), then the coding rate is 0.5.

Next, the coding rate-quantization accuracy characteristics will be described briefly. In moving picture coding, the space resolution (quantization accuracy) and the time resolution (coding rate) are in the trade-off relation and there are several combinations. The set of the combinations of the space resolution and the time resolution is referred to as coding rate-quantization accuracy characteristics herein. The coding rate-quantization accuracy characteristics vary according to the magnitude timewise of motion of the input video and spacial frequency components. The curve 101 representing the coding rate-quantization accuracy characteristics moves down to the right on the coordinates shown in FIG. 21 if the displayed video includes large motion or fine pattern and it moves up to the left if motion is small.

The upper limit curve 102 is a curve obtained by connecting points representing upper limit values of the most suitable coding rates on the curves 101 and the lower limit curve 103 is a curve obtained by connecting the points representing the lower limit values of the most suitable coding rates on the curves 101. That is to say, in a visually most suitable region assumed on the curves 101, the upper limit curve 102 of the most suitable coding rate is obtained by connecting the points of the largest coding rates and the lower limit curve 103 of the most suitable coding rate is obtained by connecting the points of the smallest coding rates.

When the coding rate resulting from coding with the first quantization accuracy 104A is larger than the upper limit value 102 of the coding rate most suitable in view of visual properties corresponding to the first quantization accuracy, the coding control portion 101 performs next coding with the second quantization accuracy 104B more accurate than the first quantization accuracy. If it is smaller than the lower limit value 103, it performs next coding with the third quantization accuracy 104C less accurate than the first quantization accuracy. When the coding rate resulting from coding with the first quantization accuracy 104A is in the region, it performs next coding with the first quantization accuracy 104A. After that, the coding control portion 101 similarly determines the quantization accuracy for next coding according to the relation in magnitude between a coding rate resulting from coding with a certain quantization accuracy and the region of coding rates most suitable in view of visual properties corresponding to that quantization accuracy.

Next, referring to FIG. 22, conventional coding control in the case in which a rapid motion of an object occurs will be described. In FIG. 22, lines 2231 to 2233 show the coding rate-quantization accuracy characteristics, lines 2211 to 2214 show the range of the visually most suitable coding rates, 2221 to 2225 show the quantization accuracy, the character ● shows visually most suitable operating points, and the characters ○ shows transient operating points. The vertical axis shows the coding rate and the horizontal axis shows the quantization accuracy. On the horizontal axis, the quantization accuracy becomes lower and the spatial distortion of the displayed video becomes larger as it gets to the right. On the vertical axis, the coding rate becomes lower and the possibility of frame dropping becomes higher as it gets down. That is to say, the timewise distortion of the displayed video becomes larger.

For example, if such a small motion of the object that the coding rate-quantization accuracy characteristic moves from 2231 to 2232 occurs when operating at the operating point A, the frame in which the small motion of the object occurs is coded with the quantization accuracy 2221 and the operating point shifts to the operating point B. The coding rate at this time is between the upper limit and the lower limit of coding rate for the quantization accuracy 2221, so that the next video frame is also coded with the quantization accuracy 2221.

If such a rapid movement of the object that the coding rate-quantization accuracy characteristic moves from 2231 to 2233 occurs, the frame in which the rapid movement of the object occurs is coded with the quantization accuracy 2221 and the operating point moves to the operating point C. The coding rate at this time is under the lower limit of the coding rate for the quantization accuracy 2221, so that the next video frame is coded with the quantization accuracy 2222 and the operating point shifts to the operating point D. The coding rate of the video frame coded with the quantization accuracy 2222 is under the lower limit of the coding rate for the quantization accuracy 2222, so that the next video frame is coded with the quantization accuracy 2223 and the operating point moves to the operating point E. Subsequently, the same operation is repeated until the coding rate enters the visually most suitable region (until the quantization accuracy 2225 is achieved.)

The quantization accuracies in FIG. 21 and FIG. 22 correspond to the quantization step size. That is to say, the quantization step size is smaller when the quantization accuracy is good (high) and the quantization step size is larger when the quantization accuracy is bad (low).

(Second Conventional Example)

Structure and operation of a conventional video coding device with video data length and error correcting code mode variable according to the conditions of communication will be described below.

Conventionally, such a low bit rate coding device for television signals is proposed as enlarges the video data length and adds an error correcting code with a low error correcting capability when the communication condition is good, and on the other hand, when the communication condition becomes bad, shortens the video data length and adds an error correcting code with high error correcting capability. (Refer to Japanese Patent Laying-Open No.3-78383.) FIG. 23 is a block diagram showing the structure of the low bit rate coding device for television signals disclosed in this reference. In FIG. 23, the low bit rate coding device 130 includes a low-pass filter 131, a sub-sampling circuit 132, a predictive coding circuit 133, a buffer memory 134, a device control circuit 137, a variable length coding circuit 135 and an error correction coding circuit 136.

Operation of the low bit rate coding device for television signals constructed as shown in FIG. 23 will be described below. The output of the variable length coding circuit 135 is inputted to the error correction coding circuit 136. The error correction coding circuit 136 adds an error correcting code to the variable length coded video data. The error correcting code length is switched by a normal/fall back mode selection signal. That is to say, the error correcting code is shortened in the normal mode (that is, being an error correcting code with low error correcting capability), and lengthened in the fall back mode (that is, being an error correcting code with high error correcting capability). The predictive coding circuit 133 makes coding in the normal mode so that the video data length becomes longer (that is to say, it performs quantization with a quantization step size with a small quantization step size), and it performs coding in the fall back mode so that the video data length becomes shorter (that is to say, it performs quantization with a quantization step size with a large quantization step size). When the communication condition becomes bad, the operation mode is switched from the normal mode to the fall back mode. In the fall back mode, in which the video data is shorter than that in the normal mode, the error correcting code can be made longer. Thus, the error rate can be suppressed low without enlarging the entire code length (video data + error correcting code.)

(Third Conventional Example)

A conventional video coding device which performs hierarchical coding with coded regions divided operates as follows.

That is to say, a priority area and a non-priority area are previously determined in a coded area of video captured from a camera. In the video coding portion, coding of the priority area is made with a quantization accuracy higher than the quantization accuracy for the non-priority area.

(Problems of the First Conventional Example)

The video coding device according to the aforementioned first conventional example has the four problems described below.

[First Problem]

The video coding device according to the first conventional example calculates the coding rate on the basis of the amount of generated information coded one frame before and the transmission rate and determines the quantization step size for the coded object frame using that calculated coding rate. Therefore, if the object suddenly moves, the coding may be performed with an unsuitable coding value which does not match the coded frame. As a result, the amount of generated information rapidly increases and the delay time before displayed on the receiving side increases, then a moving picture with unnatural motion will be displayed on the receiving side. Furthermore, because of the increase in amount of the generated information, heavy frame dropping will occur to reduce the interrelation between frames. This will lead to the vicious circle that the amount of generated information increases also for the video frame coded next.

The relation between the delay time and the frame jump caused by an increase in amount of generated information will be described referring to FIG. 24. FIG. 24 shows the delay time and the frame jump in the conventional video coding device. Before the point P1 at which a sudden movement of the object occurs, the movement of the object is small and thus the prediction error between frames is small. As a result, coding is made with a quantization step size with a small quantization step size, and the delay time does not exceed 440 msec. At the point P1 at which the sudden movement of the object occurs, coding is made with a quantization step size with a small quantization step size in spite of the increase in prediction error between frames, resulting in the delay time of 1275 msec and frame jump of 42 frames. The frame coded after the point P1 has low inter-frame relation because of the jump of 42 frames, so that the prediction error between frames increases, the amount of generated information increases, and thus the delay time increases.

[Second Problem]

In the video coding device according to the first conventional example, the operating point moves in steps when the object suddenly moves, therefore coding is carried out with an unsuitable quantization step size which does not match the coded object frame until the quantization step size matching the coded object frame is selected. As a result, the movement may be unnatural or the quality of the moving picture will be deteriorated until the quantization step size matching the coded object frame is selected.

To solve the first and second problems, such three devices or circuits as shown below have been proposed conventionally.

(1) A video signal coding device which predicts the amount of generated information on the basis of the sum of difference absolute values between frames, or the dynamic range to determine a quantization step size corresponding to the features of the coded object frame. (Refer to Japanese Patent Laying-Open No.5-336513.)

(2) A buffer memory control circuit of a video coding device which determines whether motion is large or small on the basis of the size of motion vector, and if the motion vector is large, performs coding with a quantization step size with a large quantization step size, and if the motion vector is small, it performs coding with a quantization step size with a small quantization step size. (Refer to Japanese Patent Laying-Open No.5-130587.)

(3) A video coding device which includes a plurality of quantization portions and performs quantization with quantization step sizes changed to determine a quantization step size with good vision. (Refer to Japanese Patent Laying-Open No.4-323961.)

However, the above three devices or circuits produce such new problems as follows. That is to say, in the video signal coding device of (1), the prediction often fails, and then the same problem mentioned in the first problem arises. While the buffer memory control circuit of (2) determines the quantization step size on the basis of the size of the motion vector, the amount of generated information does not necessarily increase if the motion vector is large, for the prediction error between frames can be small if the motion vector follows the motion of the object. Accordingly, coding is made with a quantization step size with a large quantization step size even if the amount of generated information is small though the motion vector is large, and then the video quality is deteriorated more than needed. The video coding device of (3) must include a plurality of quantization portions, so that the circuit scale becomes large and the cost increases.

[Third Problem]

In the video coding device of the first conventional example, the coding rate is calculated using the same transmission rate regardless of the communication conditions, so that the coding may be carried out with an unsuitable quantization step size which does not match the communication conditions. A calculation expression for the coding rate in the conventional quantization control follows.

Coding Rate=(LO/S)/RO

Note that in the expression above;

LO: transmission rate (constant),

S: the number of frame samplings per second, and

RO: the amount of generated information of the frame coded before (one frame before.) As can be seen from the expression above, when a transmission error occurs due to deterioration of the communication condition, the video coding device on the transmission side makes retransmission and the transmission throughput changes, then an unsuitable quantization step size not matching the communication condition is determined.

To solve the third problem above, the applicant of the present invention has proposed in Japanese Patent Application No.6-104007 a coding control method for making correction by using, as the transmission rate LO for calculating a coding rate for an n-th frame, an average communication rate from the start of coding the n-th frame to the start of the next coding.

However, according to "Improvement Techniques of Picture Coding Quality Deteriorations for Mobile Communications" (Hisashi IBARAKI, et al., The Institute of Image Electronics Engineers of Japan, vol.23, No.5 (1994), pp.445–453), the Doppler frequency is 5 Hz at the walking rate of a human (3 Km/h) in the frequency band of the so-called PHS (Personal Handy-phone System), and then the number of times of one-digit deterioration of transmission error is 3.5 times/second and the average continuation time is 20 msec. That is to say, to recognize the burst errors occurring in the PHS on average, it is necessary to measure the average in the time width of at least 300 msec. While the number of video frames deteriorates below 30 pieces/second when a moving picture is transmitted at a low bit rate, even if it deteriorates to 5 pieces/second, the time from when the n-th frame is coded until when the next frame is coded is 200 msec. Then correcting the coding rate using the average communication rate therebetween will cause the problem that the burst error is dominant and correction goes to extremes.

Further, in the coding control method, the frame to be coded is determined by the coding rate of the frame previously coded. In this case, while there is no problem when the change of the communication rate is mild, when the communication rate decreases rapidly, the correction of the coding rate cannot overtake and, in reality, the next frame is disadvantageously coded before the data in the transmission buffer decreases, resulting in overflow of the buffer.

Moreover, a retransmission control method by Go-Back-N is assumed here, and the average throughput is calculated by the transmittal confirmation bit number of the frames between when the coding of the n-th frame is started and when the next coding is started.

In the retransmission control method by Go-Back-N, however, after transmission of eight frames, for example, transmittal confirmation or retransmission request is waited on the receiving side, and in the case of retransmission request, all frames after the requested frame are retransmitted and the retransmission is repeated until transmission is confirmed. In the retransmission control method by Go-Back-N, waiting time increases when the delay time of the transmission line is large, resulting in the transmission efficiency is extremely degraded. Therefore, a retransmission control method by Selective Reject is conventionally considered. In the retransmission control method by Selective Reject, the transmission side transmits, for example, up to 32 frames without waiting transmittal confirmation, and the receiving side selectively transmits reject to the frame in which an error is detected. When receiving reject, the transmission side immediately retransmits the frame. The transmittal confirmation is not performed in the retransmission control method by Selective Reject.

[Fourth Problem]

In the quantization control method performed in the coding control portion 101 of the video coding device according to the first conventional example, when motion of the displayed video is too large or the transmission throughput considerably decreases due to a large amount of transmission errors, both the space resolution (quantization accuracy) and the time resolution (coding rate) may exceed the permissible limits to cause visually unpermissible deterioration, though they may be the most suitable in selectable trade-off combinations. The coding rate-quantization accuracy characteristics are determined by the extent of the incompressible non-redundancy of the given video, such as the quantity of movement and fineness of the pattern, and the transmission rate for transmitting the coded data. These factors are something to be given, but not something to select. If selectable quantization accuracies only are considered as parameters, it is the most suitable to operate in the region between the upper limit curve 102 and the lower limit curve 103 under the given conditions. However, the "most suitable" here is merely relatively best under the given conditions, but not absolutely good. Absolutely, both the quantization accuracy and the coding rate increase as they go up to the left in the region between the upper limit curve and the lower limit curve and the quantization accuracy and the coding rate both decrease as they go down to the right.

(Problem of the Second Conventional Example)

The low bit rate coding device for television signals according to the second conventional example determines the normal mode or the fall back mode according to the instantaneous communication condition to control the video data length and the error correcting code length. Accordingly, if the communication condition was good at the time when the normal/fall back mode selection signal was received and then the normal/fall back mode selection signal indicating the normal mode was received, but the communication condition deteriorates at the time of actual transmission, a problem will be encountered. That is to say, in this case, since the normal mode is being selected, coding is made so that the video data length becomes longer and a short (with low error correcting capability) error correcting code is added. However, since the communication condition is bad, and then a transmission error exceeding the error correcting capability will occur to render the decoding on the receiving side impossible.

On the other hand, if the communication condition was bad at the time when the normal/fall back mode selection signal was received and then the normal/fall back mode selection signal indicating the fall back mode was received, but the communication condition becomes good when actually making transmission, such a problem as shown below occurs. That is to say, in this case, since the fall back mode is selected, coding is made so that the video data length becomes shorter and a long (with high error correcting capability) error correcting code is added. Accordingly, the video displayed on the receiving side is deteriorated more than that in the normal mode.

(Problem of the Third Conventional Example)

In the video coding device according to the third conventional example, the priority area and the non-priority area are predetermined and sizes of the areas are constant and unchanged. If movement of the object becomes larger and the amount of generated information increases, or if the communication throughput decreases due to deterioration of conditions of the communication path, then the quantization accuracy must be lowered by coding control to decrease the amount of generated information. At this time, when the amount of generated information extremely increases or the communication throughput decreases with the size of the priority area unchanged, the quantization accuracy not only for the non-priority area but also for the priority area must be largely downed, which will considerably damage the video quality of the priority area.

SUMMARY OF THE INVENTION

Accordingly, an object of the present invention is to provide a video coding device which can suppress a delay time so that a moving picture with smooth movement can be displayed on the receiving side even when the amount of generated information rapidly increases due to sudden movement of an object, for example, or when the transmission throughput varies and a video transmission system using the same.

Another object of the present invention is to provide a video coding device capable of most suitable quantization control and selection of error correcting codes corresponding to the communication conditions and a video transmission system using the same.

Still another object of the present invention is to provide a video coding device which can instantaneously determine with simple calculation a quantization step size most suitable in view of visual properties for a video frame after a rapid increase of the amount of generated information (a frame with large motion of the object) and a video transmission system using the same.

A further object of the present invention is to provide a video coding device and a quantization control method which control allocation of a priority area and a non-priority area and the quantization step size according to the amount of generated information and the coding rate (motion of the object) and determine a quantization step size most suitable in view of visual properties for the priority area so that stable video quality can always be kept.

In order to achieve the objects above, the present invention has characteristics as shown below.

According to a first aspect of the present invention, a video coding device for coding and transmitting a moving picture includes:

a video input portion for forming a video frame from a picture signal and outputting the video frame;

a coding portion for coding the video frame formed in the video input portion;

a transmission buffer for storing video data of the video frame coded in the coding portion;

a transmission control portion for transmitting the video data in the transmission buffer at a certain transmission rate;

a temporary buffer disposed between the coding portion and the transmission buffer for temporarily storing the video data of the video frame coded in the coding portion; and a frame dropping/quantization control portion for determining whether to store into the transmission buffer the video data in the temporary buffer and determining a quantization step size for a video frame coded next;

wherein when the amount of information of the video frame stored in the temporary buffer is larger than a predetermined frame dropping threshold, the frame dropping/quantization control portion performs frame dropping control not to store the video data in the temporary buffer into the transmission buffer and sets a quantization step size with a quantization step size larger than a quantization step size used to code the video frame stored in the temporary buffer and sends the quantization step size to the coding portion, and the coding portion codes the video frame coded next with the quantization step size sent from the frame dropping/quantization control portion.

As stated above, according to the first aspect, when an object suddenly moves, for example, frame dropping is applied to the video frame with a rapid increase in amount of generated information and the next video frame is coded with a larger quantization step size. This suppresses the amount of generated information and reduces the delay time. Accordingly, a moving picture with smooth movement can be displayed on the receiving side.

According to a second aspect, in the first aspect, when a communication error occurs and the video data can not be normally decoded on a receiving device side, the transmission control portion further makes automatic retransmission and sends error information indicating the occurrence of the retransmission to the frame dropping/quantization control portion, and the frame dropping/quantization control portion further performs threshold control of lowering the frame dropping threshold for determining whether to store the video data in the temporary buffer into the transmission buffer from the predetermined value when receiving the notice of error information from the transmission control portion, and returning the frame dropping threshold to the predetermined value when not receiving the notice of error information from the transmission control portion in a predetermined constant period of time.

As state above, according to the second aspect, the frame dropping control is made with a decreased frame dropping threshold until the communication condition settles into a good condition. This allows frame dropping control to be performed with the communication condition taken into account.

According to a third aspect, in the first aspect, the transmission control portion, further, calculates an average throughput in a predetermined constant period of time and sends the average throughput to the frame dropping/quantization control portion, and the frame dropping/quantization control portion, further, calculates a maximum amount of the information transmittable in a maximum permissible delay time on basis of a predetermined maximum permissible delay time and the average throughput calculated in the transmission control portion, and uses the calculated maximum amount of the information as the frame dropping threshold.

As mentioned above, according to the third aspect, the amount of information transmittable in the maximum permissible delay time is calculated from the predetermined maximum permissible delay time and the average throughput and the calculated amount of information is used as a threshold for determining whether the video frame in the temporary buffer is to be dropped or not. This allows frame dropping control corresponding to the communication condition.

According to a fourth aspect, in the third aspect, the frame dropping/quantization control portion, further, calculates an average delay time on the basis of an average amount of the generated information of the video frame transmitted in a constant period of time and the average throughput, and uses the calculated average delay time as the maximum permissible delay time.

As state above, according to the fourth aspect, an average delay time is calculated from the average amount of the generated information of the video frame transmitted in a constant period of time and the average throughput, and the amount of information transmittable in the average delay time is also calculated, and then the calculated amount of the information is used as the threshold for frame dropping control. This allows frame dropping control corresponding to the moving video characteristics and communication conditions.

According to a fifth aspect, a video coding device for coding and transmitting a moving picture includes:

a video input portion for forming a video frame from a picture signal and outputting the video frame;

a coding portion for coding the video frame formed in the video input portion;

a transmission buffer for storing video data coded in the coding portion;

a first quantization control portion for determining a most suitable quantization step size in view of both reproducibility of motion and video quality;

a second quantization control portion for controlling a quantization step size according to communication conditions; and a transmission control portion for transmitting the video data in the transmission buffer at a certain transmission rate, and when a communication error occurs and the video data can not be normally decoded on a receiving device side, making automatic retransmission and sending error information indicating the occurrence of the retransmission to the second quantization control portion;

wherein the second quantization control portion, when receiving the notice of error information from the transmission control portion, sets a quantization step size with a larger quantization step size than a quantization step size corresponding to the quantization step size determined in the first quantization control portion and sends the quantization step size to the coding portion, and when not receiving the notice of the error information from the transmission control portion in a predetermined constant period of time, sends the quantization step size determined in the first quantization control portion unchanged to the coding portion, and the coding portion codes a video frame coded next with the quantization step size sent from the second quantization control portion.

As mentioned above, according to the fifth aspect, coding is performed with an increased quantization step size until the communication condition settles into a good condition, so that the delay time can be reduced even when the communication condition is bad and a moving picture with smooth motion can be displayed on the receiving side. Thus, quantization control can be made without affected by fluctuation of the communication condition.

According to a sixth aspect, in the fifth aspect, the video coding device further includes, a temporary buffer disposed between the coding portion and the transmission buffer for temporarily storing the video data of the video frame coded in the coding portion, and a frame dropping/quantization control portion for determining whether to store the video data in the temporary buffer into the transmission buffer and determining a quantization step size for a video frame coded next, wherein the transmission control portion sends the error information indicating occurrence of the retransmission further to the frame dropping/quantization control portion, and the frame dropping/quantization control portion, performs threshold control of lowering a frame dropping threshold for determining whether to store the video data in the temporary buffer into the transmission buffer from a predetermined value when receiving the notice of error information from the transmission control portion, and returning the frame dropping threshold to the predetermined value when not receiving the notice of error information from the transmission control portion in a predetermined constant period of time, and when the amount of information of the video data in the temporary buffer is larger than the frame dropping threshold controlled in the threshold control, performs frame dropping control of not storing the video data in the temporary buffer into the transmission buffer and also sets a quantization step size with a larger quantization step size than a quantization step size used to code the video frame stored in the temporary buffer and sends the quantization step size to the coding portion.

As stated above, according to the sixth aspect, the frame dropping control is made with a lowered frame dropping threshold until the communication condition settles into a good condition. This allows frame dropping control to be performed with the communication condition taken into account.

According to a seventh aspect, in the sixth aspect, the transmission control portion, further, calculates an average throughput in a predetermined constant period of time and sends the average throughput to the frame dropping/quantization control portion, and the frame dropping/quantization control portion, further, calculates a maximum amount of the information transmittable in a maximum permissible delay time on basis of a predetermined maximum permissible delay time and the average throughput calculated in the transmission control portion, and uses the calculated maximum amount of the information as the frame dropping threshold.

As state above, according to the seventh aspect, the amount of information transmittable in the maximum permissible delay time is calculated from the predetermined maximum permissible delay time and the average throughput and the calculated amount of information is used as a threshold for determining whether the video frame in the temporary buffer is to be dropped or not. This allows frame dropping control corresponding to the communication condition.

According to an eighth aspect, in the seventh aspect, the frame dropping/quantization control portion, further, calculates an average delay time on the basis of an average amount of the generated information of the video frame transmitted in a constant period of time and the average throughput, and uses the calculated average delay time as the maximum permissible delay time.

As mentioned above, according the eighth aspect, an average delay time is calculated from the average amount of generated information of the video frame transmitted in a constant period of time and the average throughput, and the amount of information transmittable in the average delay time is also calculated, and then the calculated amount of the information is used as the threshold for frame dropping control. This allows frame dropping control corresponding to the moving video characteristics and communication condition.

A ninth aspect of the present invention is directed to a video coding device in which operating points is predetermined as a balance between timewise distortion due to frame dropping according to a coding rate, which is a rate of frames transmittable per unit time, and spacial distortion due to a quantization step size when low bit rate compression coding a moving picture and transmitting the coded video data through a communication line with a low bit rate. According to the present invention, the video coding device includes:

a video input portion for forming a video frame from a picture signal and outputting the video frame;

a coding portion for coding the video frame formed in the video input portion;

a transmission buffer for storing the video data coded in the coding portion;

a quantization control portion for determining a quantization step size corresponding to communication conditions; and a transmission control portion for transmitting the video data in the transmission buffer at a certain transmission rate;

wherein the quantization control portion calculates an average throughput in the constant period of time, calculates the coding rate on basis of the calculated average throughput and the amount of generated information per one frame resulting from coding in the coding portion, determines a quantization step size most suitable in view of visual properties corresponding to the calculated coding rate and sends the quantization step size to the coding portion, and sends the coding portion a notice to code one video frame when the remaining amount of data in the transmission buffer falls below a certain threshold.

As mentioned above, according to the ninth aspect, a coding rate is calculated using an average throughput over a constant period of time and a quantization step size for the next frame is determined using that coding rate. This allows quantization control corresponding to the communication condition.

According to a tenth aspect, in the ninth aspect, the video coding device further includes, a temporary buffer disposed between the coding portion and the transmission buffer for temporarily storing the video data of the video frame coded in the coding portion, and a frame dropping/quantization control portion for determining whether to store the video data in the temporary buffer into the transmission buffer and determining a quantization step size for a video frame coded next, wherein the frame dropping/quantization control portion, calculates the amount of information transmittable in a maximum permissible delay time on the basis of a predetermined maximum permissible delay time and the average throughput calculated in the quantization control portion, and performs frame dropping control not to store the video data in the temporary buffer into the transmission buffer if the amount of information of the video frame stored in the temporary buffer is larger than the amount of information transmittable in the maximum permissible delay time and sets a quantization step size with a larger quantization step size than a quantization step size used to code the video frame stored in the temporary buffer and sends the quantization step size to the coding portion.

As mentioned above, according to the tenth aspect, the amount of information transmittable in the maximum permissible delay time is calculated from the predetermined maximum permissible delay time and the average throughput and the calculated amount of information is used as a threshold for determining whether the video frame in the temporary buffer is to be dropped or not. This allows frame dropping control corresponding to the communication condition.

According to an eleventh aspect, in the ninth aspect, the video coding device further includes, a temporary buffer disposed between the coding portion and the transmission buffer for temporarily storing the video data of the video frame coded in the coding portion, and a frame dropping/quantization control portion for determining whether to store the video data in the temporary buffer into the transmission buffer and determining a quantization step size for a video frame coded next, wherein the frame dropping/quantization control portion, calculates an average delay time on the basis of an average amount of the generated information of the video frame transmitted in a constant period of time and the average throughput calculated in the quantization control portion, calculates the amount of information transmittable in the average delay time on the basis of the average throughput and the average delay time, and performs frame dropping control of not storing the video data in the temporary buffer into the transmission buffer if the amount of information of the video frame stored in the temporary buffer is larger than the amount of information transmittable in the average delay time and sets a quantization step size with a larger quantization step size than a quantization step size used to code the video frame stored in the temporary buffer and sends the quantization step size to the coding portion.

As mentioned above, according the eleventh aspect, an average delay time is calculated from the average amount of generated information of the video frame transmitted in a constant period of time and the average throughput, and the amount of information transmittable in the average delay time is also calculated, and then the calculated amount of the information is used as the threshold for frame dropping control. This allows frame dropping control corresponding to the moving video characteristics and the communication condition.

According to a twelfth aspect, in the ninth aspects, when the quantization control portion calculates the average throughput, the time over which the average is calculated is variable according to whether a burst error occurs or not.

As stated above, according to the twelfth aspect, decreasing the time over which the average is obtained allows quantization control and frame dropping control quickly responsive to a change in throughput, and in the condition where burst type errors occur, setting the time over which the average is obtained longer than the cycle of the occurrence of the burst errors allows quantization control and frame dropping control to keep stable even with burst errors.

According to a thirteenth aspect, in the ninth aspect, the predetermined constant period of time for calculating the average throughput is not less than 300 msec.

As mentioned above, according to the thirteenth aspect, the time for obtaining the average of 300 msec or longer permits quantization control and frame dropping control which do not go unstable even with occurrence of the burst error.

According to a fourteenth aspect, a video coding device for coding and transmitting a moving picture includes:
  a video input portion for forming a video frame from a picture signal and outputting the video frame;
  a coding portion for coding the video frame formed in the video input portion;
  a transmission buffer for storing the video data of the video frame coded in the coding portion;
  a quantization control portion for determining a quantization step size used in coding;
  a transmission control portion for transmitting the video data in the transmission buffer at a certain transmission rate;
  a motion threshold storing portion for storing a motion threshold for determining whether motion of an object is large or small; and
  a maximum permissible delay time storing portion for storing a maximum permissible delay time which is a limit of a transmission delay which does not cause visually unnatural impression;
  wherein when the amount of generated information per one frame resulting from coding in the coding portion is larger than the motion threshold, the quantization control portion,
    obtains a quantization ratio which is a ratio of a quantization step size used to code the video frame exceeding the motion threshold and a quantization step size for which the amount of generated information is to be predicted,
    predicts the amount of information generated when the quantization step size is changed from the amount of generated information of the video frame exceeding the motion threshold and the quantization ratio, and
    determines a quantization step size transmittable in the maximum permissible delay time from the predicted amount of generated information, the transmission rate and the maximum permissible delay time and sends the quantization step size to the coding portion, and
  the coding portion codes the video frame with the quantization step size sent from the quantization control portion.

As stated above, according to the fourteenth aspect, since the ratio of the quantization step size is used to predict the amount of generated information utilizing the characteristics that the amount of generated information of the video frame is approximately in inverse proportion to the quantization step size, when the motion of the object is large, the amount of generated information can be predicted with simple calculation and the quantization step size transmittable in the maximum permissible delay time can be determined instantaneously after the large motion of the object.

According to a fifteenth aspect, in the fourteenth aspect, the transmission control portion, further, calculates an average throughput in a predetermined constant period of time and sends the average throughput to the quantization control portion, and
  if the amount of generated information per one frame resulting from coding in the coding portion is larger than the motion threshold, the quantization control portion,
    obtains a quantization ratio which is a ratio of a quantization step size used to code the video frame exceeding the motion threshold and a quantization step size for which the amount of generated information is to be predicted,
    predicts the amount of information generated when the quantization step size is changed from the amount of generated information of the video frame exceeding the motion threshold and the quantization ratio, and
    determines a quantization step size transmittable in the maximum permissible delay time from the predicted amount of the generated information, the transmission rate, the average throughput and the maximum permissible delay time and sends the quantization step size to the coding portion.

As mentioned above, according to the fifteenth aspect, since the average throughput is used to determine the quantization step size in the case in which the motion of the object is large, a quantization step size corresponding to the change in throughput can be determined.

According to a sixteenth aspect, in the fifteenth aspect, when the transmission control portion calculates the average throughput, the time over which the average is obtained is variable according to whether a burst error occurs or not.

As state above, according to the sixteenth aspect, decreasing the time for obtaining the average allows determination of the quantization step size when the motion of the object is large quickly responsive to a change in throughput, and in the condition where burst type errors occur, setting the time for obtaining the average longer than the cycle of the occurrence of the burst errors allows determination of the quantization step size to keep stable even with burst errors.

According to a seventeenth aspect, in the fifteenth aspect, the predetermined constant period of time for calculating the average throughput is not less than 300 msec.

As mentioned above, according to the seventeenth aspect, setting the time for obtaining the average to 300 msec or longer permits determination of the quantization step size when the motion of the object is large to keep stable even at the time of occurrence of the burst error.

According to an eighteenth aspect, a video coding device for coding and transmitting a moving picture includes:
- a video input portion for forming a video frame from a picture signal and outputting the video frame;
- a coding portion for coding the video frame formed in the video input portion;
- a transmission buffer for storing video data of the video frame coded in the coding portion;
- a quantization control portion for determining a quantization step size used in coding;
- a transmission control portion for transmitting the video data in the transmission buffer at a certain transmission rate;
- a motion threshold storing portion for storing a motion threshold for determining whether motion of an object is large or small; and
- an ideal curve storing portion for storing an ideal curve with predetermined operating points most suitable in view of visual properties as a balance between time-wise distortion due to frame dropping according to a coding rate which is a rate of frames transmittable per unit time and spacial distortion due to a quantization step size;
- wherein if the amount of generated information per one frame resulting from coding in the coding portion is larger than the motion threshold, the quantization control portion,
  - obtains a quantization ratio which is a ratio of a quantization step size used to code the video frame exceeding the motion threshold and a quantization step size for which the amount of generated information is to be predicted,
  - predicts the amount of information generated when the quantization step size is changed from the amount of generated information of the video frame exceeding the motion threshold and the quantization ratio,
  - calculates the coding rate from the predicted amount of the generated information and the transmission rate, and
  - determines a quantization step size most suitable in view of the visual properties from the calculated coding rate and the ideal curve and sends the quantization step size to the coding portion, and
- the coding portion codes the video frame with the quantization step size sent from the quantization control portion.

As stated above, according to the eighteenth aspect, like the fourteenth aspect, the amount of generated information can be predicted with simple calculation and a quantization step size most suitable in view of visual properties can be determined from the ideal curve and the predicted amount of the generated information instantaneously after the large motion of the object.

According to a nineteenth aspect, in the eighteenth aspect, the transmission control portion, further, calculates an average throughput in a predetermined constant period of time and sends the average throughput to the quantization control portion, and when the amount of generated information per one frame resulting from coding in the coding portion is larger than the motion threshold, the quantization control portion,

- obtains a quantization ratio which is a ratio of a quantization step size used to code the video frame exceeding the motion threshold and a quantization step size the amount of generated information for which is to be predicted,
- predicts the amount of information generated when the quantization step size is changed from the amount of generated information of the video frame exceeding the motion threshold and the quantization ratio,
- calculates the coding rate from the predicted amount of the generated information, the transmission rate and the average throughput, and
- determines a quantization step size most suitable in view of visual properties from the calculated coding rate and the ideal curve and sends the quantization step size to the coding portion.

As mentioned above, according to the nineteenth aspect, since the average throughput and the ideal curve are used to determine the quantization step size when the motion of the object is large, the visually most suitable quantization step size can be determined taking the change of the throughput into account.

According to a twentieth aspect, in the nineteenth aspect, when the transmission control portion calculates the average throughput, the time over which the average is obtained is variable according to whether a burst error occurs or not.

As state above, according to the twentieth aspect, decreasing the time for obtaining the average allows the determination of the quantization step size when the motion of the object is large to quickly respond to the change in throughput, and in the condition where burst type errors occur, setting the time over which the average is obtained longer than the cycle of the occurrence of the burst errors allows the determination of the quantization step size to keep stable even with burst errors.

According to a twenty-first aspect, in the nineteenth aspect, the predetermined constant period of time for calculating the average throughput is not less than 300 msec.

As mentioned above, according to the twenty-first aspect, the time for obtaining the average of 300 msec or longer permits determination of quantization step size for the case in which the motion of the object is large which do not go unstable even with occurrence of a burst error.

A twenty-second aspect of the present invention is directed to a video transmission system in which a video coding device for coding and transmitting a moving picture and a video receiving device for applying certain processing to received video data are connected so that they can communicate,

- wherein the video receiving device calculates an error rate of the received video data and if the calculated error rate exceeds a certain threshold, transmits an error signal to the video coding device, and
- the video coding device includes,
  - a video input portion for forming a video frame from a picture signal and outputting the video frame,
  - a coding portion for coding the video frame formed in the video input portion,
  - a transmission buffer for storing the video data coded in the coding portion,
  - a transmission control portion for transmitting the video data in the transmission buffer at a certain transmission rate,
  - a first quantization control portion for determining a most suitable quantization step size in view of both reproducibility of motion and video quality, an error correction coding portion for adding error correcting codes with different error correcting capabilities to the video data coded in the coding portion, and a second quantization control portion for determining a quantization step size corresponding to communication conditions and controlling the error correction coding portion according to the error signal, wherein the second quantization control portion,
when receiving the error signal from the video receiving device, sets a quantization step size with a larger quantization step size than a quantization step size corresponding to the quantization step size determined in the first quantization control portion and sends the quantization step size to the coding portion and outputs a selection signal instructing the error correction coding portion to add an error correcting code with a high error correcting capability, and if not receiving the notice of the error signal in a predetermined constant period of time, sends the quantization step size determined in the first quantization control portion unchanged to the coding portion and outputs a selection signal instructing the error correction coding portion to add an error correcting code with a low error correcting capability, the coding portion codes the video frame with the quantization step size sent from the second quantization control portion, and the error correction coding portion adds the error correcting code indicated by the selection signal to the video data coded in the coding portion.

As described above, according to the twenty-second aspect, coding is made with an increased quantization step size until the communication condition settles into a good condition and the coding is made with an error correcting code with a high error correcting capability. This does not cause the disadvantage of coding with a quantization step size having a large quantization step size and an error correcting code with a high error correcting capability in spite of a good communication condition, or conversely, the disadvantage of coding with a quantization step size having a small quantization step size and an error correcting code with a low error correcting capability in spite of a bad communication condition. Accordingly, coding control can be made in correspondence with the communication condition.

According to a twenty-third aspect, in the twenty-second aspect, the video receiving device calculates an average of the error rate calculated in a predetermined constant period of time and if the calculated average error rate exceeds a certain threshold, sends the error signal to the video coding device.

As state above, according to the twenty-third aspect, the video receiving device calculates an average of the error rate, and when the average error rate exceeds the predetermined threshold, it transmits an error signal to the video coding device so that the coding control unaffected by temporary good/bad communication condition can be made in the video coding device.

According to a twenty-fourth aspect, in the twenty second or twenty-third aspect, the video coding device further includes, a temporary buffer disposed between the coding portion and the transmission buffer for temporarily storing the video data of the video frame coded in the coding portion, and a frame dropping/quantization control portion for determining whether to store the video data in the temporary buffer into the transmission buffer and determining a quantization step size for a video frame coded next, wherein the frame dropping/quantization control portion,
performs threshold control of lowering a frame dropping threshold for determining whether to store the video data in the temporary buffer into the transmission buffer from a predetermined value when receiving the error signal from the video receiving device, and when not receiving notice of the error signal in a predetermined constant period of time, returning the frame dropping threshold to the predetermined value, and if the amount of information of the video data in the temporary buffer is larger than the frame dropping threshold controlled in the threshold control, performs frame dropping control not to store the video data in the temporary buffer into the transmission buffer, and also sets a quantization step size with a larger quantization step size than a quantization step size used to code the video frame stored in the temporary buffer and sends the quantization step size to the coding portion.

As stated above, according to the twenty-fourth aspect, since frame dropping control is performed with a decreased frame dropping threshold until the communication condition settles into a good condition, the frame dropping control can be made taking the communication condition into consideration.

A twenty-fifth aspect of the present invention is directed to a video transmission system in which a video coding device for coding and transmitting a moving picture and a video receiving device for applying certain processing to received video data are connected so that they can communicate, wherein the video receiving device calculates an error rate of the received video data and transmits the error rate to the video coding device, and the video coding device includes,
a video input portion for forming a video frame from a picture signal and outputting the video frame,
a coding portion for coding the video frame formed in the video input portion,
a transmission buffer for storing the video data coded in the coding portion,
a transmission control portion for transmitting the video data in the transmission buffer at a certain transmission rate,
a first quantization control portion for determining a most suitable quantization step size in view of both reproducibility of motion and video quality,
an error correction coding portion for adding error correcting codes with different error correcting capabilities to the video data coded in the coding portion, and
a second quantization control portion for determining a quantization step size corresponding to communication conditions and controlling the error correction coding portion according to the error rate, wherein the second quantization control portion,
if the error rate received from the video receiving device exceeds a predetermined threshold, sets a quantization step size with a larger quantization step size than a quantization step size corresponding to the quantization step size determined in the first quantization control portion and sends the quantization step size to the coding portion, and outputs a selection signal instructing the error correction coding portion to add the error correcting code with a high error correcting capability, and if the error rate does not exceed the threshold in a predetermined constant period of time, sends the quantization step size determined in the first quantization control portion unchanged to the coding portion and outputs a selection signal instructing the error correction coding portion to add the error correcting code with a low error correcting capability, the coding portion codes the video frame with the quantization step size sent from the second quantization control portion, and the error correction coding portion adds the error correcting code indicated by the selection signal to the video data coded in the coding portion.

As mentioned above, according to the twenty-fifth aspect, it is determined whether the communication condition is good or bad according to the error rate from the video receiving device and coding is performed with an increased quantization step size until the communication condition settles into a good condition, and the coding is made with an error correcting code with higher error correcting capability, which permits coding control to be done corresponding to the communication condition.

According to a twenty-sixth aspect, in the twenty-fifth aspect, the second quantization control portion, calculates an average of the error rate received from the video receiving device in a predetermined constant period of time, if the calculated average error rate exceeds a predetermined threshold, sets a quantization step size with a larger quantization step size than a quantization step size corresponding to the quantization step size determined in the first quantization control portion and sends the quantization step size to the coding portion and outputs a selection signal instructing the error correction coding portion to add the error correcting code with a high correcting capability, and if the average error rate does not exceed the threshold in a predetermined constant period of time, sends the quantization step size determined in the first quantization control portion unchanged to the coding portion and outputs a selection signal instructing the error correction coding portion to add the error correcting code with a low error correcting capability.

As stated above, according to the twenty-sixth aspect, an average of the error rate from the video receiving device is calculated in the video coding device and it is determined whether the communication condition is good or bad on the basis of the calculated average error rate. The coding is performed with an increased quantization step size until the communication condition settles into good condition, and the coding is made with an error correcting code with higher error correcting capability, which permits coding control to be done corresponding to the communication condition.

According to a twenty-seventh aspect, in the twenty-sixth aspect, the video coding device further includes, a temporary buffer disposed between the coding portion and the transmission buffer for temporarily storing the video data of the video frame coded in the coding portion, and a frame dropping/quantization control portion for determining whether to store the video data in the temporary buffer into the transmission buffer and determining a quantization step size for a video frame coded next, wherein the frame dropping/quantization control portion, performs threshold control of lowering a frame dropping threshold for determining whether to store the video data in the temporary buffer into the transmission buffer from a predetermined value when the average error rate calculated in the second quantization control portion exceeds a predetermined threshold, and returning the frame dropping threshold to the predetermined value when the average error rate does not exceed the threshold in a predetermined constant period of time, and performs frame dropping control of not storing the video data in the temporary buffer into the transmission buffer if the amount of information of the video data in the temporary buffer is larger than the frame dropping threshold controlled in the threshold control and also sets a quantization step size with a larger quantization step size than a quantization step size used to code the video frame stored in the temporary buffer and sends the quantization step size to the coding portion.

As mentioned above, according to the twenty-seventh aspect, an average of the error rate from the video receiving device is calculated and it is determined whether the communication condition is good or bad on the basis of the calculated average error rate. Then coding control is performed with a decreased frame dropping threshold until the communication condition settles into good condition, which permits coding control to be done with the communication condition taken into account.

According to a twenty-eighth aspect, in the twenty-fifth aspect, the video coding device further includes, a temporary buffer disposed between the coding portion and the transmission buffer for temporarily storing the video data of the video frame coded in the coding portion, and a frame dropping/quantization control portion for determining whether to store the video data in the temporary buffer into the transmission buffer and determining a quantization step size for a video frame coded next, wherein the frame dropping/quantization control portion, performs threshold control of lowering a frame dropping threshold for determining whether to store the video data in the temporary buffer into the transmission buffer from a predetermined value when the error rate received from the video receiving device exceeds a predetermined threshold, and returning the frame dropping threshold to the predetermined value when the error rate does not exceed the threshold in a predetermined constant period of time, and performs frame dropping control not to store the video data in the temporary buffer into the transmission buffer if the amount of information of the video data in the temporary buffer is larger than the frame dropping threshold controlled in the threshold control and also sets a quantization step size with a larger quantization step size than a quantization step size used to code the video frame stored in the temporary buffer and sends the quantization step size to the coding portion.

As mentioned above, according to the twenty-eighth aspect, the condition of the communication is determined in the video coding device on the basis of the error rate from the video receiving device, and frame dropping control is performed with a decreased frame dropping threshold until the communication condition settles into a good condition, which permits coding control taking the communication condition into consideration.

A twenty-ninth aspect of the present invention relates to a video transmission system in which a video coding device for coding and transmitting a moving picture and a video receiving device for applying certain processing to received video data are connected so that they can communicate, wherein the video coding device obtains an error rate of the received video data, calculates an average of the error rate obtained in a predetermined constant period of time, and transmits the calculated average error rate to the video coding device, the video coding device includes, a video input portion for forming a video frame from a picture signal and outputting the video frame, a coding portion for coding the video frame formed in the video input portion, a transmission buffer for storing the video data coded in the coding portion, a transmission control portion for transmitting the video data in the transmission buffer at a certain transmission rate, a first quantization control portion for determining a most suitable quantization step size in view of both reproducibility of motion and video quality, an error correction coding portion for adding error correcting codes with different error correcting capabilities to the video data coded in the coding portion, and a second quantization control portion for determining a quantization step size corresponding to communication conditions and controlling the error correction coding portion according to the average error rate, wherein the second quantization control portion, when the average error rate received from the video receiving device exceeds a predetermined threshold, sets a quantization step size with a larger quantization step size than a quantization step size corresponding to the quantization step size determined in the first quantization control portion and sends the quantization step size to the coding portion and outputs a selection signal instructing the error correction coding portion to add the error correcting code with a high error correcting capability, and when the average error rate does not exceed the threshold in a predetermined constant period of time, sends the quantization step size determined in the first quantization control portion unchanged to the coding portion and outputs a selection signal instructing the error correction coding portion to add the error correcting code with a low error correcting capability, the coding portion codes the video frame with the quantization step size sent from the second quantization control portion, and the error correction coding portion adds the error correcting code indicated by the selection signal to the video data coded in the coding portion.

As state above, according to the twenty-ninth aspect, good/bad of the communication condition is determined on the basis of the average error rate from the video receiving device, and coding is performed with an increased quantization step size until the communication condition settles into good condition, and the coding is performed with an error correcting code with high error correcting capability, which permits coding control unaffected by temporary communication condition.

According to a thirtieth aspect, in the twenty-ninth aspect, the video coding device further includes, a temporary buffer disposed between the coding portion and the transmission buffer for temporarily storing the video data of the video frame coded in the coding portion, and a frame dropping/quantization control portion for determining whether to store the video data in the temporary buffer into the transmission buffer and determining a quantization step size for a video frame coded next, wherein the frame dropping/quantization control portion, performs threshold control of lowering a frame dropping threshold for determining whether to store the video data in the temporary buffer into the transmission buffer from a predetermined value when the average error rate received from the video receiving device exceeds a predetermined threshold, and returning the frame dropping threshold to the predetermined value when the average error rate does not exceed the threshold in a predetermined constant period of time, and performs frame dropping control of not storing the video data in the temporary buffer into the transmission buffer if the amount of information of the video data in the temporary buffer is larger than the frame dropping threshold controlled in the threshold control and also sets a quantization step size with a larger quantization step size than a quantization step size used to code the video frame stored in the temporary buffer and sends the quantization step size to the coding portion.

As mentioned above, according to the thirtieth aspect, the video coding device determines whether the communication condition is good or deteriorated on the basis of the average error rate from the video receiving device, and performs frame dropping control with a decreased frame dropping threshold until the communication condition settles into a good condition, which permits frame dropping control unaffected by temporary communication condition.

A thirty-first aspect of the present invention is intended for a video transmission system in which a video coding device for coding and transmitting a moving picture and a video receiving device for applying certain processing to received video data are communicatably connected, wherein the video receiving device calculates an error rate of the received video data and transmits an error signal to the video coding device if the calculated error rate exceeds a certain threshold, and the video coding device includes, a video input portion for forming a video frame from a picture signal and outputting the video frame, a coding portion for coding the video frame formed in the video input portion, a transmission buffer for storing the video data coded in the coding portion, a transmission control portion for transmitting the video data in the transmission buffer at a certain transmission rate, a temporary buffer disposed between the coding portion and the transmission buffer for temporarily storing the video data of the video frame coded in the coding portion, a frame dropping/quantization control portion for determining whether to store into the transmission buffer the video data in the temporary buffer and determining a quantization step size for a video frame coded next, and an error correction coding portion for adding error correcting codes with different error correcting capabilities to the video data in the temporary buffer and storing the data in the transmission buffer, wherein the frame dropping/quantization control portion, performs threshold control of lowering a frame dropping threshold for determining whether to store the video data in the temporary buffer into the transmission buffer from a predetermined value when receiving the error signal, and outputs a selection signal instructing the error correction coding portion to add an error correcting code with a high error correcting capability, performs threshold control of returning the frame dropping threshold to the predetermined value if not receiving notice of the error signal in a predetermined constant period of time, and outputs a selection signal instructing the error correction coding portion to add an error correcting code with a low error correcting capability, and performs frame dropping control not to store into the transmission buffer the video data in the temporary buffer if the amount of information of the video data in the temporary buffer is larger than the frame dropping threshold controlled in the threshold control and also sets a quantization step size with a larger quantization step size than a quantization step size used to code the video frame stored in the temporary buffer and sends the quantization step size to the coding portion, and the error correction coding portion adds the error correcting code indicated by the selection signal to the video data coded in the coding portion.

As state above, according to the thirty-first aspect, since frame dropping control is performed with a decreased frame dropping threshold until the communication condition settles into a good condition, the frame dropping control can be made taking the communication condition into consideration.

According to a thirty-second aspect, in the thirty-first aspect, the video receiving device calculates an average of the error rate calculated in a predetermined constant period of time and if the calculated average error rate exceeds a certain threshold, sends the error signal to the video coding device.

As mentioned above, according to the thirty-second aspect, the video receiving device calculates an average of the error rate and if the average error rate exceeds a predetermined threshold, it sends an error signal to the video coding device so that the video coding device can perform frame dropping control unaffected by temporary good/bad communication condition.

A thirty-third aspect relates to a video transmission system in which a video coding device for coding and transmitting a moving picture and a video receiving device for applying certain processing to received video data are communicatably connected, wherein the video receiving device calculates an error rate of the received video data and transmits the error rate to the video coding device, and the video coding device includes, a video input portion for forming a video frame from a picture signal and outputting the video frame, a coding portion for coding the video frame formed in the video input portion, a transmission buffer for storing the video data coded in the coding portion, a transmission control portion for transmitting the video data in the transmission buffer at a certain transmission rate, a temporary buffer disposed between the coding portion and the transmission buffer for temporarily storing the video data of the video frame coded in the coding portion, a frame dropping/quantization control portion for determining whether to store the video data in the temporary buffer into the transmission buffer and determining a quantization step size for a video frame coded next, and an error correction coding portion for adding error correcting codes with different error correcting capabilities to the video data in the temporary buffer and storing the data in the transmission buffer, wherein the frame dropping/quantization control portion, performs threshold control of lowering a frame dropping threshold for determining whether to store into the transmission buffer the video data in the temporary buffer from a predetermined value when the error rate exceeds a predetermined threshold, and outputs a selection signal instructing the error correction coding portion to add the error correcting code with a high error correcting capability, performs threshold control of returning the frame dropping threshold to the predetermined value when the error rate does not exceed the predetermined threshold in a predetermined constant period of time, and outputs a selection signal instructing the error correction coding portion to add the error correcting code with a low error correcting capability, and performs frame dropping control of not storing the video data in the temporary buffer into the transmission buffer if the amount of information of the video data in the temporary buffer is larger than the frame dropping threshold controlled in the threshold control and also sets a quantization step size with a larger quantization step size than a quantization step size used to code the video frame stored in the temporary buffer and sends the quantization step size to the coding portion, and the error correction coding portion adds the error correcting code indicated by the selection signal to the video data coded in the coding portion.

As state above, according to the thirty-third aspect, the video coding device determines whether the communication condition is good/deteriorated on the basis of the error rate from the video receiving device, and frame dropping control is performed with a decreased frame dropping threshold until the communication condition settles into good condition, which permits frame dropping control taking the communication condition into account.

According to a thirty-fourth aspect, in the thirty-third aspect, the video coding device further includes an average error rate calculating portion for calculating an average error rate which is an average of the error rate received from the video receiving device in a predetermined constant period of time, wherein the frame dropping/quantization control portion,
performs threshold control of lowering a frame dropping threshold for determining whether to store the video data in the temporary buffer into the transmission buffer from a predetermined value when the average error rate exceeds a predetermined threshold, and outputs a selection signal instructing the error correction coding portion to add an error correcting code with a high error correcting capability, performs threshold control of returning the frame dropping threshold to the predetermined value if the average error rate does not exceed the predetermined threshold in a predetermined constant period of time, and outputs a selection signal instructing the error correction coding portion to add an error correcting code with a low error correcting capability, and performs frame dropping control of not storing the video data in the temporary buffer into the transmission buffer if the amount of information of the video data in the temporary buffer is larger than the frame dropping threshold controlled in the threshold control and also sets a quantization step size with a larger quantization step size than a quantization step size used to code the video frame stored in the temporary buffer and sends the quantization step size to the coding portion, and the error correction coding portion adds the error correcting code indicated by the selection signal to the video data coded in the coding portion.

As stated above, according to the thirty-fourth aspect, an average of the error rate from the video receiving device is calculated and good/bad of the communication condition is determined on the basis of the calculated average error rate. Then frame dropping control is performed with a decreased frame dropping threshold until the communication condition settles into a good condition, which permits frame dropping control to be done taking the communication condition into consideration.

A thirty-fifth aspect is directed to a video transmission system in which a video coding device for coding and transmitting a moving picture and a video receiving device for applying certain processing to received video data are communicably connected, wherein the video receiving device obtains an error rate of the received video data, calculates an average of the error rate obtained in a predetermined constant period of time and transmits the calculated average error rate to the video coding device, and the video coding device includes,
a video input portion for forming a video frame from a picture signal and outputting the video frame,
a coding portion for coding the video frame formed in the video input portion,
a transmission buffer for storing the video data coded in the coding portion,
a transmission control portion for transmitting the video data in the transmission buffer at a certain transmission rate,
a temporary buffer disposed between the coding portion and the transmission buffer for temporarily storing the video data of the video frame coded in the coding portion,
a frame dropping/quantization control portion for determining whether to store the video data in the temporary buffer into the transmission buffer and determining a quantization step size for a video frame coded next, and an error correction coding portion for adding error correcting codes with different error correcting capabilities to the video data in the temporary buffer and storing the data in the transmission buffer, wherein the frame dropping/quantization control portion,
when the average error rate exceeds a predetermined threshold, performs threshold control of lowering a frame dropping threshold for determining whether to store the video data in the temporary buffer into the transmission buffer from a predetermined value, and outputs a selection signal instructing the error correction coding portion to add an error correcting code with a high error correcting capability, when the average error rate does not exceed the predetermined threshold in a predetermined constant period of time, performs threshold control of returning the frame dropping threshold to the predetermined value, and outputs a selection signal instructing the error correction coding portion to add an error correcting code with a low error correcting capability, and when the amount of information of the video data in the temporary buffer is larger than the frame dropping threshold controlled in the threshold control, performs frame dropping control of not storing the video data in the temporary buffer into the transmission buffer, and also sets a quantization step size with a larger quantization step size than a quantization step size used to code the video frame stored in the temporary buffer and sends the quantization step size to the coding portion, and the error correction coding portion adds the error correcting code indicated by the selection signal to the video data coded in the coding portion.

As described above, according to the thirty-fifth aspect, the video coding device determines whether the communication condition is good or bad on the basis of the average error rate from the video receiving device, and frame dropping control is performed with a decreased frame dropping threshold until the communication condition settles into a good condition, which permits frame dropping control unaffected by temporary communication condition.

A thirty-sixth aspect is intended for a video transmission system in which a video coding device for coding and transmitting a moving picture and a video receiving device for applying certain processing to received video data are connected such that they can communicate, wherein the video receiving device counts the number of bits of data correctly received in a predetermined constant period of time and transmits the counted number of bits to the video coding device, and the video coding device includes,
a video input portion for forming a video frame from a picture signal and outputting the video frame,
a coding portion for coding the video frame formed in the video input portion,
a transmission buffer for storing the video data coded in the coding portion,
a quantization control portion for determining a quantization step size corresponding to communication conditions, and
a transmission control portion for transmitting the video data in the transmission buffer at a certain transmission rate and outputting the bit number received from the video receiving device to the quantization control portion, wherein the quantization control portion,
  calculates an average throughput in a constant period of time on the basis of the bit number received from the transmission control portion,
  calculates a coding rate on the basis of the calculated average throughput and the amount of generated information per one frame resulting from coding in the coding portion, and
  determines a quantization step size most suitable in view of visual properties corresponding to the calculated coding rate and sends the quantization step size to the coding portion.

As state above, according to the thirty-sixth aspect, as the video coding device side can know the number of bits correctly transmitted to the video receiving device in a constant period of time, quantization control most suitable for the throughput between the two devices can be made even with a plurality of transmission lines with different throughputs on the communication line between the two devices.

According to a thirty-seventh aspect, in the thirty-sixth aspect, when the quantization control portion calculates the average throughput, the time over which the average is obtained is variable according to the variation of the bit number received from the transmission control means.

As stated above, according to the thirty-seventh aspect, if the time for obtaining the average is shortened, the quantization control can quickly respond to a change in throughput. In the condition where burst type errors occur, if the time for obtaining the average is set longer than the cycle of the occurrence of the burst errors, the quantization control can keep stable even with the burst errors.

According to a thirty-eighth aspect, in the thirty-sixth aspect, the predetermined constant period of time for calculating the average throughput is not less than 300 msec.

As mentioned above, according to the thirty-eighth aspect, setting the time for obtaining the average to 300 msec or longer permits quantization control which do not go unstable even with occurrence of a burst error.

A thirty-ninth aspect is directed to a video transmission system in which a video coding device for coding and transmitting a moving picture and a video receiving device for applying certain processing to received video data are connected so that they can communicate,
  wherein the video receiving device counts the number of bits of data correctly received in a predetermined constant period of time, calculates an average throughput from the counted bit number and transmits the average throughput to the video coding device, and
  the video coding device includes,
    a video input portion for forming a video frame from a picture signal and outputting the video frame,
    a coding portion for coding the video frame formed in the video input portion,
    a transmission buffer for storing the video data coded in the coding portion,
    a quantization control portion for determining a quantization step size corresponding to communication conditions, and
    a transmission control portion for transmitting the video data in the transmission buffer at a certain transmission rate and outputting the average throughput received from the video receiving device to the quantization control portion,
  wherein the quantization control portion,
    calculates a coding rate on the basis of the average throughput received from the transmission control portion and the amount of generated information per one frame resulting from coding in the coding portion, and
    determines a quantization step size most suitable in view of visual properties corresponding to the calculated coding rate and sends the quantization step size to the coding portion.

As stated above, according to the thirty-ninth aspect, the video receiving device calculates the average throughput from the number of bits correctly received in a constant period of time and transmits it to the video coding device. Therefore, even with a plurality of transmission lines having different throughputs on the communication line between the two devices, the quantization control most suitable for the throughput between the two devices can be made.

A fortieth aspect is directed to a video transmission system in which a video coding device coding and transmitting a moving picture and a video receiving device applying certain processing to received video data are communicatably connected through one or more relay stations,
  wherein when detecting an error of the received data, the video receiving device makes automatic retransmission between adjacent one of the relay stations and itself and transmits retransmission occurrence information indicating the occurrence of the retransmission to the video coding device, and
  the video coding device includes,
    a video input portion for forming a video frame from a picture signal and outputting the video frame,
    a coding portion for coding the video frame formed in the video input portion,
    a transmission buffer for storing the video data coded in the coding portion,
    a first quantization control portion for determining a quantization step size most suitable in view of both reproducibility of motion and video quality,
    a second quantization control portion for controlling a quantization step size according to communication conditions, and
    a transmission control portion for transmitting the video data in the transmission buffer at a certain transmission rate, and when a communication error occurs between adjacent one of the relay stations and the video coding device, making automatic retransmission between the adjacent relay station and the video coding device, and when the transmission control portion itself makes retransmission, or when it receives the retransmission occurrence information from the video receiving device, sending error information indicating the occurrence of the retransmission to the second quantization control portion,
  wherein the second quantization control portion,
    when receiving the notice of the error information from the transmission control portion, sets a quantization step size with a larger quantization step size than a quantization step size corresponding to the quantization step size determined in the first quantization control portion and sends the quantization step size to the coding portion, and
    when not receiving the notice of the error information from the transmission control portion over a predetermined constant period of time, sends the quantization step size determined in the first quantization control portion unchanged to the coding portion, and
  the coding portion codes a video frame coded next with the quantization step size sent from the second quantization control portion.

As stated above, according to the fortieth aspect, when there are a plurality of transmission lines between two devices and the video coding device and the video receiving device do not directly make retransmission control with each other but they make retransmission control with adjacent ones of relay stations, the delay time can be reduced so that a moving picture with smooth movement can be displayed on the receiving side even if retransmission is made on either side and the communication condition deteriorates.

According to a forty-first aspect, in the fortieth aspect, the video coding device further includes, a temporary buffer disposed between the coding portion and the transmission buffer for temporarily storing the video data of the video frame coded in the coding portion, and a frame dropping/quantization control portion for determining whether to store into the transmission buffer the video data in the temporary buffer and determining a quantization step size for a video frame coded next, wherein the transmission control portion sends the error information indicating the occurrence of the retransmission further to the frame dropping/quantization control portion, and the frame dropping/quantization control portion, performs threshold control of lowering a frame dropping threshold for determining whether to store the video data in the temporary buffer into the transmission buffer from a predetermined value when receiving notice of the error information from the transmission control portion, and when not receiving the notice of the error information from the transmission control portion in a predetermined constant period of time, returning the frame dropping threshold to the predetermined value, and performs frame dropping control of not storing the video data in the temporary buffer into the transmission buffer if the amount of information of the video data in the temporary buffer is larger than the frame dropping threshold controlled in the threshold control and also sets a quantization step size with a larger quantization step size than a quantization step size used to code the video frame stored in the temporary buffer and sends the quantization step size to the coding portion.

As explained above, according to the forty-first aspect, since frame dropping control is made with a decreased frame dropping threshold until the communication condition settles into a good condition, frame dropping control can be made taking the communication condition into account.

A forty-second aspect of the present invention is directed to a video transmission system in which a video coding device for coding and transmitting a moving picture and a video receiving device for applying certain processing to received video data are connected such that they can make communication, wherein the video receiving device counts the number of bits of data correctly received in a predetermined constant period of time and transmits the counted number of bits to the video coding device, and the video coding device includes, a video input portion for forming a video frame from a picture signal and outputting the video frame, a coding portion for coding the video frame formed in the video input portion, a transmission buffer for storing the video data of the video frame coded in the coding portion, a temporary buffer disposed between the coding portion and the transmission buffer for temporarily storing the video data of the video frame coded in the coding portion, a frame dropping/quantization control portion for determining whether to store the video data in the temporary buffer into the transmission buffer and determining a quantization step size for a video frame coded next, and a transmission control portion for transmitting the video data in the transmission buffer at a certain transmission rate and calculating an average throughput from the bit number received from the video receiving device, wherein the frame dropping/quantization control portion, calculates the amount of information transmittable in a maximum permissible delay time on the basis of a predetermined maximum permissible delay time and the average throughput, and performs frame dropping control of not storing into the transmission buffer the video data in the temporary buffer if the amount of information of the video frame stored in the temporary buffer is larger than the amount of information transmittable in the maximum permissible delay time and also sets a quantization step size with a larger quantization step size than a quantization step size used to code the video frame stored in the temporary buffer and sends the quantization step size to the coding portion.

As mentioned above, according to the forty-second aspect, as the video coding device side can know the number of bits correctly transmitted to the video receiving device in a constant period of time, most suitable frame dropping control taking the throughput between the two devices into account can be made even when a plurality of transmission lines with different throughputs exist on the communication line between the two devices.

According to a forty-third aspect, in the forty-second aspect, the frame dropping/quantization control portion, further, calculates an average delay time on the basis of an average amount of the generated information of the video frame transmitted in a constant period of time and the average throughput, and uses the calculated average delay time as the maximum permissible delay time.

As mentioned above, according to the forty-third aspect, an average delay time is calculated from the average amount of the generated information of the video frame transmitted in a constant period of time and the average throughput, and the amount of information transmittable in the average delay time is also calculated, and then the calculated amount of the information is used as the threshold for frame dropping control. This allows frame dropping control corresponding to the moving video characteristics and the communication condition.

According to a forty-fourth aspect, in the forty-second aspect, when the transmission control portion calculates the average throughput, the time over which average is obtained is variable according to variation of the transmission confirmed number of bits.

As stated above, according to the forty-fourth aspect, decreasing the time for obtaining the average allows frame dropping control quickly responsive to a change in throughput, and in the condition where burst type errors occur, setting the time for obtaining the average longer than the cycle of the occurrence of the burst errors allows frame dropping control to keep stable even with burst errors.

According to a forty-fifth aspect, in the forty-second aspect, the predetermined constant period of time for calculating the average throughput is not less than 300 msec.

As mentioned above, according to the forty-fifth aspect, the time for obtaining the average of 300 msec or longer allows frame dropping control which does not go unstable even with a burst error.

A forty-sixth aspect is directed to a video transmission system in which a video coding device for coding and transmitting a moving picture and a video receiving device for applying certain processing to received video data are connected so that they can communicate, wherein the video receiving device counts the number of bits of data correctly received in a predetermined constant period of time, calculates an average throughput from the counted bit number and transmits the average throughput to the video coding device, and the video coding device includes,
a video input portion for forming a video frame from a picture signal and outputting the video frame,
a coding portion for coding the video frame formed in the video input portion,
a transmission buffer for storing the video data of the video frame coded in the coding portion,
a temporary buffer disposed between the coding portion and the transmission buffer for temporarily storing the video data of the video frame coded in the coding portion,
a frame dropping/quantization control portion for determining whether to store into the transmission buffer the video data in the temporary buffer and determining a quantization step size of a video frame coded next, and
a transmission control portion for transmitting the video data in the transmission buffer at a certain transmission rate and outputting the average throughput received from the video receiving device to the frame dropping/quantization control portion,
wherein the frame dropping/quantization control portion,
calculates an amount of the information transmittable in a maximum permissible delay time on the basis of a predetermined maximum permissible delay time and the average throughput, and
performs frame dropping control not to store the video data in the temporary buffer into the transmission buffer if the amount of information of the video frame stored in the temporary buffer is larger than the amount of information transmittable in the maximum permissible delay time and also sets a quantization step size with a larger quantization step size than a quantization step size used to code the video frame stored in the temporary buffer and sends the quantization step size to the coding portion.

As stated above, according to the forty-sixth aspect, the video receiving device calculates the average throughput from the number of bits correctly transmitted in a constant period of time and transmits it to the video coding device. Therefore, even when a plurality of transmission lines having different throughputs exist on the communication line between the two devices, the most suitable frame dropping control can be made considering the throughput between the two devices.

A forty-seventh aspect relates to a video transmission system in which a video coding device coding and transmitting a moving picture and a video receiving device applying certain processing to received video data are communicatably connected, wherein the video receiving device counts the number of bits of data correctly received in a predetermined constant period of time and transmits the counted bit number to the video coding device, and the video coding device includes,
a video input portion for forming a video frame from a picture signal and outputting the video frame,
a coding portion for coding the video frame formed in the video input portion,
a transmission buffer for storing the video data of the video frame coded in the coding portion,
a quantization control portion for determining a quantization step size used in coding,
a transmission control portion for transmitting the video data in the transmission buffer at a certain transmission rate and calculating an average throughput from the number of bits transmission confirmed in the predetermined constant period of time and outputting the average throughput to the quantization control portion,
a motion threshold storing portion for storing a motion threshold for determining whether motion of an object is large or small, and
a maximum permissible delay time storing portion for storing a maximum permissible delay time which is a limit of a transmission delay which does not cause visually unnatural impression,
wherein if the amount of generated information per one frame resulting from coding in the coding portion is larger than the motion threshold, the quantization control portion,
obtains a quantization ratio which is a ratio of a quantization step size used to code the video frame exceeding the motion threshold and a quantization step size for which the amount of generated information is to be predicted,
predicts the amount of information generated when the quantization step size is changed from the amount of generated information of the video frame exceeding the motion threshold and the quantization ratio, and
determines a quantization step size transmittable in the maximum permissible delay time from the predicted amount of the generated information, the average throughput, the transmission rate and the maximum permissible delay time and sends the quantization step size to the coding portion, and
the coding portion codes the video frame with the quantization step size sent from the quantization control portion.

As stated above, according to the forty-seventh aspect, the video coding device determines a quantization step size transmittable in the maximum permissible delay time from the predicted amount of the generated information of the video frame with large motion of the object and the average throughput based on the bit number received from the video receiving device. Hence, even if there are a plurality of transmission lines with different throughputs on the communication line between two devices, quantization control most suitable for the throughputs between the two devices can be applied.

According to a forty-eighth aspect, in the forty-seventh aspect, when the transmission control portion calculates the average throughput, the time for averaging is variable according to variation of the number of bits whose transmission are confirmed.

As stated above, according to the forty-eighth aspect, decreasing the time over which the average is obtained allows quantization control quickly responsive to a change in throughput, and in the condition where burst type errors occur, setting the time over which the average is obtained longer than the cycle of the occurrence of the burst errors allows quantization control to keep stable even with burst errors.

According to a forty-ninth aspect, in the forty-seventh aspect, the predetermined constant period of time for calculating the average throughput is not less than 300 msec.

As mentioned above, according to the forty-ninth aspect, the time for obtaining the average of 300 msec or longer permits quantization control which do not go unstable even when a burst error occurs.

A fiftieth aspect is intended for a video transmission system in which a video coding device coding and transmitting a moving picture and a video receiving device applying certain processing to received video data are connected such that they can communicate, wherein the video receiving device counts the number of bits of data correctly received in a predetermined constant period of time, calculates an average throughput from the counted bit number and transmits the average throughput to the video coding device, and the video coding device includes,
  a video input portion for forming a video frame from a picture signal and outputting the video frame,
  a coding portion for coding the video frame formed in the video input portion,
  a transmission buffer for storing video data of the video frame coded in the coding portion,
  a quantization control portion for determining a quantization step size used in coding,
  a transmission control portion for transmitting the video data in the transmission buffer at a certain transmission rate and outputting the average throughput received from the video receiving device to the quantization control portion,
  a motion threshold storing portion for storing a motion threshold for determining whether motion of an object is large or small, and
  a maximum permissible delay time storing portion for storing a maximum permissible delay time which is a limit of a transmission delay which does not cause visually unnatural impression,
  wherein when the amount of generated information per one frame resulting from coding in the coding portion is larger than the motion threshold, the quantization control portion,
    obtains a quantization ratio which is a ratio of a quantization step size used to code the video frame exceeding the motion threshold and a quantization step size the amount of generated information for which is to be predicted,
    predicts the amount of information generated when the quantization step size is changed from the amount of information of the video frame exceeding the motion threshold and the quantization ratio, and
    determines a quantization step size transmittable in the maximum permissible delay time from the predicted amount of the generated information, the average throughput, the transmission rate and the maximum permissible delay time and sends the quantization step size to the coding portion, and
  the coding portion codes the video frame with the quantization step size sent from the quantization control portion.

As explained above, according to the fiftieth aspect, the video coding device determines a quantization step size from the predicted amount of the generated information of the video frame with large motion of the object and the average throughput received from the video receiving device. Hence, even if there are a plurality of transmission lines with different throughputs on the communication line between two devices, quantization control most suitable for the throughputs between the two devices can be applied.

A fifty-first aspect relates to a video transmission system in which a video coding device coding and transmitting a moving picture and a video receiving device applying certain processing to received video data are connected so that they can communicate, wherein the video receiving device counts the number of bits of data correctly received in a predetermined constant period of time and transmits the counted bit number to the video coding device, and the video coding device includes
  a video input portion for forming a video frame from a picture signal and outputting the video frame,
  a coding portion for coding the video frame formed in the video input portion,
  a transmission buffer for storing video data of the video frame coded in the coding portion,
  a quantization control portion for determining a quantization step size used in coding,
  a transmission control portion for transmitting the video data in the transmission buffer at a certain transmission rate and calculates an average throughput from the number of bits transmission confirmed in a predetermined constant period of time and outputting the average throughput to the quantization control portion,
  a motion threshold storing portion for storing a motion threshold for determining whether motion of an object is large or small, and
  an ideal curve storing portion for storing an ideal curve with predetermined operating points most suitable in view of visual properties as a balance between distortion in time due to frame dropping according to a coding rate which is a rate of frames transmittable per unit time and spacial distortion due to a quantization step size,
  wherein when the amount of generated information per one frame resulting from coding in the coding portion is larger than the motion threshold, the quantization control portion,
    obtains a quantization ratio which is a ratio of a quantization step size used to code the video frame exceeding the motion threshold and a quantization step size for which the amount of generated information is to be predicted,
    predicts the amount of information generated when the quantization step size is changed from the amount of generated information of the video frame exceeding the motion threshold and the quantization ratio,
    calculates the coding rate from the predicted amount of the generated information, the transmission rate and the average throughput, and determines a quantization step size most suitable in view of visual properties from the calculated coding rate and the ideal curve and sends the quantization step size to the coding portion, and the coding portion codes the video frame with the quantization step size sent from the quantization control portion.

As stated above, according to the fifty-first aspect, the video coding device determines the quantization step size most suitable in view of visual properties from the predicted amount of the generated information of the video frame with large motion of the object, the average throughput based on the bit number received from the video receiving device and the ideal curve. Hence, even when there are a plurality of transmission lines with different throughputs on the communication line between two devices, quantization control most suitable for the throughputs between the two devices can be applied.

According to a fifty-second aspect, in the fifty-first aspect, when the transmission control portion calculates the average throughput, the time over which average is obtained is variable according to variation of the number of bits whose transmission are confirmed.

As described above, according to the fifty-second aspect, if the time for obtaining the average is shortened, quantization control can quickly respond to a change in throughput. In the condition where burst type errors occur, if the time for obtaining the average is set longer than the cycle of the occurrence of the burst errors, the quantization control can keep stable even when a burst error occurs.

According to a fifty-third aspect, in the fifty-first aspect, the predetermined constant period of time for calculating the average throughput is not less than 300 msec.

As mentioned above, according to the fifty-third aspect, setting the time for obtaining the average to 300 msec or longer permits quantization control which do not go unstable even when a burst error occurs.

A fifty-fourth aspect relates to a video transmission system in which a video coding device coding and transmitting a moving picture and a video receiving device applying certain processing to received video data are connected so that they can communicate, wherein the video receiving device counts the number of bits of data correctly received in a predetermined constant period of time and calculates an average throughput from the counted bit number and transmits the average throughput to the video coding device, and the video coding device includes, a video input portion for forming a video frame from a picture signal and outputting the video frame, a coding portion for coding the video frame formed in the video input portion, a transmission buffer for storing video data of the video frame coded in the coding portion, a quantization control portion for determining a quantization step size used in coding, a transmission control portion for transmitting the video data in the transmission buffer at a certain transmission rate and outputting the average throughput received from the video receiving device to the quantization control portion, a motion threshold storing portion for storing a motion threshold for determining whether motion of an object is large or small, and an ideal curve storing portion for storing an ideal curve with predetermined operating points most suitable in view of visual properties as a balance between distortion in time due to frame dropping according to a coding rate which is a rate of frames transmittable per unit time and spacial distortion due to the quantization step size, wherein when the amount of generated information per one frame resulting from coding in the coding portion is larger than the motion threshold, the quantization control portion, obtains a quantization ratio which is a ratio of a quantization step size used to code the video frame exceeding the motion threshold and a quantization step size the amount of generated information for which is to be predicted, predicts the amount of information generated when the quantization step size is changed from the amount of generated information of the video frame exceeding the motion threshold and the quantization ratio, calculates the coding rate from the predicted amount of generated information, the transmission rate and the average throughput, and determines a quantization step size most suitable in view of the visual properties from the calculated coding rate and the ideal curve and sends the quantization step size to the coding portion, and the coding portion codes the video frame with the quantization step size sent from the quantization control portion.

As described above, according to the fifty-forth aspect, the video coding device determines a quantization step size from the predicted amount of the generated information of the video frame with large motion of the object and the average throughput received from the video receiving device. Hence, even if there are a plurality of transmission lines with different throughputs on the communication line between the two devices, quantization control most suitable for the throughputs between the two devices can be applied.

A fifty-fifth aspect is directed to a video transmission system in which a video coding device coding and transmitting a moving picture and a video receiving device applying certain processing to received video data are connected through one or more relay stations so that they can communicate, wherein when detecting an error of the received data, the video receiving device makes automatic retransmission between adjacent one of the relay stations and itself, the relay station makes automatic retransmission between adjacent one of the relay stations and itself when detecting an error of received data and transmits retransmission occurrence information indicating the occurrence of the retransmission to the video coding device, and the video coding device includes, a video input portion for forming a video frame from a picture signal and outputting the video frame, a coding portion for coding the video frame formed in the video input portion, a transmission buffer for storing video data coded in the coding portion, a first quantization control portion for determining a quantization step size most suitable in view of both reproducibility of motion and video quality, a second quantization control portion for controlling a quantization step size according to communication conditions, and a transmission control portion for transmitting the video data in the transmission buffer at a certain transmission rate, and if a communication error occurs between adjacent one of the relay stations and the video coding device, making automatic retransmission between the adjacent relay station and the video coding device, and when the transmission control portion itself makes a retransmission, or when it receives the retransmission occurrence information from the video receiving device, sending error information indicating the occurrence of the retransmission to the second quantization control portion, wherein the second quantization control portion,
when receiving the notice of the error information from the transmission control portion, sets a quantization step size with a larger quantization step size than a quantization step size corresponding to the quantization step size determined in the first quantization control portion and sends the quantization step size to the coding portion, and when not receiving the notice of the error information from the transmission control portion over a predetermined constant period of time, sends the quantization step size determined in the first quantization control portion unchanged to the coding portion, and the coding portion codes a video frame coded next with the quantization step size sent from the second quantization control portion.

As explained above, according to the fifty-fifth aspect, the relay station makes automatic retransmission between itself and an adjacent relay station or the video receiving device and transmits the retransmission occurrence information indicative of the occurrence of the retransmission to the video coding device, which permits quantization control taking the communication condition between devices into account.

A fifty-sixth aspect is directed to a video transmission system in which a video coding device coding and transmitting a moving picture and a video receiving device applying certain processing to received video data are connected through one or more relay stations so that they can communicate, wherein when detecting an error of the received data, the video receiving device makes automatic retransmission between adjacent one of the relay stations and itself, the relay station makes automatic retransmission between adjacent one of the relay stations and itself when detecting an error of the received data and transmits retransmission occurrence information indicating the occurrence of the retransmission to the video coding device, and the video coding device includes,
a video input portion for forming a video frame from a picture signal and outputting the video frame,
a coding portion for coding the video frame formed in the video input portion,
a transmission buffer for storing video data of the video frame coded in the coding portion,
a transmission control portion for transmitting the video data in the transmission buffer at a certain transmission rate,
a temporary buffer disposed between the coding portion and the transmission buffer for temporarily storing the video data of the video frame coded in the coding portion, and
a frame dropping/quantization control portion for determining whether to store the video data in the temporary buffer into the transmission buffer and determining a quantization step size for a video frame coded next, wherein the frame dropping/quantization control portion,
performs threshold control of lowering a frame dropping threshold for determining whether to store the video data in the temporary buffer into the transmission buffer from a predetermined value when receiving notice of the error information from the transmission control portion, and returning the frame dropping threshold to the predetermined value when not receiving the notice of the error information from the transmission control portion in a predetermined constant period of time, and performs frame dropping control of not storing into the transmission buffer the video data in the temporary buffer when the amount of information of the video frame stored in the temporary buffer is larger than the frame dropping threshold and also sets a quantization step size with a larger quantization step size than a quantization step size used to code the video frame stored in the temporary buffer and sends the quantization step size to the coding portion, and the coding portion codes the video frame coded next with the quantization step size sent from the frame dropping/quantization control portion.

As stated above, according to the fifty-sixth aspect, the relay station makes automatic retransmission between itself and an adjacent relay station, or the video receiving device and transmits the retransmission occurrence information indicative of the occurrence of the retransmission to the video coding device, which permits coding control taking the communication condition between devices into account.

According to a fifty-seventh aspect, a video coding device coding and transmitting a moving picture includes:
a video coding portion for coding a priority area with a first quantization accuracy and a non-priority area with a second quantization accuracy in a video area to be coded to generate a video coded bit string;
a priority area/non-priority area changing portion for determining and changing the priority area and the non-priority area according to the amount of generated information of the video coded by the video coding portion; and
a transmission control portion for transmitting the video coded bit string.

As mentioned above, according to the fifty-seventh aspect, if the amount of generated information increases or the communication throughput decreases while coding the priority area clearer than the non-priority area, the priority area changing portion reduces the priority area. Hence, the amount of generated information is suppressed and the video quality of the priority area is not largely deteriorated.

A fifty-eighth aspect is directed to a method for controlling quantization operation when coding a video frame in a video coding device in which operating points most suitable in view of visual properties is predetermined as a balance between timewise distortion due to frame dropping according to a coding rate which is a rate of frames transmittable per unit time and spacial distortion due to quantization accuracy when low bit rate compression coding a moving picture and transmitting the coded moving picture through a communication line with a low bit rate, comprising:
a first operation mode in which a quantization accuracy for next coding is determined according to the relation in magnitude between a coding rate resulting from coding an entire video frame with a certain quantization accuracy and a coding rate at a point most suitable in view of the visual properties corresponding to that quantization accuracy; and a second operation mode in which a video area to be coded is divided into a priority area and a non-priority area, the priority area being coded with a relatively high first quantization accuracy and the non-priority area being coded with a relatively low second quantization accuracy, and the quantization accuracy and sizes of the priority area and the non-priority area for the next coding are determined according to the relation in magnitude between coding rate resulting from coding with the first and second quantization accuracies and a coding rate at a point most suitable in view of the visual properties corresponding to the quantization accuracies, wherein when the quantization accuracy determined in the first operation mode falls below a predetermined permissible lower limit value of the quantization accuracy, the operation mode moves from the first operation mode to the second operation mode, and when the size of the priority area determined in the second operation mode reaches its maximum, the operation mode moves from the second operation mode to the first operation mode.

As stated above, according to the fifty-eighth aspect, when the spacial video quality absolutely due to an error in quantization accuracy and corresponding frame jump are in the permissible range, the conventional quantization control considering the visual properties is made. When the spacial video quality and the frame dropping exceed the permissible limit, the video quality of the spacial area which is not very important in the video is sacrificed so that quantization control considering the visual properties can be applied to the important spacial area. Then, coding parameters for the changing input video can be kept at values at which the balance between the reproducibility of motion and the spacial resolution is the most suitable in view of the visual properties.

According to a fifty-ninth aspect, in the fifty-eighth aspect, the coding rates most suitable in view of the visual properties corresponding to each of the quantization accuracies are each determined as a set of points in a region surrounded by an upper limit value and a lower limit value, in the first and second operation modes, the quantization accuracy for the next coding is increased when the coding rate resulting from coding with a certain quantization accuracy exceeds the upper limit value, the quantization accuracy for the next coding is decreased when the coding rate resulting from coding with a certain quantization accuracy falls below the lower limit value, and when the coding rate resulting from coding with a certain quantization accuracy is within the region between the upper limit value and the lower limit value, the quantization accuracy for the next coding is not changed.

As stated above, according to the fifty-ninth aspect, most stable coding control can be realized even when the input video quickly changes by allowing some latitude to the visually most suitable coding rate for each quantization accuracy.

According to a sixtieth aspect, in the fifty-ninth aspect, a minimum size of the quantization accuracy when changed in the first and second operation modes is chosen to a size not less than a value at which a difference of spacial distortion is visually recognizable.

As stated above, according to the sixtieth aspect, the change of the quantization accuracy given per unit time is increased so that the change of the visually most suitable operating point due to a change of input video can be quickly followed.

According to a sixty-first aspect, in the third or fourth aspect, when the transmission control portion calculates the average throughput, the time over which average is obtained is variable according to variation of the number of bits whose transmission are confirmed.

As mentioned above, according to the sixty-first aspect, decreasing the time for obtaining the average allows quantization control and frame dropping control quickly responsive to a change in throughput, and in the condition where burst type errors occur, setting the time for obtaining the average longer than the cycle of the occurrence of the burst errors allows quantization control and frame dropping control to keep stable even with burst errors.

According to a sixty-second aspect, in the third or fourth aspect, the predetermined constant period of time for calculating the average throughput is not less than 300 msec.

As mentioned above, according to the sixty-second aspect, the time for obtaining the average of 300 msec or longer permits quantization control and frame dropping control which do not go unstable even when a burst error occurs.

According to a sixty-third aspect, in the seventh or eighth aspect, when the transmission control portion calculates the average throughput, the time for obtaining the average is variable according to variation of the number of bits whose transmission are confirmed.

As mentioned above, according to the sixty-third aspect, decreasing the time over which the average is obtained allows quantization control and frame dropping control quickly responsive to a change in throughput, and in the condition where burst type errors occur, setting the time over which the average is obtained longer than the cycle of the occurrence of the burst errors allows quantization control and frame dropping control to keep stable even with burst errors.

According to a sixty-fourth aspect, in the seventh or eighth aspect, the predetermined constant period of time for calculating the average throughput is not less than 300 msec.

As mentioned above, according to the sixty-fourth aspect, the time for obtaining the average of 300 msec or longer permits quantization control and frame dropping control which do not go unstable even with occurrence of a burst error.

According to a sixty-fifth aspect, in the forty-sixth aspect, the frame dropping/quantization control portion, further, calculates an average delay time on the basis of the average amount of the generated information of the video frame transmitted in a constant period of time and the average throughput, and uses the calculated average delay time as the maximum permissible delay time.

As mentioned above, according to the sixty-fifth aspect, the average delay time is calculated from the average amount of generated information of video frame transmitted in a constant period of time and the average throughput and the amount of information transmittable in the average delay time is also calculated. Then the calculated amount of information is used as the threshold for the frame dropping control. This allows frame dropping control corresponding to the moving video characteristics and communication condition.

According to a sixty-sixth aspect, in the fourth-sixth aspect, when the video receiving device calculates the average throughput, the time over which average is obtained is variable according to variation of the number of bits of the data correctly received.

As mentioned above, according to the sixty-sixth aspect, decreasing the time over which the average is obtained allows frame dropping control quickly responsive to a change in throughput, and in the condition where burst type errors occur, setting the time over which the average is obtained longer than the cycle of the occurrence of the burst errors allows frame dropping control to keep stable even with burst errors.

According to a sixty-seventh aspect, in the forty-sixth aspect, the predetermined constant period of time for calculating the average throughput is not less than 300 msec.

As mentioned above, according to the sixty-seventh aspect, the time for obtaining the average of 300 msec or longer permits frame dropping control which do not go unstable even with occurrence of a burst error.

According to a sixty-eighth aspect, in the fiftieth aspect, when the video receiving device calculates the average throughput, the time over which the average is obtained is variable according to variation of the number of bits of data correctly received.

As mentioned above, according to the sixty-eighth aspect, decreasing the time over which the average is obtained allows quantization control quickly responsive to a change in throughput, and in the condition where burst type errors occur, setting the time over which the average is obtained longer than the cycle of the occurrence of the burst errors allows quantization control to keep stable even with burst errors.

According to the sixty-ninth aspect, in the fiftieth aspect, the predetermined constant period of time for calculating the average throughput is not less than 300 msec.

As mentioned above, according to the sixty-ninth aspect, the time for obtaining the average of 300 msec or longer permits quantization control which do not go unstable even with occurrence of a burst error.

According to a seventieth aspect, in the fifty-fourth aspect, when the video receiving device calculates the average throughput, the time over which average is obtained is variable according to variation of the number of bits of correctly received data.

As mentioned above, according to the seventieth aspect, decreasing the time over which the average is obtained allows quantization control quickly responsive to a change in throughput, and in the condition where burst type errors occur, setting the time over which the average is obtained longer than the cycle of the occurrence of the burst error allows quantization control to keep stable even with burst errors.

According to a seventy-first aspect, in the fifty-fourth aspect, the predetermined constant period of time for calculating the average throughput is not less than 300 msec.

As mentioned above, according to the seventy-first aspect, since the time for obtaining the average is set to 300 msec or longer, determination of the quantization step size which does not become unstable even when a burst error occurs is realized when the movement of the object is large.

According to a seventy-second aspect, in the tenth aspect, when the quantization control portion calculates the average throughput, a time for calculating the average is variable according to whether burst errors occur or not.

As stated above, according to the seventy-second aspect, decreasing the time over which the average is obtained permits the quantization control and the frame dropping control quickly responsive to a change in throughput, and in the condition where burst type errors occur, setting the time over which the average is obtained larger than the cycle of the occurrence of the burst errors allows quantization control and frame dropping control to keep stable even with burst errors.

According to a seventy-third aspect, in the eleventh aspect, when the quantization control portion calculates the average throughput, the time for calculating the average is variable according to whether burst errors occur or not.

As stated above, according to the seventy-third aspect, decreasing the time for calculating the average allows the quantization control and the frame dropping control quickly responsive to a change in throughput, and in the condition where burst type errors occur, setting the time over which the average is obtained larger than the cycle of the occurrence of the burst errors allows the quantization control and the frame dropping control to keep stable even with burst errors.

According to a seventy-fourth aspect, in the tenth aspect, the predetermined certain time for calculating the average throughput is not less than 300 msec.

As stated above, according to the seventy-fourth aspect, since the time for obtaining the average is set to 300 msec or longer, the quantization control and the frame dropping control can keep stable even with burst errors.

According to a seventy-fifth aspect, in the eleventh aspect, the predetermined certain time for calculating the average throughput is not less than 300 msec.

As stated above, according to the seventy-fifth aspect, since the time for obtaining the average is set to 300 msec or longer, the quantization control and the frame dropping control can keep stable even with burst errors.

According to a seventy-sixth aspect, in the fourth aspect, when the transmission control portion calculates the average throughput, the time for calculating the average is variable according to whether burst errors occur or not.

As stated above, according to the seventy-sixth aspect, decreasing the time over which the average is obtained permits the quantization control and the frame dropping control quickly responsive to a change in throughput, and in the condition where burst type errors occur, setting the time over which the average is obtained larger than the cycle of the occurrence of the burst errors allows the quantization control and the frame dropping control to keep stable even with burst errors.

According to a seventy-seventh aspect, in the fourth aspect, the predetermined certain time for calculating the average throughput is not less than 300 msec.

As stated above, according to the seventy-seventh aspect, since the time for obtaining the average is set to 300 msec or longer, quantization control and frame dropping control can keep stable even with burst errors.

According to a seventy-eighth aspect, in the eighth aspect, when the transmission control portion calculates the average throughput, the time for calculating the average is variable according to whether burst errors occur or not.

As stated above, according to the seventy-eighth aspect, decreasing the time over which the average is obtained allows quantization control and frame dropping control quickly responsive to a change in throughput, and in the condition where burst type errors occur, setting the time over which the average is obtained larger than the cycle of the occurrence of the burst errors allows the quantization control and the frame dropping control to keep stable even with burst errors.

According to a seventy-ninth aspect, in the eighth aspect, the predetermined certain time for calculating the average throughput is not less than 300 msec.

As stated above, according to the seventy-ninth aspect, since the time for obtaining the average is set to 300 msec. or longer, quantization control and frame dropping control can keep stable even with burst errors.

According to an eightieth aspect, in any of the third to fourth, seventh to thirteenth, fifteenth to seventeenth, nineteenth to twenty-first, sixty-first to sixty-fourth, or seventy-second to seventy-ninth aspects, the average throughput for the certain time is calculated on the basis of the amount of data outputted in a unit time t from the transmission buffer which temporarily stores the coded data.

As stated above, according to the eightieth aspect, since the average throughput is calculated based on the number of bits read from the transmission buffer, Go-back-N or Selective Reject can be adopted as a retransmission method.

According to an eighty-first aspect, in any of the third to fourth, seventh to thirteenth, fifteenth to seventeenth, nineteenth to twenty-first, sixty-first to sixty-fourth, or seventy-second to seventy-ninth aspects, the average throughput for the certain time is calculated as each of the certain time passes, by dividing by the certain time the amount of data outputted for the certain time, which is obtained by accumulating the amount of data outputted in the unit time t for the certain time, as each of the certain time passes.

As stated above, in the eighty-first aspect, a mean value is calculated by dividing the total number of bits for the certain time by the certain time for each of the certain time and outputted for each of the certain time, which permits calculation of the average throughput by a simple process and furthermore, adoption of Go-back-N or Selective Reject as a retransmission method.

According to an eighty-second aspect, in any of the third to fourth, seventh to thirteenth, fifteenth to seventeenth, nineteenth to twenty-first, sixty-first to sixty-fourth, or seventy-second to seventy-ninth aspects, the average throughput for the certain time is calculated as each of a unit time t passes, by dividing by the certain time the amount of data outputted in the certain time, which is the result of accumulating the amount of data outputted in the unit time t between a present time and the certain time prior to the present time, as each of the unit time passes.

As stated above, according to the eighty-second aspect, the mean value is calculated by dividing the total number of bits for the certain time by the certain time for each of the unit time t and outputted for each of the unit time t. This allows the average throughput to be up dated for each of the unit time t and permits careful control. Furthermore, Go-back-N or Selective Reject can be adopted as the retransmission method.

According to an eighty-third aspect, in any of the third to fourth, seventh to thirteenth, fifteenth to seventeenth, nineteenth to twenty-first, sixty-first to sixty-fourth, or seventy-second to seventy-ninth aspects, the average throughput for the certain time is calculated on the basis of the amount of data outputted in a unit time t which is equal to a video frame period of the coded video from the transmission buffer temporarily storing the coded data.

As stated above, according to the eighty-third aspect, equating the unit time t with the video frame period of the coded video permits synchronization with a coding timing.

According to an eighty-fourth aspect, in any of the third to fourth, seventh to thirteenth, fifteenth to seventeenth, nineteenth to twenty-first, sixty-first to sixty-fourth, or seventy-second to seventy-ninth aspects, the average throughput for the certain time is calculated as each of the certain time passes, by dividing by the certain time the amount of data outputted for the certain time, which is obtained by accumulating the amount of data outputted in the unit time t equal to a video frame period of coded video for the certain time for the certain time, as each of the certain time passes.

As mentioned above, according to the eighty-fourth aspect, equating the unit time t with the video frame period of the coded video permits synchronization with the coding timing. Furthermore, the mean value is calculated by dividing the total number of bits for the certain time by the certain time for each of the certain time and outputted for each of the certain time, resulting in calculating the average throughput by the simple process.

According to an eighty-fifth aspect, in any of the third to fourth, seventh to thirteenth, fifteenth to seventeenth, nineteenth to twenty-first, sixty-first to sixty-fourth, or seventy-second to seventy-ninth aspects, as each of the unit time t equal to the video frame period of the coded video passes, by dividing by the certain time the amount of data outputted for the certain time, which is the result of accumulating the amount of data outputted in the unit time t between the certain time prior to the present time to the present time, the average throughput for the certain time is calculated as each of the unit time t equal to the video frame period of the coded video passes.

As mentioned above, according to the eighty-fifth aspect, equating the unit time t with the video frame period of the coded video permits synchronization with the coding timing. Furthermore, the mean value is calculated by dividing the total number of bits for the certain time by the certain time for each of the unit time t and outputted for each of the unit time t, which makes it possible to update the average throughput for each of the unit time t and make careful control.

According to an eighty-sixth aspect, in any of the third to fourth, seventh to thirteenth, fifteenth to seventeenth, nineteenth to twenty-first, sixty-first to sixty-fourth, or seventy-second to seventy-ninth aspects, the average throughput for the certain time is calculated on the basis of the amount of data outputted in a unit time t equal to a one frame time of the transmitted frames from the transmission buffer temporarily storing the coded data.

As mentioned above, according to the eighty-sixth aspect, equating the unit time t with the one frame time of the transmission frames makes it possible to readily synchronize with a transmission timing of the transmitted frames and furthermore, adopt Go-back-N or Selective Reject as the retransmission method.

According to an eighty-seventh aspect, in any of the third to fourth, seventh to thirteenth, fifteenth to seventeenth, nineteenth to twenty-first, sixty-first to sixty-fourth, or seventy-second to seventy-ninth aspects, the average throughput for the certain time is calculated as each of the certain time passes, by dividing by the certain time the amount of data outputted for the certain time, which is the result of accumulating for the certain time the amount of data outputted in the unit time t equal to the one frame time of the transmitted frames, as each of the certain time passes.

As mentioned above, according to the eighty-seventh aspect, equating the unit time t with the one frame time of the transmission frames easily permits synchronization with the transmission timing of the transmitted frames. Furthermore, the mean value is calculated by dividing the total number of bits for the certain time by the certain time for each of the certain time and outputted for each of the certain time, resulting in calculating the average throughput by the simple process.

According to an eighty-eighth aspect, in any of the third to fourth, seventh to thirteenth, fifteenth to seventeenth, nineteenth to twenty-first, sixty-first to sixty-fourth, or seventy-second to seventy-ninth aspects, as each of the unit time t equal to the one frame time of the transmitted frames passes, by dividing by the certain time the amount of data outputted for the certain time, which is the result of accumulating the amount of data outputted in the unit time t between the certain time prior to the present time to the present time, the average throughput for the certain time is calculated as each of the unit time t equal to the one frame time of the transmitted frames passes.

As mentioned above, according to the eighty-eighth aspect, equating the unit time t with the one frame time of the transmitted frames easily permits synchronization with the transmission timing of the transmission frames. Furthermore, the mean value is calculated by dividing the total number of bits for the certain time by the certain time for each of the unit time t and outputted for each of the unit time t, which makes it possible to update the average throughput for each of the unit time t and achieve careful control.

According to an eighty-ninth aspect, in any of the third to fourth, seventh to thirteenth, fifteenth to seventeenth, nineteenth to twenty-first, sixty-first to sixty-fourth, or seventy-second to seventy-ninth aspects, the average throughput for the certain time is calculated on the basis of the amount of data outputted for a unit time t which is equal to a least common multiple of the video frame period of the coded frames and the one frame time of the transmission frames from the transmission buffer temporarily storing the coded data.

As mentioned above, according to the eighty-ninth aspect, setting the unit time t to the least common multiple of the transmission frame time and the period of video makes it possible to readily synchronize with both of them and furthermore, adopt Go-back-N or Selective Reject as the retransmission method.

According to a ninetieth aspect, in any of the third to fourth, seventh to thirteenth, fifteenth to seventeenth, nineteenth to twenty-first, sixty-first to sixty-fourth, or seventy-second to seventy-ninth aspects, the average throughput for the certain time is calculated as each of the certain time passes, by dividing by the certain time the amount of data outputted for the certain time which is obtained by accumulating for the certain time the amount of data outputted in the unit time t equal to the least common multiple of the video frame period of the coded video and the one frame time of the transmission frames.

As stated above, according to the ninetieth aspect, setting the unit time t to the least common multiple of the transmission frame time and the period of the video easily permits synchronization with both of them. Moreover, the mean value is calculated by dividing the total number of bits for the certain time by the certain time for each of the certain time and outputted for each of the certain time, resulting in calculation of the average throughput by the simple process.

According to a ninety-first aspect, in any of the third to fourth, seventh to thirteenth, fifteenth to seventeenth, nineteenth to twenty-first, sixty-first to sixty-fourth, or seventy-second to seventy-ninth aspects, as each of the unit time t equal to the least common multiple of the video frame period of the coded video and the one frame time of the transmitted frames passes, by dividing by the certain time the amount of data outputted for the certain time, which is the result of accumulating the amount of data outputted in the unit time t between the certain time before the present time and the present time, the average throughput for the certain time is calculated as each of the unit time t passes.

As described above, in the ninety-first aspect, setting the unit time t to the least common multiple of the transmission frame time and the period of the video easily permits synchronization with both of them. Moreover, the mean value is calculated by dividing the total number of bits for the certain time by the certain time for each of the unit time t and outputted for each of the unit time t, which makes it possible to update the average throughput for each of the unit time t and make careful control.

According to a ninety-second aspect, in the thirty-ninth aspect, when the video receiving device calculates the average throughput, the time for calculating the average is variable according to variation of the number of bits of correctly received data.

As described above, according to the ninety-second aspect, decreasing the time over which the average is obtained allows quantization control quickly responsive to a change in throughput, and in the condition where burst type errors occur, setting the time over which the average is obtained larger than the cycle of the occurrence of the burst errors allows quantization control to keep stable even with burst errors.

According to a ninety-third aspect, in the thirty-ninth aspect, the predetermined certain time for calculating the average throughput is not less than 300 msec.

As stated above, according to the ninety-third aspect, setting the time for obtaining the average to 300 msec. or longer enables to keep quantization control stable even with burst errors.

According to a ninety-fourth aspect, an average throughput for a certain time T is calculated on the basis of an amount of data outputted in an unit time t from a transmission buffer temporarily storing coded data.

As described above, according to the ninety-fourth aspect, since the average throughput is calculated on the basis of the number of bits read from the transmission buffer, Go-back-N or Selective Reject can be adopted as the retransmission method.

According to a ninety-fifth aspect, in the ninety-fourth aspect, a period in which the amount of data outputted in the unit time t is shorter than a predetermined threshold is detected from the transmission buffer and taken as a certain time T.

As stated above, according to the ninety-fifth aspect, taking the period of burst errors as the certain time T enables to calculate the average throughput keeping stable with the occurrence of burst errors.

According to a ninety-sixth aspect, in the ninety-fourth aspect, the average throughput for the certain time T is calculated as each of the certain time T passes, by dividing by the certain time T the amount of data outputted for the certain time T which is obtained by accumulating the amount of data outputted in the unit time t for the certain time T, as each of the certain time T passes.

As stated above, in the ninety-sixth aspect, a mean value is calculated by dividing the total number of bits for the certain time T by the certain time T for each of the certain time T and outputted for each of the certain time T, which enables to calculate the average throughput by the simple process.

According to a ninety-seventh aspect, in the ninety-sixth aspect, the period in which the amount of data outputted in the unit time t is smaller than the predetermined threshold is detected from the transmission buffer and taken as the certain time T.

As stated above, according to the ninety-seventh aspect, taking the period of burst errors as the certain time T makes it possible to calculate the average throughput keeping stable with the occurrence of burst errors.

According to a ninety-eighth aspect, in the ninety-fourth aspect, the average throughput for the certain time T is calculated as each of the unit time t passes, by dividing by the certain time T the amount of data outputted for the certain time T, which is obtained by accumulating the amount of data outputted in the unit time t between the present time and the certain time T prior to the present time, as each of the unit time passes.

As stated above, according to the ninety-eighth aspect, the mean value is calculated by dividing the total number of bits for the certain time T by the certain time T for each of the unit time t and outputted for each of the unit time t, which allows the average throughput to be updated for each of the unit time t and careful control to be performed.

According to a ninety-ninth aspect, in the ninety-eighth aspect, the period in which the amount of data outputted in the unit time t is smaller than the predetermined threshold is detected from the transmission buffer and taken as the certain time T.

As stated above, according to the ninety-ninth aspect, taking the period of burst errors as the certain time T makes it possible to calculate the average throughput keeping stable with the occurrence of burst errors.

According to a one-hundred-th aspect, in the ninety-fourth to ninety-ninth aspects, the unit time t is taken as the video frame period of the coded video.

As stated above, according to the one-hundred-th aspect, equating the unit time t with the video frame period of the coded video permits synchronization with the coding timing.

According to a one-hundred-first aspect, in the ninety-fourth to ninety-ninth aspect, the unit time t is taken as the one frame time of the transmission frames.

As stated above, according to the one-hundred-first aspect, taking the unit time t as the one frame time of the transmission frames easily permits synchronization with the transmission timing of the transmission frames.

According to a one-hundred-second aspect, in the ninety-fourth to ninety-ninth aspects, the unit time t is taken as a least common multiple of the video frame period of the coded video and the one frame time of the transmission frames.

As mentioned above, according to the one-hundred-second aspect, taking the unit time t as the least common multiple of the transmission frame time and the period of video readily permits synchronization with both of them.

According to a one-hundred-third aspect, in any of the twelfth, sixteenth, twentieth, sixty-first, sixty-third, seventy-second to seventy-third, seventy-fifth, or seventy-eighth aspects, the period in which the amount of data outputted in the unit time t is smaller than the predetermined threshold is detected from the transmission buffer temporarily storing the coded data and taken as an average time used in calculating the average throughput.

As mentioned above, according the one-hundred-third aspect, taking the period of burst errors as the averaging time used in obtaining the average throughput allows the quantization control and the frame dropping control to keep stable even with the occurrence of burst errors.

According to a one-hundred-fourth aspect, in any of the twelfth, sixteenth, twentieth, sixty-first, sixty-third, seventy-second to seventy-third, seventy-sixth or seventy-eighth aspects, the period in which the amount of data outputted in the unit time t equal to the one frame time of the transmission frames is smaller than the predetermined threshold is detected from the transmission buffer temporarily storing the coded data and taken as the averaging time used in calculating the average throughput.

As mentioned above, according to the one-hundred-fourth aspect, taking the period of burst errors as the averaging time used in obtaining the average throughput allows the quantization control and the frame dropping control to keep stable even with the occurrence of burst errors.

According to a one-hundred-fifth aspect, in any of the twelfth, sixteenth, twentieth, sixty-first, sixty-third, seventy-second to seventy-third, seventy-sixth or seventy-eighth aspects, the period in which the amount of data outputted in the unit time t equal to the video frame period of the coed video is smaller than the predetermined threshold is detected from the transmission buffer temporarily storing the coded data and taken as the averaging time used in calculating the average throughput.

As mentioned above, according to the one-hundred-fifth aspect, taking the period of burst errors as the averaging time used in obtaining the average throughput allows the quantization control and the frame dropping control to keep stable even with burst errors.

According to a one-hundred-sixth aspect, in any of the twelfth, sixteenth, twentieth, sixty-first, sixty-third, seventy-second to seventy-third, seventy-sixth or seventy-eighth aspects, the period in which the amount of data outputted in the unit time t equal to the least common multiple of the video frame period of the coded video and the one frame time of the transmission frames is smaller than the predetermined threshold is detected from the transmission buffer temporarily storing the coded data and taken as the averaging time used in calculating the average throughput.

As mentioned above, according to the one-hundred-sixth aspect, taking the period of burst errors as the averaging time used in obtaining the average throughput allows the quantization control and the frame dropping control to keep stable even with burst errors.

According to a one-hundred-seventh aspect, in the thirty-nine aspect, when the video receiving device calculates the average throughput, the time for calculating the average is variable according to variation of the number of bits correctly received data.

As mentioned above, according to the one-hundred-seventh aspect, decreasing the time over which the average is obtained permits the quantization control quickly responsive to a change in throughput, and in the condition where burst type errors occur, setting the time over which the average is obtained larger than the cycle of the occurrence of the burst errors allows the quantization control to keep stable even with burst errors.

According to a one-hundred-eighth aspect, in the thirty-nine aspect, the predetermined certain time for calculating the average throughput is not less than 300 msec.

As mentioned above, according to the one-hundred-eighth aspect, setting the time for calculating the average throughput not less than 300 msec allows the quantization control to keep stable even with burst errors.

According to a one-hundred-ninth aspect, in any of the thirty-sixth to thirty-eighth, forty-second to forty-fifth, forty-seventh to forty-ninth, or fifty-first to fifty-third aspects, the number of bits received without errors for the certain time, which is obtained by accumulating for the certain time the number of bits received without errors for a predetermined unit time t as each of the certain time passes, is sent to the video coding device as each of the certain time passes.

As stated above, according to the one-hundred-ninth aspect, the number of bits received without errors for the certain time can be calculated by a simple process and in the video coding device the average throughput for each of the certain time can be obtained.

According to a one-hundred-tenth aspect, in any of the thirty-ninth, forty-sixth, fiftieth, fifty-fourth, sixty-fifth to seventy-first, or one-hundred-seventh to one-hundred-eighth aspects, as each of the certain time passes, by dividing by the certain time the number of bits received without errors for the certain time, which is obtained by accumulating for the certain time the number of bits received without errors for a predetermined unit time t, the average throughput for the certain time is sent to the video coding device as each of the certain time passes.

As stated above, in the one-hundred-tenth aspect, the average throughput for the certain time can be calculated by the simple process and in the video coding device the average throughput for each of the certain time can be obtained.

According to a one-hundred-eleventh aspect, in any of the thirty-sixth to thirty-eighth, forty-second to forty-fifth, forty-seventh to forty-ninth, or fifty-first to fifty-third aspects, the number of bits received without errors for the certain time, which is obtained by,as each of a predetermined unit time t passes, accumulating the number of bits received without errors for the unit time t between the certain time T before a present time and the present time, is sent to the video coding device as each of the unit time t passes.

As stated above, according to the one-hundred-eleventh aspect, sending for each of a unit time t the number of bits received without errors for the certain time to the video coding device makes it possible to obtain the average throughput for each of the unit time t and perform careful control in the video coding device.

According to an one-hundred-twelfth aspect, in any of the thirty-ninth, forty-sixth, fiftieth, fifty-fourth, sixty-fifth to seventy-first, or one-hundred-seventh to one-hundred-eighth aspects, as each of a predetermined unit time passes, by dividing by the certain time the bit number received without errors for the certain time, which is obtained by accumulating the bit number received without errors for the unit time t between the certain time before a present time and the present time, the average throughput for the certain time is sent to the video coding device as each of the unit time t passes.

As stated above, in the one-hundred-twelfth aspect, transmitting the average throughput for the certain time to the video coding device for each of the unit time t permits careful control in the video coding device.

According to an one-hundred-thirteenth aspect, in any of the thirty-sixth to thirty-eighth, forty-second to forty-fifth, forty-seventh to forty-ninth, or fifty-first to fifty-third aspects, the video receiving device has the same function of coding to transmit videos as the video coding device does, and the bit number received without errors for the certain time, which is obtained by,as each of the certain time passes, accumulating for the certain time the bit number received without errors for a unit time t equal to a video frame period of the coded video, is transmitted to the video coding device as each of the certain time passes.

As stated above, in the one-hundred-thirteenth aspect, equating the unit time t with the video frame period of the coded videos readily permits synchronization with a coding timing. Furthermore, the bit number received without errors for the certain time can be calculated by a simple process and the average throughput for the certain time can be obtained in the video coding device.

According to a one-hundred-fourteenth aspect, in any of the thirty-ninth, the forty-sixth, the fiftieth, the fifty-fourth, the sixty-fifth to the seventy-first, or the one-hundred-seventh to the one-hundred-eighth aspects, the video receiving device has the same function of coding to transmit videos as the video coding device does, and, as each of the constant period of time passes, by dividing by the constant period of time the bit number received without errors for the constant period of time, which is the result of accumulating the bit number received without errors for the unit time t equal to the video frame period of the coded videos for the constant period of time, an average throughput for the constant period of time is sent to the video coding device as each of the constant period of time passes.

As stated above, according to the one-hundred-fourteenth aspect, equating the unit time t with the video frame period of the coded videos easily enables synchronization with the coding timing. Furthermore, the average throughput for the constant period of time can be calculated with simple processing, and the average throughput for each of the constant period of time can be obtained in the video coding device.

According to a one-hundred-fifteenth aspect, in any of the thirty-sixth to the thirty-eighth, the forty-second to the forty-fifth, the forty-seventh to the forty-ninth, or the fifty-first to the fifty-third aspects, the video receiving device has the same function of coding to transmit videos as the video coding device does, and the bit number received without errors for the constant period of time, which is the result of, as each of the unit time t equal to the video frame period of the coded videos passes, accumulating the bit number received without errors for the unit time t which is between the constant period of time before the present time and the present time, is sent to the video coding device as each of the unit time t passes.

As stated above, according to the one-hundred-fifteenth aspect, equating the unit time t with the video frame period of the coded videos easily permits synchronization with the code timing. Furthermore, sending the bit number received without errors for the constant period of time to the video coding device for each of the unit time t allows the video coding device to obtain the average throughput for each of the unit time t and careful control can be realized.

According to a one-hundred-sixteenth aspect, in the thirty-ninth, the forty-sixth, the fiftieth, the fifty-fourth, the sixty-fifth to the seventy-first, or the one-hundred-seventh to the one-hundred-eighth aspects, the video receiving device has the same function of coding to transmit videos as the video coding device does, and, as each of the unit time t equal to the video frame period of the coded videos passes, by dividing by the constant period of time the bit number received without errors for the constant period of time, which is the result of accumulating the bit number received without errors for the unit time t which is between the constant period of time prior to the present time and the present time, the average throughput for the constant period of time is sent to the video coding device as each of the unit time t passes.

As stated above, according to the one-hundred-sixteenth aspect, equating the unit time t with the video frame period of the coded videos easily enables synchronization with the code timing. Furthermore, sending the average throughput for the constant period of time to the video coding device for each of the unit time t enables careful control in the video coding device.

According to a one-hundred-seventeenth aspect, in any of the thirty-sixth to the thirty-eighth, the forty-second to the forty-fifth, the forty-seventh to the forty-ninth, or the fifty-first to the fifty-third aspects, the bit number received without errors for the constant period of time, which is the result of, as each of the constant period of time passes, accumulating the bit number received without errors for the unit time t equal to the one frame time of the transmitted frames for the constant period of time is sent to the video coding device as each of the constant period of time passes.

As stated above, according to the one-hundred-seventeenth aspect, equating the unit time t with the one frame time of the transmitted frames easily enables synchronization with the transmission timing of the transmitted frames. Furthermore, the bit number received without errors for the constant period of time can be calculated with simple processing and the average throughput for each of the constant period of time can be obtained in the video coding device.

According to a one-hundred-eighteenth aspect, in any of the thirty-ninth, the forty-sixth, the fiftieth, the fifty-fourth, the sixty-fifth to the seventy-first, or the one-hundred-seventh to the one-hundred-eighth aspects, as each of the constant period of time passes, by dividing by the constant period of time the bit number received without errors for the constant period of time, which is the result of accumulating the bit number received without errors for the unit time t equal to the one frame time of the transmitted frames for the constant period of time, the average throughput for the constant period of time is sent to the video coding device as each of the constant period of time passes.

As stated above, according to the one-hundred-eighteenth aspect, equating the unit time t with the one frame time of the transmitted frames easily permits synchronization with the transmission timing of the transmitted frames. Furthermore, the average throughput for the constant period of time can be calculated with simple processing, and the average throughput for each of the constant period of time can be obtained in the video coding device.

According to a one-hundred-nineteenth aspect, in any of the thirty-sixth to the thirty-eighth, the forty-second to the forty-fifth, the forty-seventh to the forty-ninth, or the fifty-first to the fifty-third aspects, the bit number received without errors for the constant period of time, which is the result of, as each of the unit time t equal to the one frame time of the transmitted frames passes, accumulating the bit number received without errors for the unit time t between the constant period of time before the present time and the present time, is sent to the video coding device as each of the unit time t passes.

As stated above, according to the one-hundred-nineteenth aspect, equating the unit time t with the one frame time of the transmitted frames easily permits synchronization with the transmission timing of the transmitted frames. Furthermore, by sending the bit number received without errors for the constant period of time for each of the unit time t, the average throughput can be obtained for each of the unit time t and careful control can be realized in the video coding device.

According to a one-hundred-twentieth aspect, in any of the thirty-ninth, the forty-sixth, the fiftieth, the fifty-fourth, the sixty-fifth to the seventy-first, or the one-hundred-seventh to the one-hundred-eighth aspects, as each of the unit time t equal to the one frame period of the transmitted frames passes, by dividing by the constant period of time the bit number received without errors for the constant period of time, which is obtained by accumulating the bit number received without errors for the unit time t between the constant period of time before the present time and the present time, the average throughput for the constant period of time is sent to the video coding device as each of the unit time t passes.

As stated above, according to the one-hundred-twentieth aspect, equating the unit time t with the one frame time of the transmitted frames easily enables synchronization with the transmission timing of the transmitted frames. Furthermore, sending the average throughput for the constant period of time for each of the unit time t to the video coding device permits careful control in the video coding device.

According to a one-hundred-twenty-first aspect, in any of the thirty-sixth to the thirty-eighth, the forty-second to the forty-fifth, the forty-seventh to the forty-ninth, or the fifty-first to the fifty-third aspects, the video receiving device has the same function of coding to transmit videos as the video coding device does, and the bit number received without errors for the constant period of time, which is obtained, as each of the constant period of time passes, by accumulating the bit number received without errors for the unit time t equal to the least common multiple of the video frame period of the coded videos and the one frame time of the transmitted frames for the constant period of time, is sent to the video coding device as each of the constant period of time passes.

As stated above, according to the one-hundred-twenty-first aspect, taking the unit time t as the least common multiple of the transmission frame time and the period of videos easily enables synchronization with both of them. Furthermore, the bit number received without errors for the constant period of time can be calculated with simple processing, and the average throughput for each of the constant period of time can be obtained in the video coding device.

According to a one-hundred-twenty-second aspect, in any of the thirty-ninth, the forty-sixth, the fiftieth, the fifty-fourth, the sixty-fifth to the seventy-first, or the one-hundred-seventh to the one-hundred-eighth aspects, the video receiving device has the same function of coding to transmit videos as the video coding device does, and, as each of the constant period of time passes, by dividing by the constant period of time the bit number received without errors for the constant period of time, which is the result of accumulating the bit number received without errors for the unit time t equal to the least common multiple of the video frame period of the coded videos and the one frame time of the transmitted frames for the constant period of time, the average throughput for the constant period of time is transmitted to the video coding device as each of the constant period of time passes.

As stated above, according to the one-hundred-twenty-second aspect, taking the unit time t as the least common multiple of the transmission frame period and the period of videos easily enables synchronization with the both. Furthermore, the average throughput for the constant period of time can be calculated with simple processing, and the average throughput for each of the constant period of time can be obtained in the video coding device.

According to a one-hundred-twenty-third aspect, in any of the thirty-sixth to the thirty-eighth, the forty-second to the forty-fifth, the forty-seventh to the forty-ninth, or the fifty-first to the fifty-third aspects, the video receiving device has the same function of coding to transmit videos as the video coding device does, and the bit number received without errors for the constant period of time, which is the result of, as each of the unit time t equal to the least common multiple of the video frame period of the coded videos and the one frame time of the transmitted frames passes, accumulating the bit number received without errors for the unit time t between the constant period of time before the present time and the present time, is transmitted to the video coding device as each of the unit time t passes.

As stated above, according to the one-hundred-twenty-third aspect, taking the unit time t as the least common multiple of the transmission frame time and the period of videos easily enables synchronization with both of them, and by transmitting the bit number received without errors for the constant period of time for each of the unit time t to the video coding device, the average throughput can be obtained for each of the unit time t and careful control can be realized in the video coding device According to a one-hundred-twenty-four th aspect, in any of the thirty-ninth, the forty-sixth, the fiftieth, the fifty-fourth, the sixty-fifth to seventy-first, or the one-hundred-seventh to the one-hundred-eighth aspects, the video receiving device has the same function of coding to transmit videos as the video coding device does, and, as each of the unit time t equal to the least common multiple of the video frame period of the coded videos and the one frame time of the transmitted frames passes, by dividing by the constant period of time the bit number received without errors for the constant period of time, which is the result of accumulating the bit number received without errors for the unit time t between the constant period of time before the present time and the present time, the average throughput for the constant period of time is sent to the video coding device as each of the unit time t passes.

As stated above, according to the one-hundred-twenty-fourth aspect, taking the unit time t as the least common multiple of the transmission frame period and the period of videos easily enables synchronization with both of them, and transmitting the average throughput for the constant period of time to the video coding device for each of the unit time t enables careful control in the video coding device.

A one-hundred-twenty-fifth aspect of the present invention is directed to a data transmission system in which a coding device for coding to transmit data and a receiving device for applying certain processing to received data are connected so that they can communicate, wherein the receiving device transmits the bit number received without errors for the constant period of time T, which is the result of, as each of a predetermined constant period of time T passes, accumulating the bit number received without errors for a predetermined unit time t for the constant period of time T, to the coding device as each of the time T passes, and the coding device calculates the average throughput for the constant period of time T on the basis of the bit number received from the receiving device.

As stated above, according to the one-hundred-twenty-fifth aspect, the bit number received without errors for the constant period of time T can be calculated with simple processing, and the average throughput for each of the constant period of time T can be obtained in the coding device.

A one-hundred-twenty-sixth aspect of the present invention is directed to a data transmission system in which a coding device for coding to transmit data and a receiving device for applying certain processing to received data are connected so that they can communicate, wherein as a predetermined constant period of time T passes, by dividing by the constant period of time T the bit number received without errors for the constant period of time T, which is the result of accumulating the bit number received without errors for a predetermined unit time t for the constant period of time T, the receiving device calculates the average throughput for the constant period of time T as the predetermined constant period of time T passes.

As stated above, according to the one-hundred-twenty-sixth aspect, the average throughput for the constant period of time T can be calculated with simple processing.

A one-hundred-twenty-seventh aspect of the present invention is directed to a data transmission system in which a coding device for coding and transmitting data and a receiving device for applying certain processing to received data are connected so that they can communicate, wherein the receiving device transmits the bit number received without errors for a predetermined constant period of time T, which is the result of as each of the predetermined unit time t passes, accumulating the bit number received without errors for the unit time t between the predetermined constant period of time T before a present time and the present time, to the coding device as each of the predetermined unit time t passes, and the coding device calculates the average throughput for the constant period of time T on the basis of the bit number received from the receiving device.

As stated above, according to the one-hundred-twenty-seventh aspect, by transmitting the bit number received without errors for the constant period of time T to the coding device for each of the unit time t, the average throughput for each of the unit time t can be obtained in the coding device.

A one-hundred-twenty-eighth aspect of the present invention is directed to a data transmission system in which a coding device for coding to transmit data and a receiving device for applying certain processing to received data are connected so that they can communicate, wherein the receiving device divides as each of a predetermined unit time t passes, by a predetermined constant period of time T the bit number received without errors for the constant period of time T a, which is the result of accumulating the bit number received without errors for the unit time t between the predetermined constant period of time T before a present time and the present time, to calculate the average throughput for the constant period of time T as each of the unit time t passes.

As stated above, according to the one-hundred-twenty-eighth aspect, the average throughput for the constant period of time T can be calculated for each of the unit time t.

According to a one-hundred-twenty-ninth aspect, in any of the one-hundred-twenty-fifth to the one-hundred-twenty-eighth aspects, the unit time t is taken as a one frame time of the transmitted frames.

As stated above, in the one-hundred-twenty-ninth aspect, taking the unit time t as the data frame period of the coded data permits synchronization with the coding timing.

According to a one-hundred-thirtieth aspect, in any of the one-hundred-twenty-fifth to the one-hundred-twenty-eighth aspects, the receiving device has the same function of coding to transmit data as the coding device does, and takes the unit time t as the data frame period of the coded data.

As stated above, according to the one-hundred-thirtieth aspect, taking the unit time t as the one frame time of the transmit ted frames easily enables synchronization with the transmitting timing of the transmitted frames.

According to a one-hundred-thirty-first aspect, in any of the one-hundred-twenty-fifth to one-hundred-twenty-eighth aspects, the receiving device has the same function of coding to transmit data as the coding device does, and taking the unit time t as the least common multiple of the data frame period of the coded data and the one frame time of the transmitted frames.

As stated above, according to the one-hundred-thirty-first aspect, taking the unit time t as the least common multiplex of the transmission frame time and the period of data easily enables synchronization with both of them.

According to a one-hundred-thirty-second aspect, in the thirty-ninth aspect, when the video receiving device calculates the average throughput, the time for averaging is variable according to whether a burst error occurs or not.

As stated above, according to the one-hundred-thirty-second aspect, decreasing the time over which the average is obtained permits the quantization control quickly responsive to a change in throughput, and in the condition where burst type errors occur, setting the time over which the average is obtained larger than the cycle of the occurrence of the burst errors allows the quantization control to keep stable even with burst errors.

According to a one-hundred-thirty-third aspect, in the forty-sixth aspect, when the video receiving device calculates the average throughput, the averaging time is variable according to whether burst errors occur or not.

As stated above, according to the one-hundred-thirty-third aspect, decreasing the time over which the average is obtained permits the frame dropping control quickly responsive to a change in throughput, and in the condition where burst type errors occur, setting the time over which the average is obtained larger than the cycle of the occurrence of the burst errors allows the frame dropping control to keep stable even with burst errors.

According to a one-hundred-thirty-fourth aspect, in the fiftieth aspect, when the video receiving device calculates the average throughput, the time for averaging is variable according to whether burst errors occur or not.

As stated above, according to the one-hundred-thirty-fourth aspect, decreasing the time over which the average is obtained permits the quantization control and the frame dropping control quickly responsive to a change in throughput, and in the condition where burst type errors occur, setting the time over which the average is obtained larger than the cycle of the occurrence of the burst errors allows the quantization control to keep stable even with burst errors.

According to a one-hundred-thirty-fifth aspect, in the fifty-fourth aspect, when the video receiving device calculates the average throughput, the time for averaging is variable according to whether burst errors occur or not.

As stated above, according to the one-hundred-thirty-fifth aspect, decreasing the time over which the average is obtained permits the quantization control and the frame dropping control quickly responsive to a change in throughput, and in the condition where burst type errors occur, setting the time over which the average is obtained larger than the cycle of the occurrence of the burst errors allows the quantization control and the frame dropping to keep stable even with burst errors.

According to a one-hundred-thirty-sixth aspect, in any of the one-hundred-thirty-second to the one-hundred-thirty-fifth, a period in which the bit number received without errors for a predetermined unit time t is smaller than a predetermined threshold is detected, and taken as the averaging time for use in calculating the average throughput.

As stated above, according to the one-hundred-thirty-sixth aspect, taking the burst error cycle as the averaging time for use in obtaining the average throughput permits the stable quantization control and the frame dropping control toward burst errors.

According to a one-hundred-thirty-seventh aspect, in any of the one-hundred-thirty-second to one-hundred thirty-fifth, the period in which the bit number received without errors for the unit time t equal to the one frame time of the transmitted frames is smaller than the predetermined threshold is detected, and taken as the averaging time used for calculating the average throughput.

As stated above, according to the one-hundred-thirty-seventh aspect, taking the burst error cycle as the averaging time used for obtaining the average throughput permits the stable quantization control and the frame dropping control toward burst errors.

According to a one-hundred-thirty-eighth aspect, in any of the one-hundred-thirty-second to the one-hundred-thirty-fifth aspects, the video receiving device has the same function of coding and transmitting videos as the video coding device does, the period in which the bit number received without errors for the unit time t equal to the video frame period of the coded videos is smaller than the predetermined threshold is detected, and taken as the averaging time used for calculating the average throughput.

As stated above, according to the one-hundred-thirty-eighth aspect, taking the burst error cycle as the averaging time used for obtaining the average throughput permits the stable quantization control and the frame dropping control toward burst errors.

According to a one-hundred-thirty-ninth, in any of the one-hundred-thirty-second to the one-hundred-thirty-fifth aspects, the video receiving device has the same function of coding to transmit videos as the video coding device does, the period in which the bit number received without errors for the unit time t equal to a least common multiplex between the video frame period of the coded videos and the one frame time of the transmitted frames is smaller than the predetermined threshold is detected, and taken as the averaging time used for calculating the average throughput.

As stated above, according to the one-hundred-thirty-ninth aspect, taking the burst error cycle as the averaging time used for obtaining the average throughput permits the stable quantization control and the frame dropping control toward burst errors.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
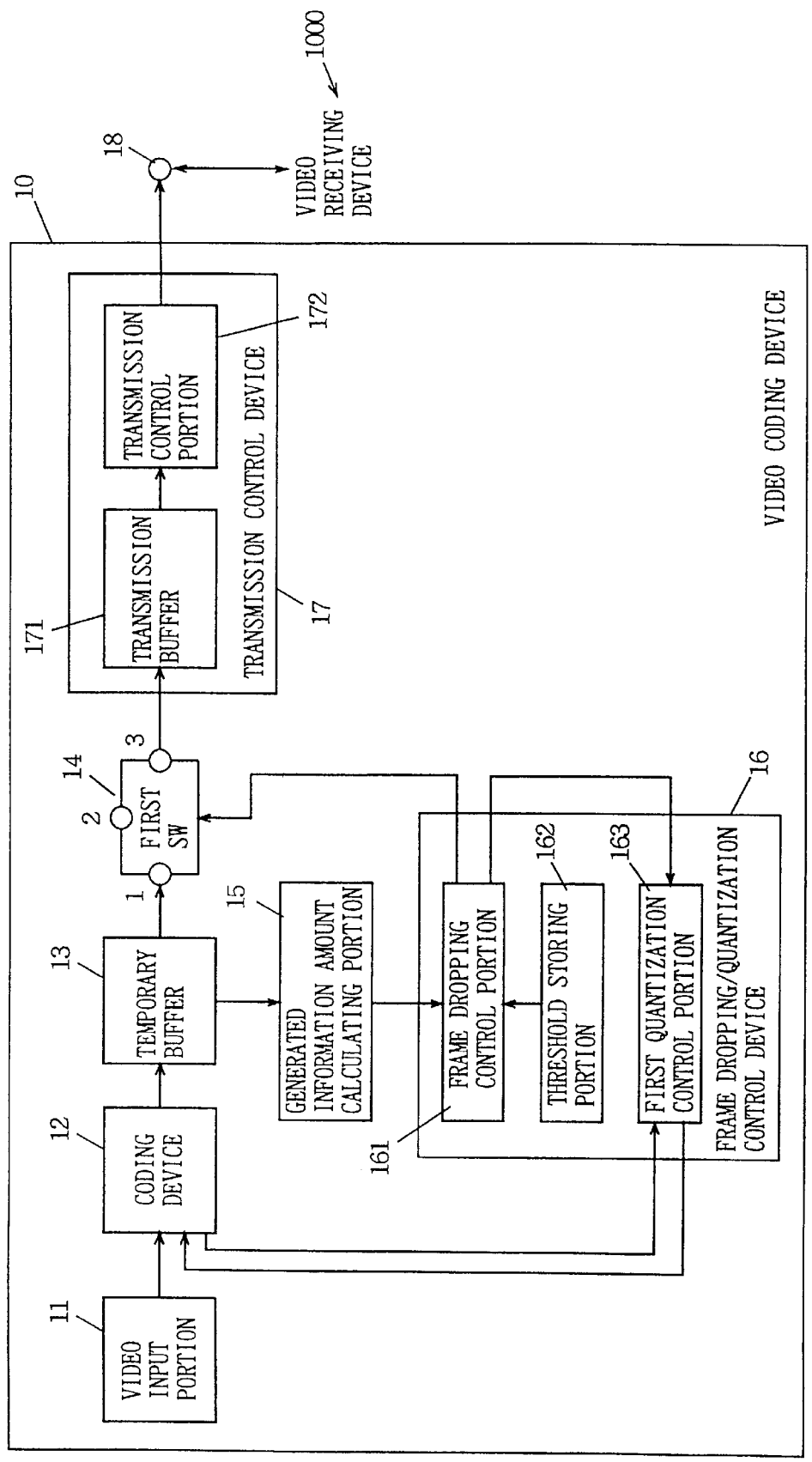
FIG. 1 is a block diagram showing the structure of an image coding device according to a first embodiment of the present invention.

FIG. 1 is a block diagram showing the structure of a video coding device according to a first embodiment of the present invention. In FIG. 1, the video coding device 10 includes a video input portion 11, a coding device 12, a temporary buffer 13, a first SW (switch) 14, a generated information amount calculating portion 15, a frame dropping/quantization control device 16, a transmission control device 17, and an output device 18. Furthermore, the frame dropping/quantization control device 16 includes a frame dropping control portion 161, a threshold storing portion 162 and a first quantization control portion 163. The transmission control device 17 includes a transmission buffer 171 and a transmission control portion 172.

The coding device 12 performs the same coding processing as the coding device 12 in the above-described first conventional example and also outputs the quantization step size used for the currently coded video frame to the first quantization control portion 163. The temporary buffer 13 is a buffer memory, which temporarily stores the video data coded in the coding device 12. The generated information amount calculating portion 15 calculates the amount of information of the video data from the temporary buffer storage pointer before storing the video data and the temporary buffer storage pointer after storing the video data. The temporary buffer storage pointer means an address indicating the write position of the video data into the temporary buffer 13. The frame dropping control portion 161 compares a predetermined threshold and the amount of information of the video data calculated in the generated information amount calculating portion 15. If the threshold is larger, it performs frame dropping of the video data in the temporary buffer 13. The threshold storage portion 162 is formed of memory, for example, which stores the threshold for determining whether to effect frame dropping of the video data in the temporary buffer 13. The first quantization control portion 163 controls the quantization step size according to the frame dropping information from the frame dropping control portion 161.

Figure 18:
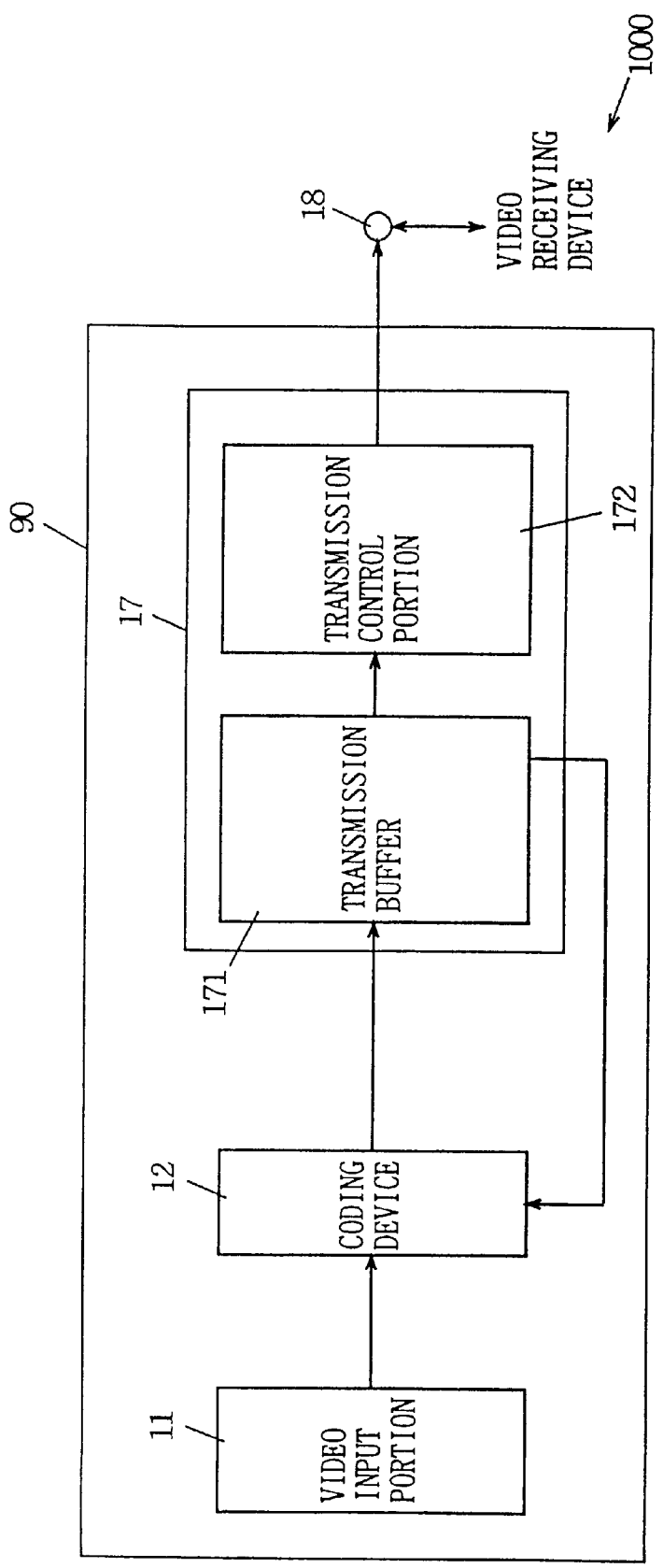
FIG. 18 is a block diagram showing an example of the structure of a conventional image coding device.
Figure 19:
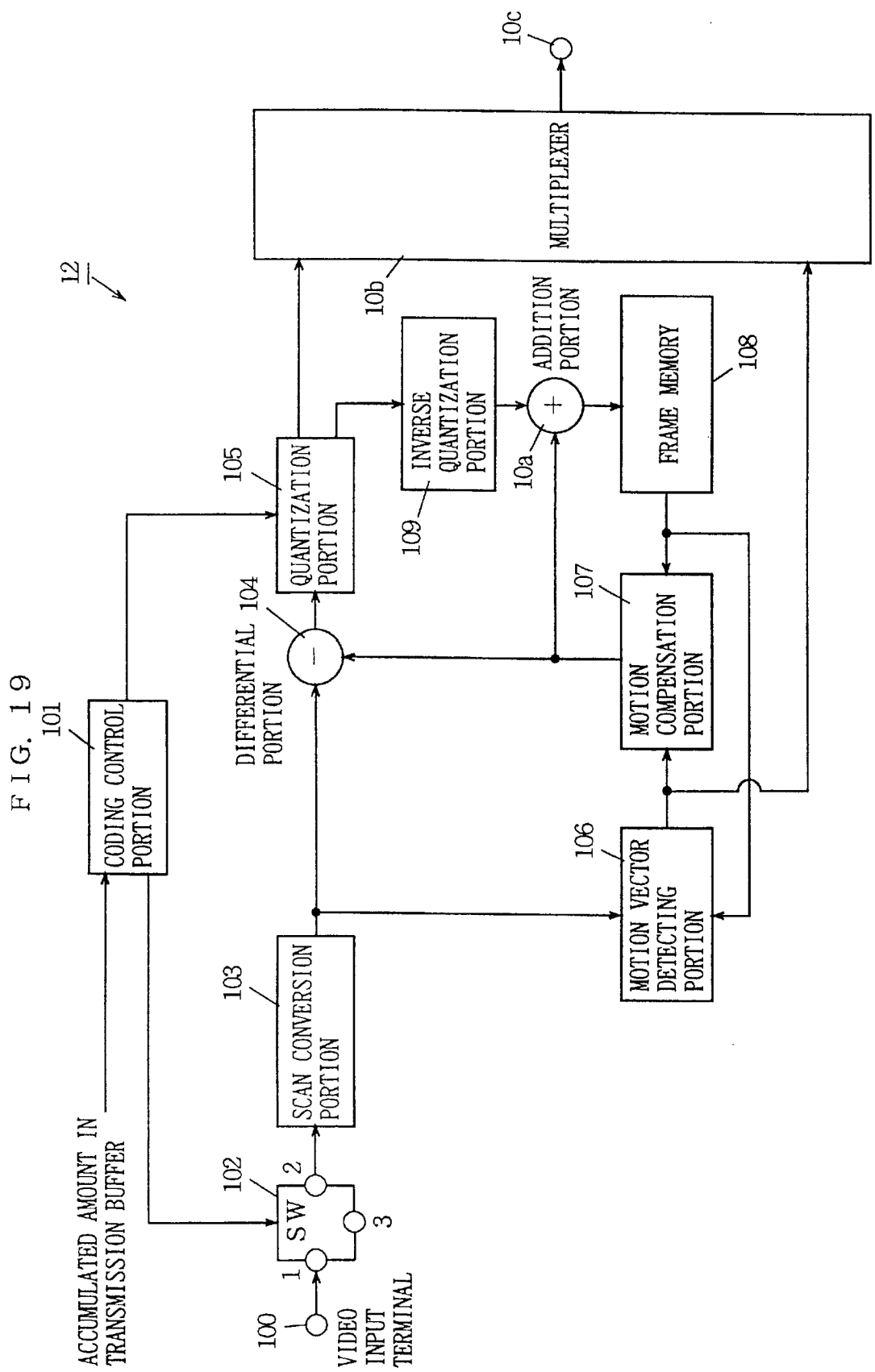
FIG. 19 is a block diagram showing an example of the structure of the coding device in FIG. 18.
Figure 20:
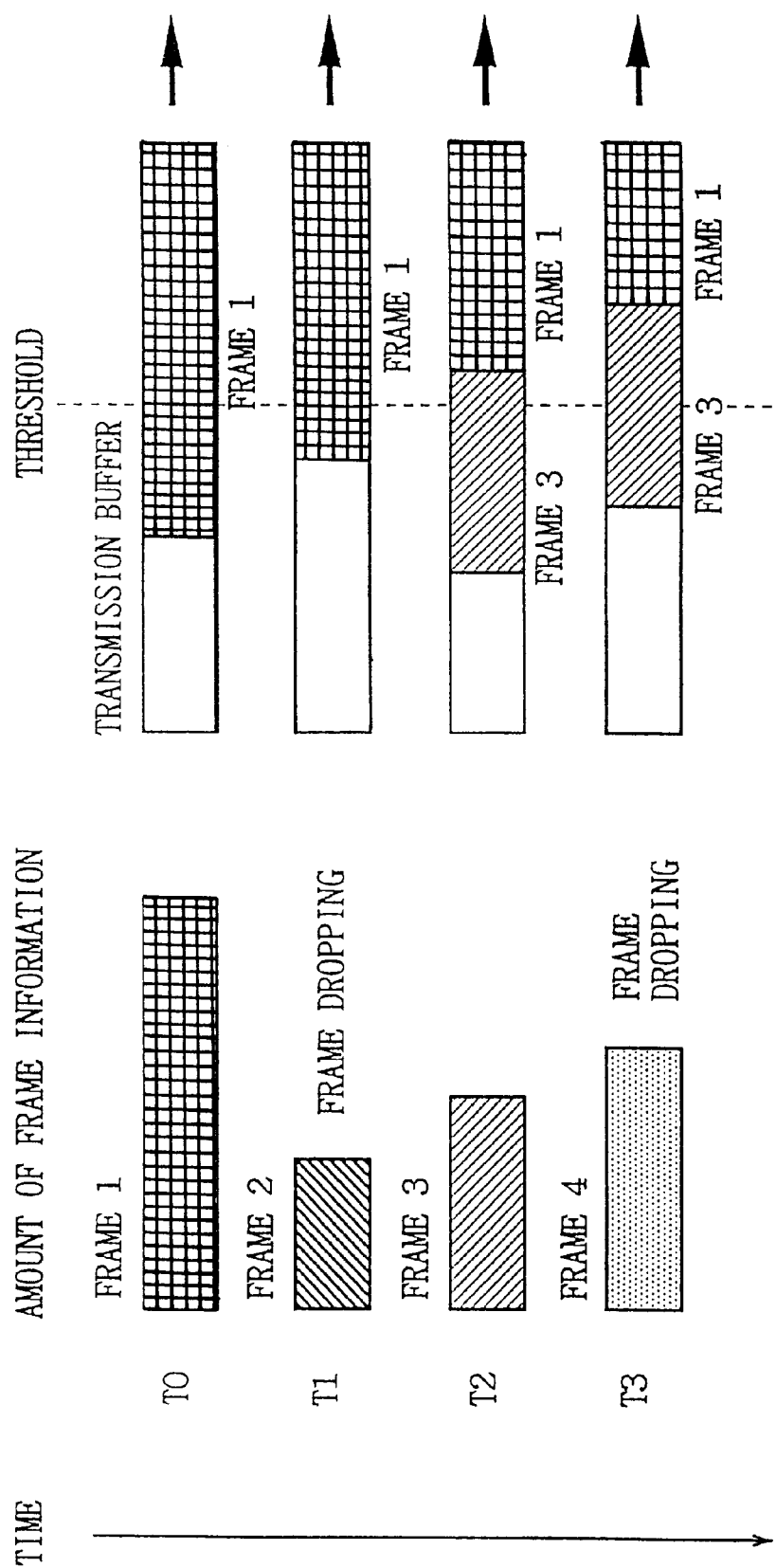
FIG. 20 is a sequence diagram for describing the conventional frame dropping control.

The video input portion 11 and the transmission control device 17 have the same structures and functions as the corresponding blocks in the first conventional example shown in FIG. 18, so that descriptions thereof are not repeated here.

Next, frame dropping control operation and quantization control operation in the video coding device shown in FIG. 1 will be described. Note that the coding operation, and the frame dropping control operation and the quantization control operation except when the amount of information rapidly increases are the same as those in the first conventional example, so that the frame dropping control operation and the quantization control operation when the amount of information rapidly increases only will be described here.

A video frame inputted from the video input portion 11 is coded in the coding device 12 and stored in the temporary buffer 13. The coding device 12 outputs the quantization step size used to quantize the video frame stored in the temporary buffer 13 to the first quantization control portion 163. The generated information amount calculating portion 15 calculates the amount of generated information for the video data in the temporary buffer 13 on the basis of the temporary buffer storage pointer before storage of the video data and the temporary buffer storage pointer after the video data storage and outputs it to the frame dropping control portion 161.

The frame dropping control portion 161 compares the amount of generated information of the video data in the temporary buffer 13 calculated in the generated information amount calculating portion 15 and the predetermined threshold stored in the threshold storing portion 162. If the threshold is larger, it switches the connection of the first SW 14 so that the devices 1–3 are connected. If the threshold is smaller, that is, when the amount of information rapidly increases, the frame dropping control portion 161 switches the connection of the first SW 14 to connect the devices 1–2 so that the video data in the temporary buffer 13 will not be transmitted. When the threshold is smaller, the frame dropping control portion 161 outputs a frame dropping signal indicating that frame dropping of the video data in the temporary buffer 13 is made to the first quantization portion 163.

On receiving the frame dropping signal from the frame dropping control portion 161, the first quantization control portion 163 sets a quantization step size with a quantization step size larger than that of the quantization step size (outputted from the coding device 12) used when coding the video frame to be dropped (the video frame in the temporary buffer 13) and outputs it to the coding device 12. The coding device 12 quantizes the video frame to be coded next with the quantization step size provided from the first quantization control portion 163.

Figure 2:
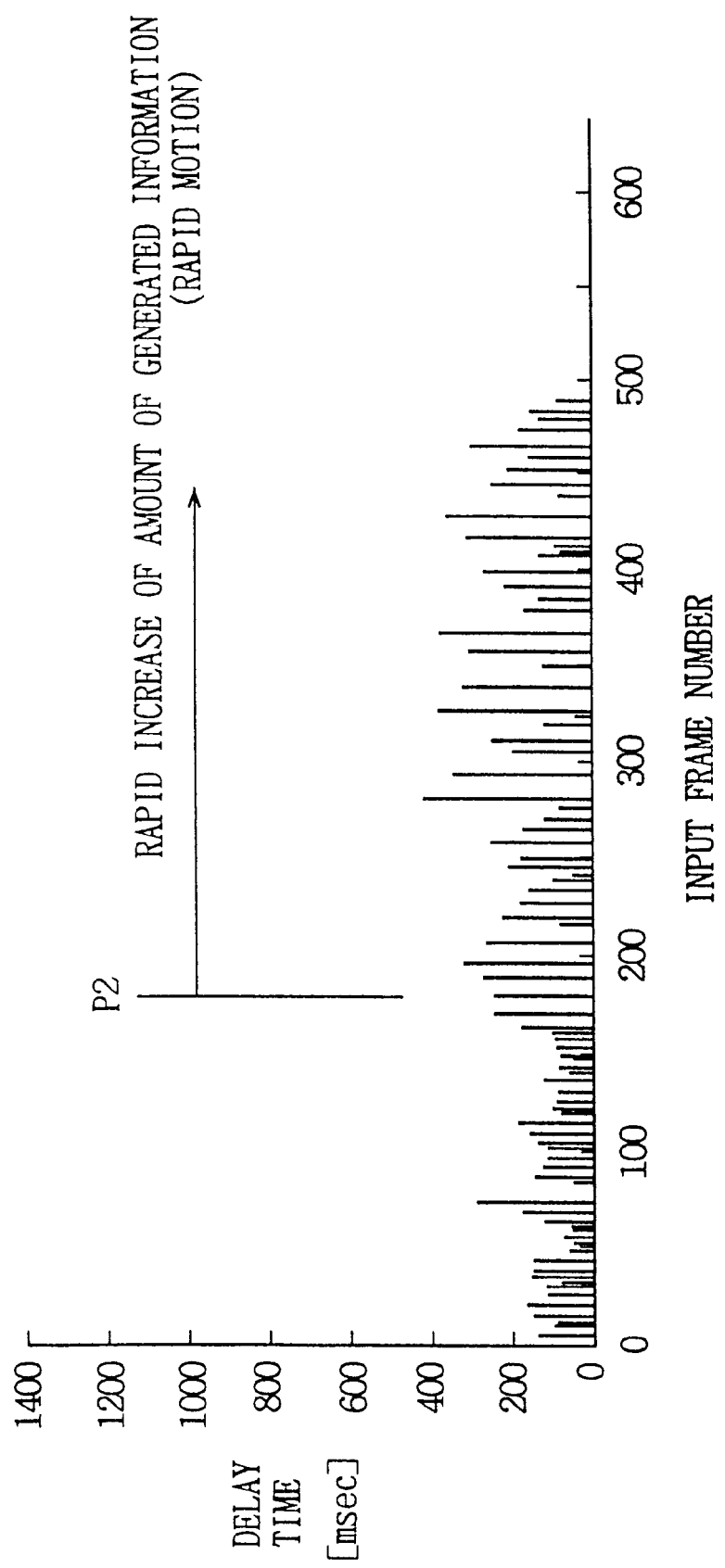
FIG. 2 is a diagram showing measurements of the delay time and the transmitted frame interval in the first embodiment of the present invention.

Next, referring to FIG. 2, the changes in delay time and frame jump will be described. FIG. 2 shows the measurements of the delay time and the transmission frame interval in the case where the frame dropping control and the quantization control are made by the video coding device 10 in the first embodiment, which particularly shows the relation between the delay time and the frame jump when the amount of generated information rapidly increases due to sudden movement of the object. In FIG. 2, the vertical axis shows the delay time and the horizontal axis shows the transmitted frame number. At the point P2, the video frame is first quantized with the quantization step size "2" and the amount of generated information exceeds the threshold. Then, frame dropping control is effected and the video frame coded next is quantized with the quantization step size "12". As a result, the delay time was 257 msec, and the number of jumped frames between the frame dropping control and the next coded video frame was 7 frames. This way, it is seen that the delay time and the frame jump number were both about one-fifth as compared with the conventional video coding device shown in FIG. 18.

As described above, according to the first embodiment, when the amount of generated information exceeds a predetermined threshold, that video frame is canceled and the next video frame is coded using a quantization step size with a larger quantization step size than the step size of the quantization step size used when coding that video frame. Thus, the delay time and the number of frame jump can be reduced to about one-fifth as compared with the conventional video coding device. Accordingly, on the receiving side, a smooth moving picture can be displayed with less delay and less frame jump.

Figure 3:
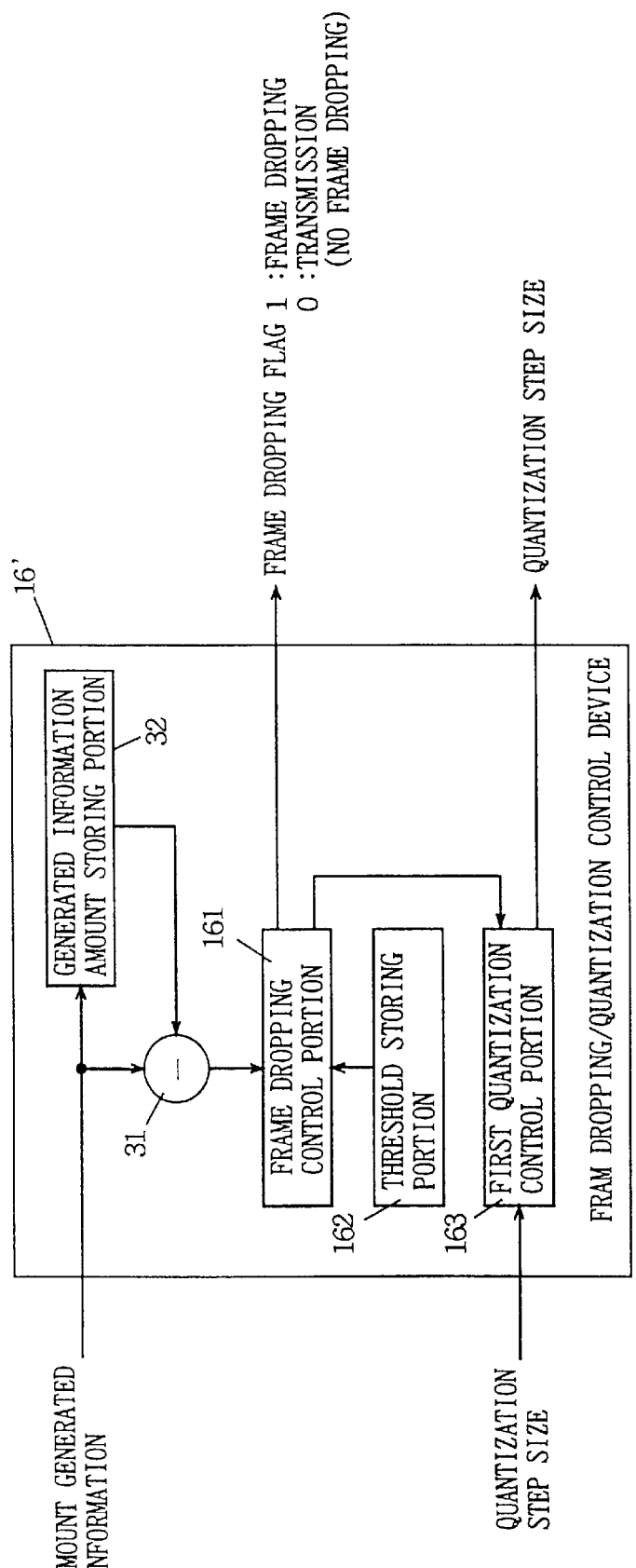
FIG. 3 is a block diagram showing another example of the structure of the frame dropping/quantization control device in the first embodiment of the present invention.

The frame dropping/quantization control device 16 in the first embodiment controls frame dropping and quantization on the basis of the amount of information of the video data in the temporary buffer 13. However, like the frame dropping/quantization control device 16' shown in FIG. 3, a generated information amount storing portion 32 for storing the amount of information of video data in the temporary buffer 13 and a differential portion 31 for taking a difference between the video data in the temporary buffer 13 and the amount of information stored in the generated information amount storing portion 32 may be newly added, and then frame dropping control and quantization control will be effected when the difference between the amount of generated information of the video frame coded in the previous time and the amount of generated information of the video frame to be transmitted this time is larger than the threshold.

In the frame dropping/quantization control device 16, the video frame may be divided into a priority area in which an object will be displayed and a non-priority area in which a background will be displayed, with a new function for setting the quantization step size for each area. Then, when frame dropping takes place, a quantization step size with a quantization step size larger than that of the quantization step size determined in the first quantization control portion 163 will be set for the non-priority area of the next video frame and provided to the coding device 12. Furthermore, in this case, when frame dropping takes place, for the non-priority area, the coding device 12 may be controlled not to perform coding operation and transmission operation, or high-frequency components of the input video may be eliminated with a prefilter, or low-frequency components of the DCT coefficient only may be coded.

Second Preferred Embodiment

Figure 4:
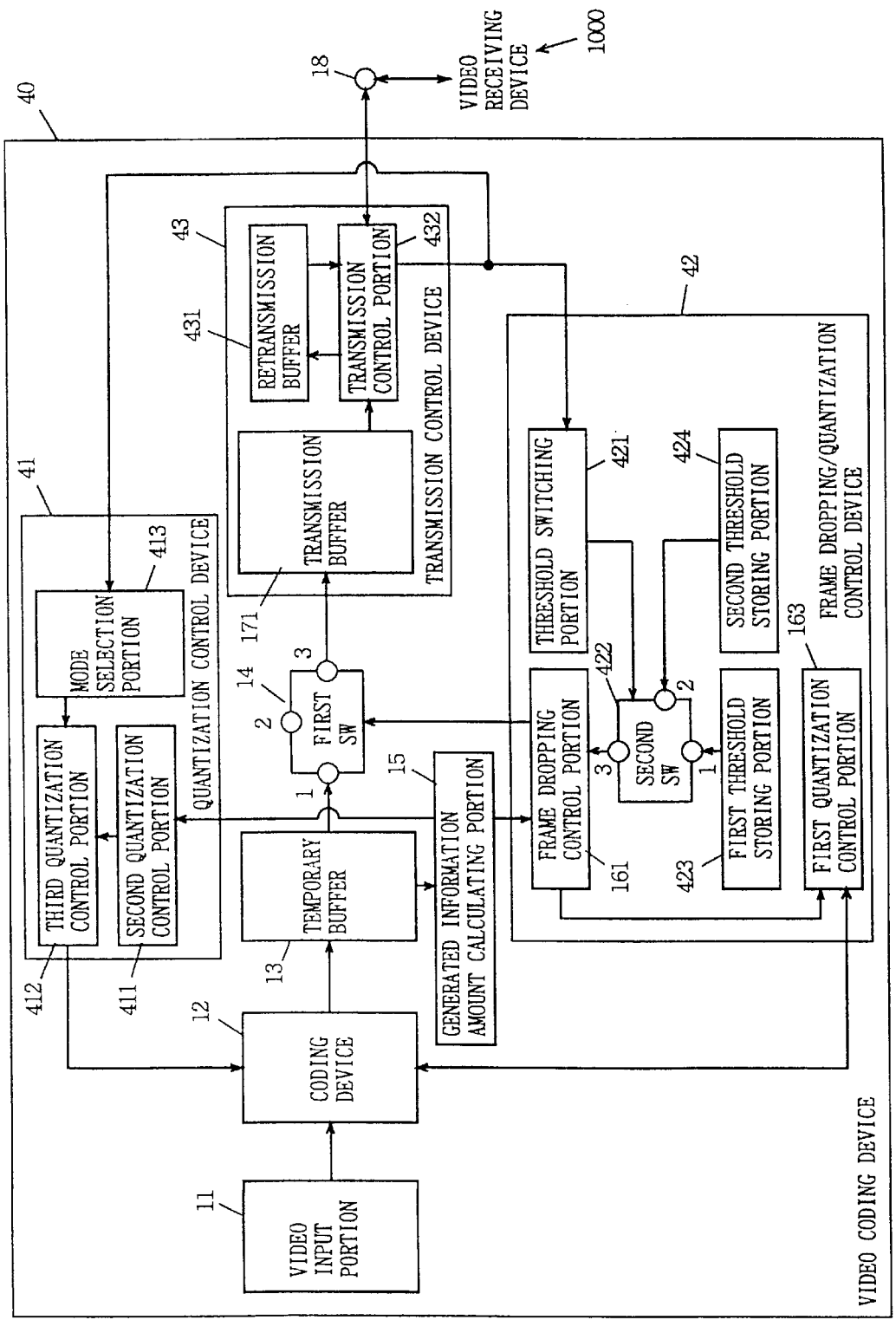
FIG. 4 is a block diagram showing the structure of an image coding device according to a second embodiment of the present invention.

FIG. 4 is a block diagram showing the structure of a video coding device according to a second embodiment of the present invention. In FIG. 4, the video coding device 40 includes a video input portion 11, a coding device 12, a temporary buffer 13, a first SW 14, a generated information amount calculating portion 15, a quantization control device 41, a frame dropping/quantization control device 42, a transmission control device 43 and an output device 18. Furthermore, the quantization control device 41 includes a second quantization control portion 411, a third quantization control portion 412 and a mode selection portion 413. The frame dropping/quantization control device 42 includes a frame dropping control portion 161, a threshold switching portion 421, a second SW 422, a first threshold storing portion 423, a second threshold storing portion 424 and a first quantization control portion 163. The transmission control device 43 includes a transmission buffer 171, a retransmission buffer 431 and a transmission control portion 432.

Operation of the coding device 12 is similar to that in the above-described first conventional example, but it is different in that it codes video frames using a quantization step size determined in the quantization control device 41 or in the frame dropping/quantization control device 42, the quantization step size determined in the frame dropping/quantization control device 42 having priority.

The second quantization control portion 411 performs the same quantization control (refer to FIG. 21) as described in the first conventional example above. The third quantization control portion 412 changes the quantization step size of the quantization step size set in the second quantization control portion 411 according to the condition of communication and outputs it to the coding device 12. The mode selection portion 413 determines an error free mode and an error mode according to the communication condition. The error free mode means that retransmission due to communication error has not been made in the transmission control device 43 over a predetermined constant period of time period and the error mode means that retransmission has been made in the predetermined constant period of time period.

The threshold switching portion 421 determines the error free mode and the error mode on the basis of the communication condition and switches the connection of the second SW 422. The first threshold storing portion 423, formed of memory, store s a threshold for determining whether to store the video data in the temporary buffer 13 in the transmission buffer 171 in the error free mode. The second threshold storing portion 424, formed of memory, stores a threshold for determining whether video data in the temporary buffer 13 should be stored in the transmission buffer 171 or not in the error mode. The threshold stored in the first threshold storing portion 423 has a larger value than the thresh old stored in the second threshold storing portion 424.

The retransmission buffer 431 is a buffer memory for storing video data under transmission. The transmission control portion 432 outputs the video data in the transmission buffer 171 at a predetermined transmission rate and stores the video data in transmission into the retransmission buffer 431. When it receives a retransmission request from the video receiving device 1000, it outputs the video data in the retransmission buffer 431 to the video receiving device 1000. It also outputs an error notice indicating the implementation of the retransmission to the mode selection portion 413 and the threshold switching portion 421.

Here, the procedure of the retransmission will be described briefly. The video receiving device 1000 outputs a retransmission request if received video data can not be decoded because of a communication error, or the like. The transmission control portion 432 transmits the video data in the retransmission buffer 431 to the video receiving device 1000 in response to the received retransmission request.

Since the video input portion 11 and the transmission buffer 171 have the same functions as corresponding blocks in the conventional video coding device shown in FIG. 18, the description is not repeated. The temporary buffer 13, the first SW 14, the generated information amount calculating portion 15, the frame dropping control portion 161 and the first quantization control portion 163 have the same functions as corresponding blocks in the first embodiment, and its description is not repeated here.

Figure 5:
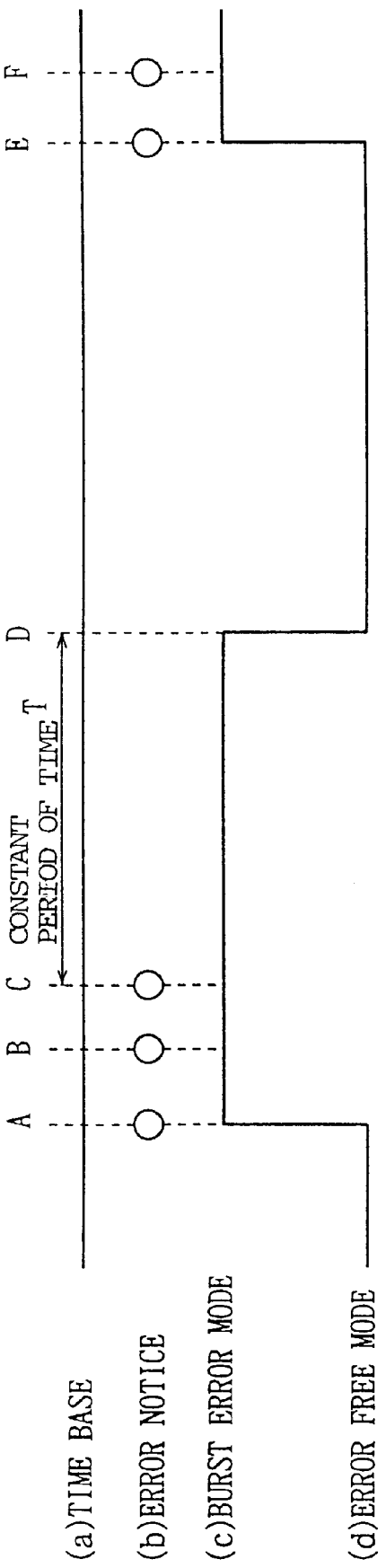
FIG. 5 is a timing chart showing the timing of state transition in the second embodiment of the present invention.

FIG. 5 is a timing chart showing the timing at which the mode selection portion 413 and the threshold switching portion 421 switch the operation mode to the error mode or the error free mode on the basis of the error notice from the transmission control portion 432. The character (a) in FIG. 5 shows the time base. The character (b) in FIG. 5 shows the timing at which the error notice is given to the mode selection portion 413 and the threshold switching portion 421. That is to say, it shows that a communication error took place and then the video receiving device 1000 could not decode received video data and made a retransmission request, and the transmission control portion 432 made retransmission in response to this retransmission request. The character (c) in FIG. 5 shows the timing at which the state changes to the error mode. The character (d) in FIG. 5 shows the timing at which the state changes to the error free mode.

Now, quantization control operation in the quantization control device 41 and threshold control operation in the frame dropping/quantization control device 42 at the points A to F in FIG. 5 will be described below. Coding operation in the coding device 12 and quantization control operation in the second quantization control portion 411 are not described because they are the same as those in the above-described first conventional example.

(Operation at the Point A in FIG. 5)

When a communication error takes place and the video receiving device 1000 transmits a retransmission request to the video coding device 40, the transmission control portion 432 outputs an error notice to the mode selection portion 413 and the threshold switching portion 421.

Receiving the error notice, the mode selection portion 413 outputs an identification signal indicating the error mode to the third quantization control portion 412. In response, the third quantization control portion 412 sets a quantization step size with a quantization step size larger than the quantization step size indicated by the quantization step size determined in the second quantization control portion 411 and outputs it to the coding device 12. After that, the third quantization control portion 412 operates in the error mode until it receives the identification signal indicating the error free mode from the mode selection portion 413. The coding device 12 quantizes the video frame using the quantization step size set in the third quantization control portion 412.

Receiving the error notice above, the threshold switching portion 421 switches the connection of the second SW 422 from the connection between the devices 1 and 3 to the connection between the devices 2 and 3. After that, the second SW 422 maintains this connection until switched by the threshold switching portion 421. The frame dropping control portion 161 compares the threshold stored in the second threshold storing portion 424 and the amount of information of the video data stored in the temporary buffer 13 to perform frame dropping control and quantization control similar to those in the first embodiment.

(Operation at the Points B, C in FIG. 5).

Like the operation at the point A, the transmission control portion 432 receives the retransmission request and then outputs the error notice to the mode selection portion 413 and the threshold switching portion 421.

Since the time width between the points A and B and the time width between the points B and C do not exceed the constant period of time T, the mode selection portion 413 outputs the identification signal indicating the error mode to the third quantization control portion 412. Accordingly, the third quantization control portion 412 operates in the same way as at the point A stated above. The frame dropping/quantization control device 42 also operates just as it did at the time A.

(Operation at the Point D in FIG. 5)

Since the mode selection portion 413 did not receive the error notice over a constant period of time T after reception of the error notice at the point C, it outputs the identification signal indicating the error free mode to the third quantization control portion 412. In response, the third quantization control portion 412 directly outputs the quantization step size determined in the second quantization control portion 411 to the coding device 12. Subsequently, the third quantization control portion 412 operates in the error free mode until receiving the identification signal indicating the error mode from the mode selection portion 413. Accordingly, the coding device 12 quantizes the video frame using the quantization step size set in the second quantization control portion 411.

Not receiving the error notice in the constant period of time T after reception of the error notice at the point C, the threshold switching portion 421 switches the connection of the second SW 422 from the connection between the devices 2 and 3 to the connection between the devices 1 and 3. Thus, the frame dropping control portion 161 compares the threshold stored in the first threshold storing portion 423 and the amount of the information of the video data stored in the temporary buffer 13 to perform frame dropping control and quantization control like in the first embodiment.

(Operation at the Point E in FIG. 5).

When a communication error occurs, the video receiving device 1000 transmits a retransmission request to the video coding device 40. The transmission control portion 432, receiving the retransmission request, outputs the error notice to the mode selection portion 413 and the threshold switching portion 421.

The mode selection portion 413, like at the time A in FIG. 5, outputs the identification signal indicating the error mode to the third quantization control portion 412. In response, the third quantization control portion 412 sets a quantization step size having a quantization step size larger than the quantization step size represented by the quantization step size determined in the second quantization control portion 411 and outputs it to the coding device 12.

The threshold switching portion 421, just like at the point A in FIG. 5, switches the connection of the second SW 422 from the connection between the devices 1 and 3 to the connection between the devices 2 and 3. Hence, the frame dropping control portion 161 performs the same frame dropping control and quantization control as in the first embodiment.

(Operation at the Point F in FIG. 5).

Since the time width between the points E and F does not exceed the constant period of time T, the mode selection portion 413 outputs the identification signal indicating the error mode to the third quantization control portion 412. The third quantization control portion 412 operates just as it did at the point E in FIG. 5. The frame dropping/quantization control device 42 also performs the same operation as at the point E.

This way, in the second embodiment, the transmission control portion 432 outputs the error notice indicating that a retransmission has been made to the quantization control device 41. When receiving the error notice in operation in the error free mode, the quantization control device 41 performs operation for the error mode, and when the interval of error notices attains the constant period of time T, it performs the operation for the error free mode. The quantization control device 41 thus can readily achieve quantization control according to the condition of the communication.

Also, according to the second embodiment, the frame dropping/quantization control device 42 switches the threshold for determining whether to store the video data in the temporary buffer 13 into the transmission buffer 171 according to the error notice indicating implementation of retransmission by the transmission control portion 432 and the error notice interval. This allows frame dropping control and quantization control suitable for the communication condition.

In the quantization control device 41, the video frame may be divided into a priority area in which an object will be displayed and a non-priority area in which a background will be displayed, with a new function provided for setting the quantization step size for each area. Then, in the error mode, a quantization step size with a quantization step size larger than that of the quantization step size determined in the third quantization control portion 412 will be set for the non-priority area and provided to the coding device 12. Or, in the error mode, the coding device 12 may be controlled not to perform coding operation and transmission operation for the non-priority area, or high-frequency components of the input video may be eliminated with a prefilter, or low-frequency components of the DCT coefficient only may be coded.

In the frame dropping/quantization control device 42, the video frame may be divided into a priority area and a non-priority area with a new function provided for setting the quantization step size for each area. Then when frame dropping takes place, the quantization step size for the non-priority area of the next video frame will be set to a quantization step size with a quantization step size larger than that of the quantization step size determined in the first quantization control portion 163 and provided to the coding device 12. Or, if frame dropping takes place, the coding device 12 may be controlled not to perform coding operation and transmission operation for the non-priority area, high-frequency components of the input video may be eliminated with a prefilter, or low-frequency components of the DCT coefficient only may be coded.

In the case in which the video frame is divided into the priority area and the non-priority area, when frame dropping takes place, the frame dropping/quantization control device 42 may make control to enlarge the range of the non-priority area.

In the case in which the video frame is divided into the priority area and the non-priority area, if frame dropping takes place, the frame dropping/quantization control device 42 may set the quantization step size for the non-priority area to a quantization step size with a quantization step size larger than that of the quantization step size used to code the non-priority area of the dropped video frame and provide it to the coding device 12.

Or, in the case in which the video frame is divided into the priority area and the non-priority area, if frame dropping takes place, the frame dropping/quantization control device 42 may control the coding device 12 so that it does not perform coding operation and transmission operation for the non-priority area, or high-frequency components of the input video may be eliminated by a prefilter, or low-frequency components of the DCT coefficient only may be coded.

Third Embodiment

Figure 6:
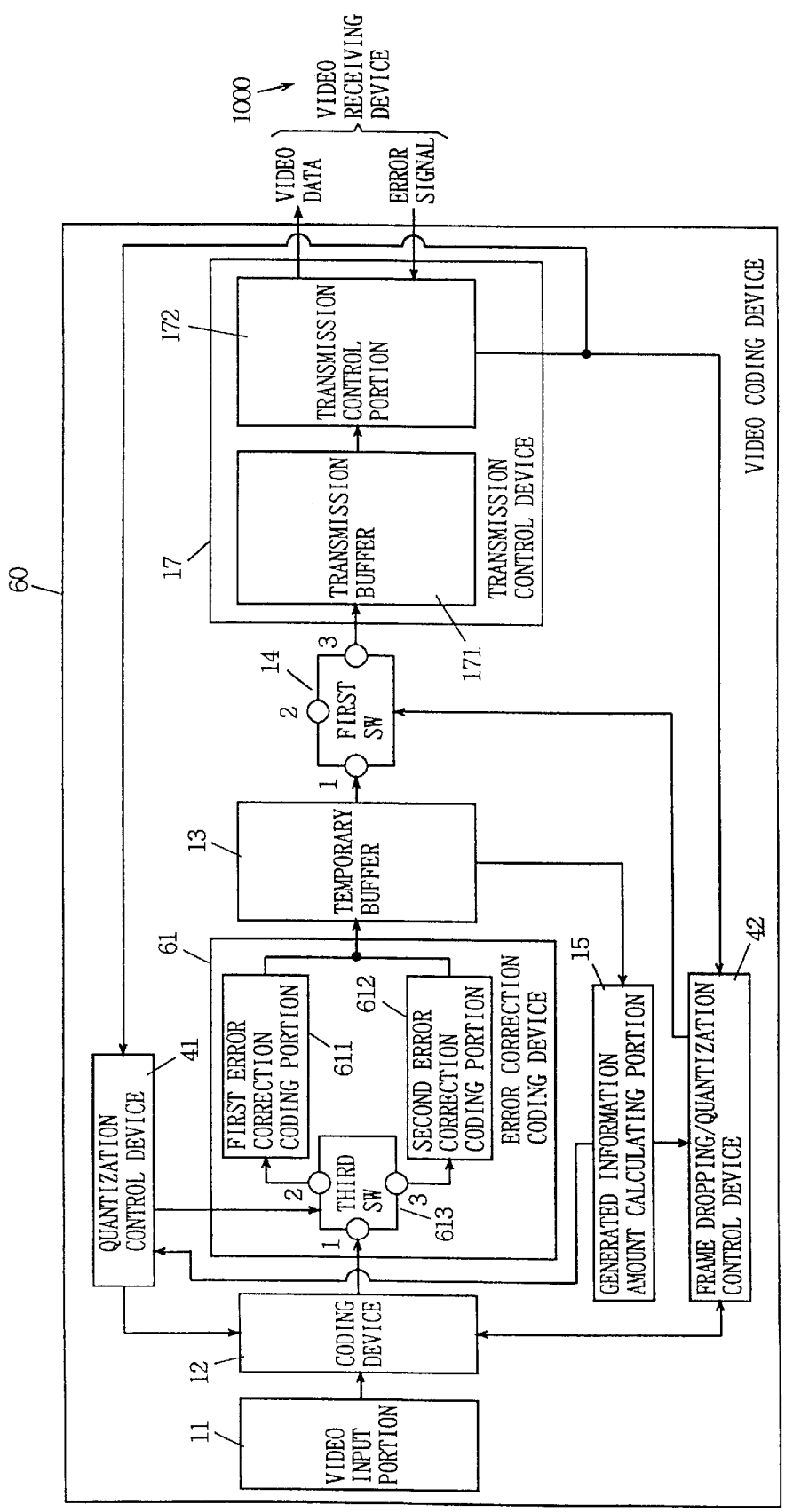
FIG. 6 is a block diagram showing the structure of an image coding device according to a third embodiment of the present invention.

FIG. 6 is a block diagram showing the structure of a video coding device according to a third embodiment of the present invention. In FIG. 6, the video coding device 60 includes a video input portion 11, a coding device 12, a temporary buffer 13, a first SW 14, a generated information amount calculating portion 15, a transmission control device 17, a quantization control device 41, a frame dropping/quantization control device 42, and an error correction coding device 61. Furthermore, the error correction coding device 61 includes a first error correction coding portion 611, a second error correction coding portion 612 and a second SW 613. The transmission control device 17 includes a transmission buffer 171 and a transmission control portion 172.

Receiving an error signal from the video receiving device 1000, the transmission control portion 172 outputs an error notice indicating the reception of the error signal to the quantization control device 41 and the frame dropping/quantization control device 42. The first error correction coding portion 611 adds an error correcting code with low error correcting capability to the video data coded in the coding device 12 and stores it in the temporary buffer 13. The second error correction coding portion 612 adds an error correcting code having error correcting capability higher than the error correcting code added in the first error correction coding portion 611 to the coded video data and stores it in the temporary buffer 13. The connection of the third SW 613 is switched by the quantization control device 41. The quantization control device 41, like the quantization control device 41 in the second embodiment (refer to FIG. 4), includes the second quantization control portion 411, the third quantization control portion 412 and the mode selection portion 413. Note that the mode selection portion 413 has a function of switching the connection of the third SW 613 according to the error free mode and the error mode.

The video input portion 11 and the transmission buffer 171 have the same structures and functions as the corresponding blocks in the first conventional example of FIG. 18, so that the description thereof is not repeated here. The coding device 12, the temporary buffer 13, the first SW 14, the generated information amount calculating portion 15, the frame dropping/quantization control device 42 have the same structures and functions as the corresponding blocks in the second embodiment, so that the description thereof is not repeated here.

Next, the operation of the video coding device 60 shown in FIG. 6 will be described. Note that the quantization control operation of the quantization control device 41 and the threshold control operation in the frame dropping/quantization control device 42 are the same as those in the second embodiment, so that the description thereof is not repeated here. The coding operation in the coding device 12 is the same as that in the first conventional example, and description thereof is not repeated. Accordingly, operation only in the case where the video coding device 60 receives the error signal will be described below.

Now, the video receiving device 1000 connected by wire or radio to the video coding device 60 has a function of calculating the error rate of received video data and also has a function of sending an error signal to the video transmission device if the calculated error rate is larger than a predetermined threshold. In the description of operation below, it is assumed that the error rate of video data is larger than the predetermined threshold.

In the above case, the video receiving device 1000 outputs the error signal to the video coding device 60. Receiving the error signal, the transmission control portion 172 in the video coding device 60 outputs an error notice indicating the receipt of the error signal to the quantization control device 41 and the frame dropping/quantization control device 42. Receiving the error notice, the quantization control device 41 makes a state transition from the error free mode to the error mode and performs the same quantization control as in the error mode in the second embodiment. Furthermore, the quantization control device 41 switches the connection of the third SW 613 so that the devices 1–3 are connected. Accordingly, the video frame inputted from the video input portion 11 is quantized with a quantization step size with a quantization step size larger than in the error free mode and provided with an error correcting code with high error correcting capability in the second error correction coding portion 612 and then outputted to the video receiving device 1000.

If the transmission control portion 172 did not receive the error signal from the video receiving device 100 over a predetermined time, that is, if the transmission control portion 172 did not provide the error notice to the quantization control device 41 over the predetermined time, the quantization control device 41 makes a transition in state from the error mode to the error free mode and performs quantization control similar to that in the error free mode in the second embodiment. Furthermore, the quantization control device 41 switches the connection of the third SW 613 to connect the devices 1 and 2. Hence, the video frame inputted from the video input portion 11 is quantized with a quantization step size with a smaller quantization step size than in the error mode and provided with an error correcting code with low error correcting capability in the first error correction coding portion 611 and then outputted to the video receiving device 1000.

This way, according to the third embodiment, in the error free mode, the quantization control device 41 performs normal quantization control and performs coding control to add an error correcting code with low error correcting capability, and in the error mode, it sets a quantization step size with a quantization step size larger than the quantization step size set in the error free mode (the amount of video data becomes less) and performs the coding control to add an error correcting code with high error correcting capability (the amount of the error correcting code becomes larger). Thus, coding control corresponding to the communication condition can be realized easily, and if the communication condition is deteriorated, the delay time until the moving picture is displayed in the video receiving device 1000 can be small.

Although the communication condition is determined on the basis of the error rate in the video receiving device 1000 in the third embodiment, it may be configured so that the video receiving device 1000 transmits the error rate to the video coding device 60 instead of the error signal, and the video coding device 60 determines the error mode or the error free mode on the basis of the magnitude of the received error rate. Or, the video coding device 60 may calculate an average of the error rate received from the video receiving device 1000 to determine the error mode or the error free mode on the basis of the calculated average error rate.

Or, the video receiving device 1000 may calculate the average of the error rate calculated in a predetermined constant period of time, and if the calculated average error rate exceeds a certain threshold, transmit the error signal to the video coding device 60, and then the video coding device 60 will perform the same operation as in the third embodiment on the basis of the received error signal.

Or, the video receiving device 1000 may transmit the calculated average error rate to the video coding device 60 and the video coding device 60 may perform the same operation as that in the third embodiment on the basis of the magnitude of the received average error rate.

In the quantization control device 41, the video frame may be divided into a priority area in which an object will be displayed and a non-priority area in which a background will be displayed with a new function provided for setting the quantization step size for each area. In this case, in the error mode, the quantization step size for the non-priority area is set to a quantization step size with a quantization step size larger than that of the quantization step size determined in the third quantization control portion 412 and sent to the coding device 12. Furthermore, in the error mode, for the non-priority area, the coding device 12 may be controlled not to perform coding operation and transmission operation, or the high-frequency components of the input video may be eliminated with a prefilter, or low-frequency components of the DCT coefficient only may be coded.

In the frame dropping/quantization control device 42, the video frame may be divided into a priority area and a non-priority area, with a new function provided to set the quantization step size for each area, then, when frame dropping takes place, the quantization step size for the non-priority area of the next video frame will be set to a quantization step size with a quantization step size larger than that of the quantization step size determined in the first quantization control portion 163 and provided to the coding device 12. Furthermore, the coding device 12 may be controlled not to perform coding operation and transmission operation for the non-priority area if frame dropping takes place, or the high-frequency components of the input video may be eliminated by a prefilter, or the low-frequency component of the DCT coefficient only may be coded.

In the case where the video frame is divided into the priority area and the non-priority area, when frame dropping takes place, the frame dropping/quantization control device 42 may make control to enlarge the range of the non-priority area.

Or, with the video frame divided into a priority area and a non-priority area, if frame dropping takes place, the frame dropping/quantization control device 42 may set the quantization step size for the non-priority area to a quantization step size with a quantization step size larger than that of the quantization step size used to code the non-priority area of the dropped video frame and provide it to the coding device 12.

Or, when the video frame is divided into the priority area and the non-priority area, if frame dropping takes place, for the non-priority area, the frame dropping/quantization control device 42 may control the coding device 12 so that it does not perform coding operation and transmission operation, or the high-frequency component of the input video may be omitted by a prefilter, or the low-frequency component of the DCT coefficient only may be coded.

Fourth Embodiment

Figure 7:
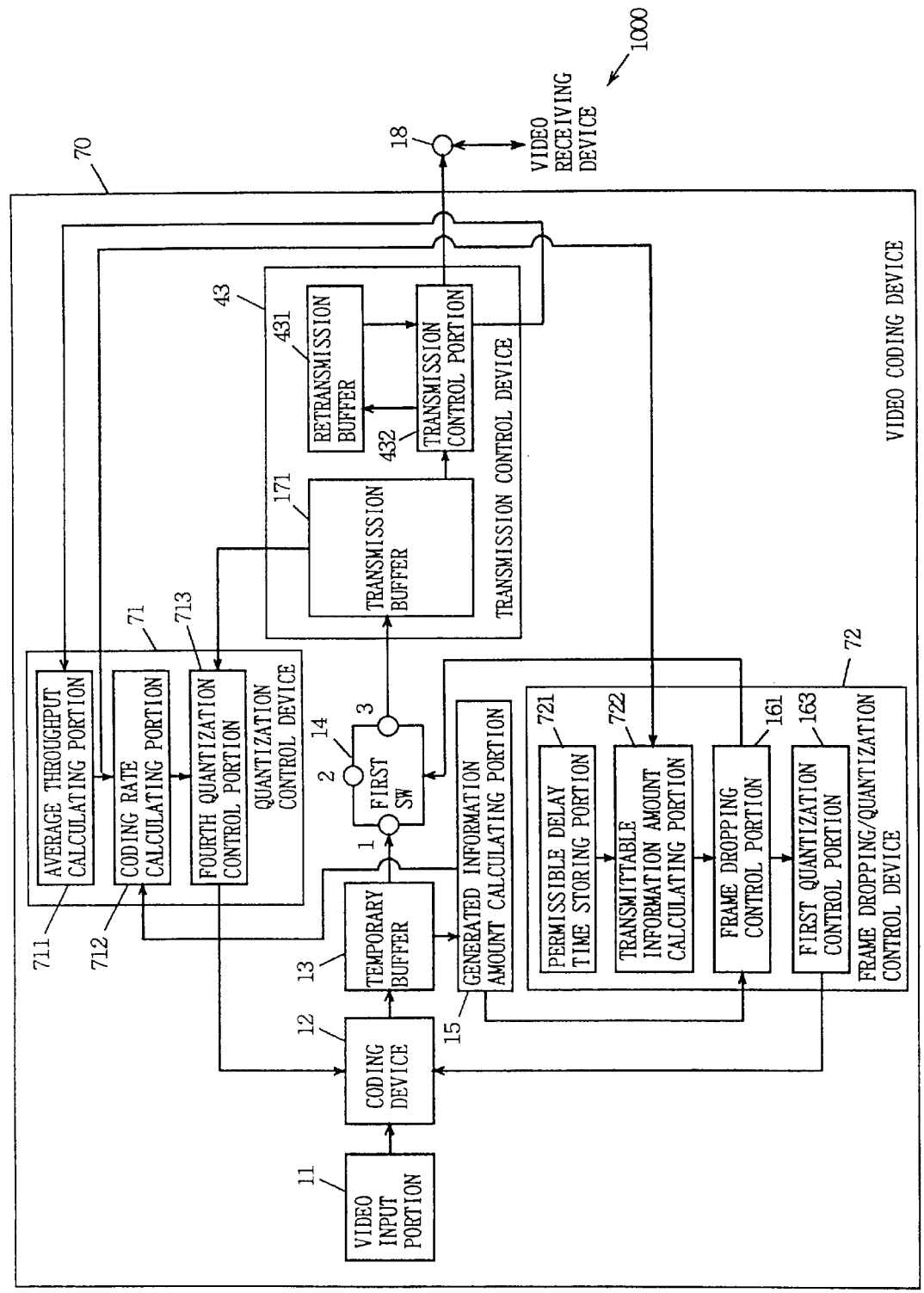
FIG. 7 is a block diagram showing the structure of an image coding device according to a fourth embodiment of the present invention.

FIG. 7 is a block diagram showing the structure of a video coding device according to a fourth embodiment of the present invention. In FIG. 7, the video coding device 70 includes a video input portion 11, a coding device 12, a temporary buffer 13, a first SW 14, a generated information amount calculating portion 15, a quantization control device 71, a frame dropping/quantization control device 72, a transmission control device 43, and an output device 18. Furthermore, the quantization control device 71 includes an average throughput calculating portion 711, a coding rate calculating portion 712 and a fourth quantization control portion 713. The frame dropping/quantization control device 72 includes a permissible delay time storing portion 721, a transmittable information amount calculating portion 722, a frame dropping control portion 161, and a first quantization control portion 163. The transmission control device 43 includes a transmission buffer 171, a retransmission buffer 431 and a transmission control portion 432.

The coding device 12 operates as described in the first conventional example, but it differs in that it codes a video frame using a quantization step size determined in the quantization control device 71 or in the frame dropping/quantization control device 72, and in that it determines the video frame to be coded in response to the notice form the quantization control device 71, where the quantization step size determined in the frame dropping/quantization control device 72 has priority.

The average throughput calculating portion 711 receives the bit number read from the transmission buffer 171 in a predetermined unit time t from the transmission control portion 432 and calculates the throughput in the constant period of time T as the average throughput. The average throughput calculating method may be a method shown in an eleventh embodiment described later. The coding rate calculating portion 712 calculates the coding rate which is a rate of frames transmittable per unit time on the basis of the average throughput and the amount of generated information per one frame. The fourth quantization control portion 713 performs the same quantization control as in the first conventional example (refer to FIG. 21), using the coding rate calculated from the average throughput when determining the quantization step size of the next video frame. However, the fourth quantization control portion 713 sends a notice to the coding device 12 to perform one frame coding when the remaining amount of data in the transmission buffer 17 is smaller than a certain threshold. The coding device 12 which receives the notice codes an input video at that time with the quantization step size determined by the quantization control device 71 or the frame dropping/quantization control device 72, and continues to perform frame dropping until again receiving the notice from the quantization device 71 that the remaining amount of data in the transmission buffer 171 is smaller than the threshold.

The permissible delay time storing portion 721 stores the maximum delay time permitted in view of the gap between video and sound, for example, when a moving picture is displayed in the video receiving device 1000. The transmittable information amount calculating portion 722 calculates the number of bits transmittable in the maximum permissible delay time stored in the permissible delay time storing portion 721. The frame dropping control portion 161 compares the number of bits calculated in the transmittable information amount calculating portion 722 and the amount of information of video data calculated in the generated information amount calculating portion 15. If the number of bits calculated in the transmittable information amount calculating portion 722 is larger, it performs frame dropping of the video data in the temporary buffer 13. The transmission control portion 432 performs the same operation as the transmission control portion 432 in the second embodiment except that it outputs the bit number read from the transmission buffer 171 in the predetermined unit time t to the quantization control device 71.

The video input portion 11 and the transmission buffer 171 have the same structures and functions as the corresponding blocks in the first conventional example shown in FIG. 18, so that the description thereof is not repeated here. The temporary buffer 13, the first SW 14, the generated information amount calculating portion 15, the frame dropping control portion 161, the first quantization control portion 163 and the retransmission buffer 431 have the same structures and functions as the corresponding blocks in the second embodiment, which are not explained here.

First, operation in the quantization control device 71 will be described. The generated information amount calculating portion 15 calculates the amount of information of the video data stored in the temporary buffer 13 and outputs it to the coding rate calculating portion 712 and the frame dropping control portion 161. The transmission control portion 432 calculates the number of bits read from the transmission buffer 171 in the predetermined unit time t and outputs it to the average throughput calculating portion 711. The average throughput calculating portion 711 calculates the average throughput in the constant period of time T on the basis of the number of bits outputted from the transmission control portion 432 and outputs it to the coding rate calculating portion 712 and the transmittable information amount calculating portion 722.

The coding rate calculating portion 712 calculates the coding rate from the average throughput and the amount of information in the temporary buffer 13 using the expression (1) and outputs it to the fourth quantization control portion 713.

$$\text{Coding rate} = (LN/S)/RN \qquad (1)$$

In the expression (1) above,

LN: average throughput,

S: the number of frame sampling per second, and

RN: the amount of information in the temporary buffer 13.

The fourth quantization control portion 713 performs the same quantization control as in the first conventional example (refer to FIG. 21) using the calculated coding rate and outputs the determined quantization step size to the coding device 12. At this time, if the time for measuring the average throughput LN is 300 msec or longer, burst error of the PHS can be well averaged. However, the frame to be coded is determined on the basis of the remaining amount of the data in the transmission buffer 171, which differs from that in the first conventional example.

Next, operation in the frame dropping/quantization control device 72 will be described. The transmittable information amount calculating portion 722 calculates the amount of transmittable information which is transmittable in the maximum permissible delay time on the basis of the average throughput in the constant period of time T calculated in the average throughput calculating portion 711 and the maximum permissible delay time in the permissible delay time storing portion 721 and outputs it to the frame dropping control portion 161. The frame dropping control portion 161 compares the amount of the transmittable information and the video data in the temporary buffer 13, and if the amount of the transmittable information is larger, it sets the connection of the first SW 14 so that the devices 1 and 3 are connected. Thus, the video data in the temporary buffer 13 is stored in the transmission buffer 171 and transmitted by the transmission control portion 432.

If the amount of transmittable information is smaller than the video data in the temporary buffer 13, that is, if the video data in the temporary buffer 13 can not be displayed in the video receiving device 1000 within the maximum permissible delay time, the frame dropping control portion 161 sets the connection of the first SW 14 so that the devices 1–2 are connected and effects frame dropping of the video data in the temporary buffer 13. Furthermore, the frame dropping control portion 161 outputs a frame dropping signal indicating the implementation of frame dropping of the video data in the temporary buffer 13 to the first quantization portion 163. The first quantization control portion 163, receiving the frame dropping signal from the frame dropping control portion 161, sets a quantization step size with a larger quantization step size than that of the quantization step size used when coding the video frame to be dropped (the video frame in the temporary buffer 13) like in the first embodiment, outputs it to the coding device 12, and notifies the coding device 12 to immediately code the next video frame.

This way, according to the fourth embodiment, since a quantization step size for the next coding is determined using a coding rate obtained from the average throughput in a predetermined constant period of time, the most suitable quantization step size corresponding to the communication condition can be determined even if the throughput changes due to retransmission, and the like.

Furthermore, the amount of information transmittable in a permissible delay time is calculated on the basis of the predetermined permissible delay time and the average throughput and the calculated amount of th e information is used as a threshold for determining whether to make frame dropping of the video frame in the temporary buffer 13. This allows frame dropping control corresponding to the communication condition.

Since the average throughput is calculated on the basis of the bit number read from the transmission buffer 171, either Go-back-N or Selective Reject can be adapted as a retransmission method. Moreover, since the control of buffer is also used, the stable coding control can be achieved without failure even in the transient condition where the transmission rate changes.

The quantization control device 71 and the frame dropping/quantization control device 72 may be independently used by combining other devices shown in FIG. 7. A curve in which the frame rate is always constant or a curve in which the quantization step size is always constant may be used as an ideal curve in the quantization control portion 713 in the quantization control device 71. The quantization step size may be determined by using a table combining the coding rate and the quantization step size as a control algorithm of the fourth quantization control portion 713 in the quantization control device 71. Or, the quantization step size may be determined so that the frame rate is constant and operated with the ideal curve by the equation on the basis of the remaining amount of data in the transmission buffer 171 or the coding rate .

Figure 8:
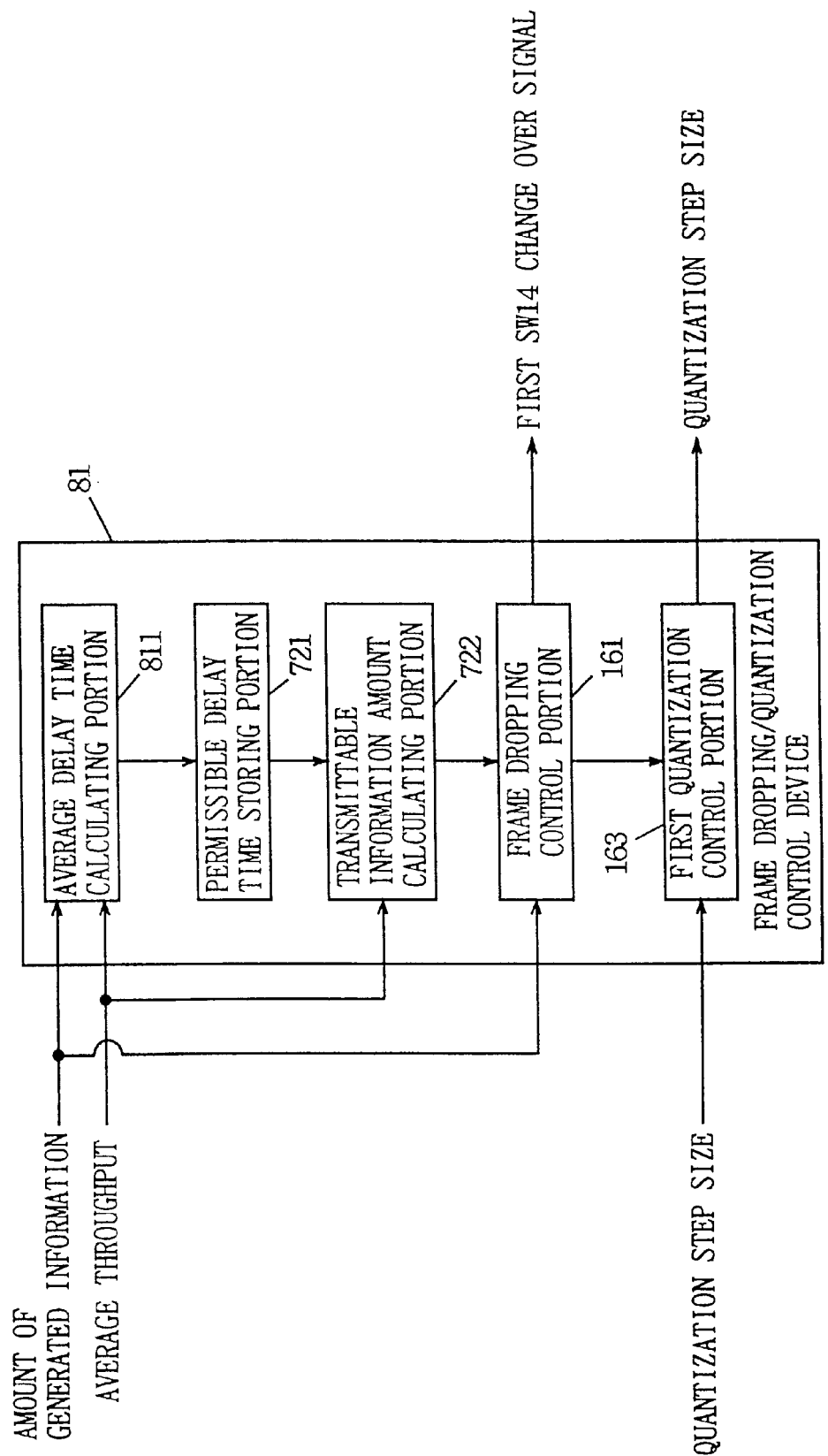
FIG. 8 is a block diagram showing another example of the structure of the frame dropping/quantization control device in the fourth embodiment of the present invention.

The frame dropping/quantization control device 72 in the fourth embodiment previously sets the maximum permissible delay time. However, like the frame dropping/quantization control device 81 in FIG. 8, an average delay time calculating portion 811 for calculating the average delay time from the mean amount of the generated information of video frame transmitted in a constant period of time and the aver age throughput at that time may be provided so that the frame dropping control of the video frame in the temporary buffer 14 above can be accomplished with the average delay time calculated in the average delay time calculating portion 811 substituted for the maximum permissible delay time.

In the quantization control device 71, the video frame may be divided into a priority area in which an object will be displayed and a non-priority area in which a background will be displayed with a new function provided to set the quantization step size for each area. In this case, if the coding rate exceeds a predetermined threshold, the coding device 12 may be controlled not to perform coding operation and transmission operation for the non-priority area, or the high-frequency component of the input video may be omitted with a prefilter, or the low-frequency component of the DCT coefficient only may be coded.

Or, in the frame dropping/quantization control device 72, with the video frame divided into a priority area and a non-priority area and a new function provided for setting the quantization step size for each area, a quantization step size for the non-priority area of the next video frame may be set to a quantization step size with a quantization step size larger than than of the quantization step size determined in the first quantization control portion 163 and provided to the coding device 12 in the case of frame dropping. Furthermore, the coding device 12 may be controlled not to perform coding operation and transmission operation for the non-priority area when frame dropping takes place, or the high-frequency components of the input video may be eliminated by a prefilter, or the low-frequency components of the DCT coefficient only may be coded.

In the case where the video frame is divided into the priority area and the non-priority area, when frame dropping takes place, the frame dropping/quantization control device 42 may perform control to enlarge the range of the non-priority area.

Although the average throughput in the predetermined constant period of time T is calculated in the fourth embodiment, the time T for obtaining the average may be variable according to the error condition of the communication path. Shortening the time T for obtaining the average enables quick response to a change in throughput to perform quantization control and frame dropping control. However, under the conditions where burst type errors periodically occur on the communication path, if control is made using an average in an extremely short time, the average throughput value largely decreases when a burst error occurs, and otherwise the average throughput value becomes large, and control is not stabilized. According to "Improvement Techniques of Picture Coding Quality Deteriorations for Mobile Communications (Hisashi IBARAKI, et al., Society of Video Electronics, vol.23, No.5 (1994), pp.445–453), when the Doppler frequency is constant, the burst error periodically occurs 0.35 times more than the Doppler frequency. In such a case, taking the section in which the bit number read from the transmission buffer 171 in the unit time t is smaller than a certain threshold as a burst error section, detecting the period by measuring intervals at which the burst error section occurs, and obtaining the mean value taking the period as a time T provide stable quantization control and frame dropping control which do not go unstable even when a burst error occurs. In this situation, the operation becomes more stable if the period is obtained by averaging the interval at which a plurality of burst error sections occur.

Further, when the interval at which the burst error section occurs exceeds a certain length, it is determined that there is no burst error, and when the time T for obtaining the average, the change of the throughput is immediately responded.

While the fourth embodiment shows the structure in which the average throughput calculating portion 711 is included in the quantization control device 71, a structure may be adapted in which the average throughput calculating portion 711 is included in the transmission control device 43. Furthermore, there may be a structure in which the average is not calculated in the average throughput calculating portion 711, taking the unit time t as the same as the time T for obtaining the average.

The video data outputted from the transmission control portion 432 through the output device 18 may be multiplexed by sound and other data and transmitted to the video receiving device 1000. In this case, the transmission rate of the video data outputted from the transmission control portion 432 changes according to the multiplexing ratio. That is, the throughput of the video data changes according to not only the condition where the errors occur but also whether the sound and other data for multiplexing occur. Also in this situation, since the throughput can be known once the amount of data read from the transmission buffer 432 is known, this invention can have the same effect.

Fifth Embodiment

Figure 9:
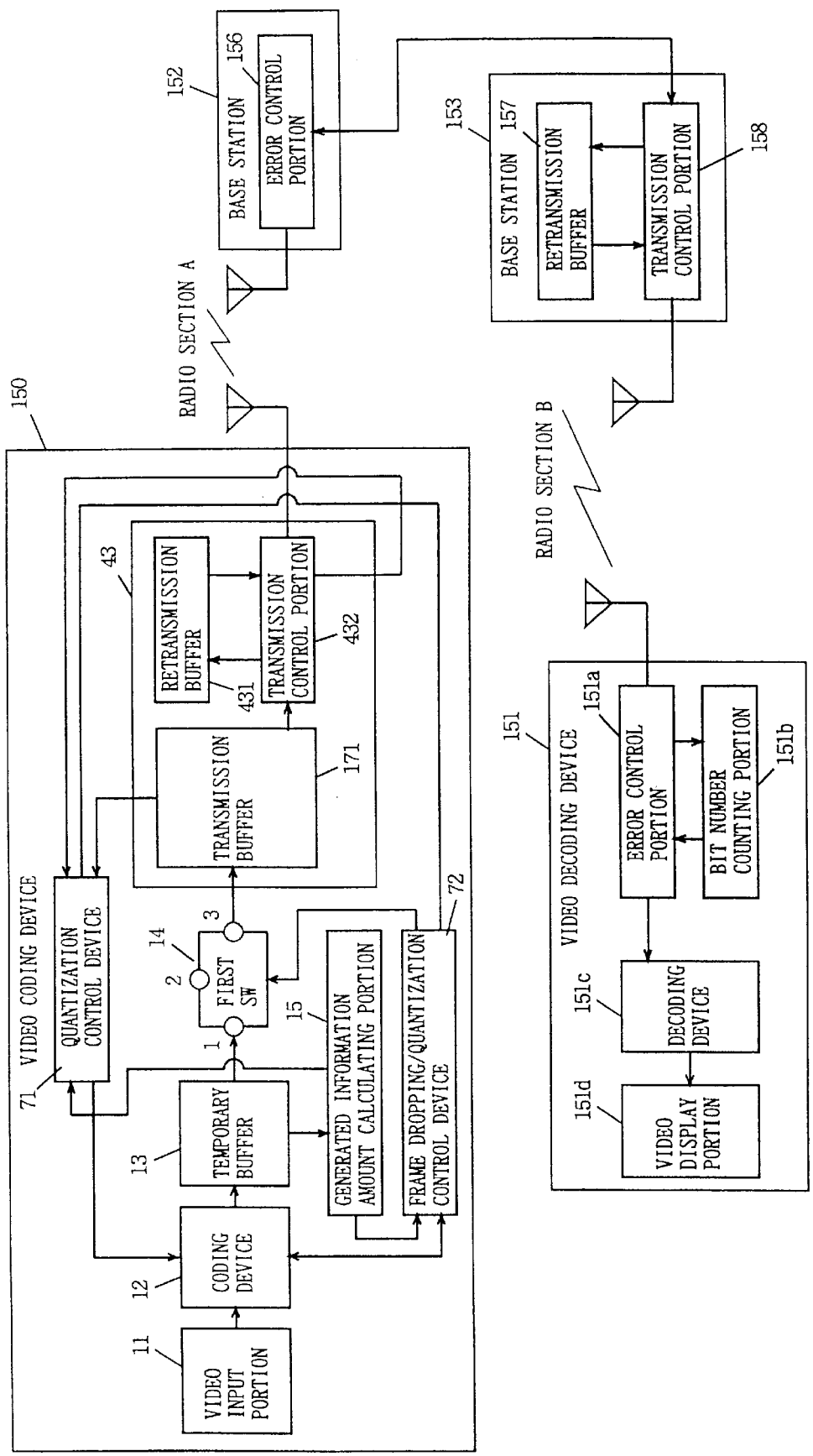
FIG. 9 is a block diagram showing the structure of an image transmission system according to a fifth embodiment of the present invention.

FIG. 9 is a block diagram showing the structure of a video transmission system according to a fifth embodiment of the present invention. In FIG. 9, the video coding device 150 and the video decoding device 151 are connected to base stations 152 and 153 by radio, respectively. The base stations 152 and 153 are connected by wire, The situation is considered in which the control of retransmission described in the second embodiment is made in the radio section A (between the video coding device 150 and the base station 152) and the radio section B (between the base station 153 and the video decoding device 151).

The structure of the video coding device 150 is almost the same as that of the video coding device 70 (refer to FIG. 7) in the fourth embodiment. The base station 152 includes an error control portion 156. The base station 153 includes a retransmission buffer 157 and a transmission control portion 158. The video decoding device 151 includes an error control portion 151a, a bit counting portion 151b, a decoding device 151c and a video display portion 151d.

The video coding device 150 transmits coded data to the base station 152 and also stores the transmitted data in the retransmission buffer 431. The error control portion 156 of the base station 152 performs error detection of the data block received from the video coding device 150. If it detects an error, it makes a retransmission request for the data block of the error to the video coding device 150.

When the retransmission request is made from the base station 152, the transmission control portion 432 of the video coding device 150 retransmits the corresponding data block in the retransmission buffer 431.

The transmission control portion 158 of the base station 153 transmits data received from the base station 152 to the video decoding device 151 and also stores the transmitted data block in the retransmission buffer 157. The error control portion 151a in the video decoding device 151 makes error detection of the data block received from the base station 153, and if it detects an error, it makes a retransmission request for the error data block to the base station 153. When the retransmission request is made from the video decoding device 151, the transmission control portion 158 of the base station 153 retransmits the corresponding data block in the retransmission buffer 157. The video decoding device 151 decodes the correctly received data in the decoding device 151c and displays it in the video display portion 151d. The bit counting portion 151b of the video decoding device 151 counts the number of bits of data received without error in a predetermined constant period of time T and transmits it to the video coding device 150 through the feedback loop (radio section B→base station 153→base station 152→radio section A).

The transmission control portion 432 of the video coding device 150 receives the bit number information from the video decoding device 151 and outputs it to the quantization control device 71.

The video coding device 150 can know the number of bits correctly received in the video decoding device 151 when performing retransmission control directly with the video decoding device 151. However, if a plurality of retransmission control sections exist between the video coding device 150 and the video decoding device 151, as shown in FIG. 9, the video coding device 150 can know only the number of bits correctly received in the base station 152, i.e., the throughput in the radio section A, from the retransmission control made by itself. The throughputs in the radio sections A and B are not always the same. If the throughput in the radio section B is lower than the throughput in the wired section or the radio section A, the communication throughput between the video coding device 150 and the video decoding device 151 is limited by the throughput in the radio section B.

Accordingly, the video decoding device 151 counts the number of bits of data received without error and transmits it to the video coding device 150 through the feedback loop and then the video coding device 150 can know the communication throughput between the video coding device 150 and the video decoding device 151. Then the video coding device 150 can achieve correct quantization control and frame dropping control on the basis of this known communication throughput. The method of calculating the number of bits of video data received without error may be a method shown in a twelfth embodiment.

Or, the base station 153 may count the number of bits correctly received in the video decoding device 151 within the predetermined constant period of time T and transmit it to the video coding device 150 through the feedback loop.

Or, the base station 153 may calculate the average throughput on the basis of the number of bits correctly received in the video decoding device 151 within the predetermined constant period of time T and transmit it to the video coding device 150 through the feedback loop.

In the quantization control device 71, the video frame may be divided into a priority area where an object will be displayed and a non-priority area where the background will be displayed with a function newly provided for setting the quantization step size for each area. In this case, when the coding rate exceeds a predetermined threshold, the coding device 12 may be controlled not to perform coding and transmission operations as to the non-priority area, or, the high-frequency component of the input video may be eliminated using a prefilter, or the low-frequency component of the DCT coefficient only may be coded.

In the frame dropping/quantization control device 72, the video frame may be divided into a priority area and a non-priority area, with a function newly provided for setting a quantization step size for each area. Then, when the frame dropping occurs, the quantization step size for the non-priority area of the next video frame will be set to a quantization step size with a quantization step size larger than that of the quantization step size determined in the first quantization step size control portion 163 and sent to the coding device 12. Furthermore, when frame dropping occurs, the coding device 12 may be controlled not to perform coding operation and transmission operation for the non-priority area, or the high-frequency component of the input video may be omitted by a prefilter, or the low-frequency component of the DCT coefficient only may be coded.

In the case where the video frame is divided into the priority area and the non-priority area, if frame dropping occurs, the frame dropping/quantization control device 42 may perform control to enlarge the range of the non-priority area.

In the structure of the fifth embodiment described above, the bit number of data received without error within the predetermined constant period of time T is transmitted from the video decoding device 151 to the video coding device 150 and the average throughput is calculated in the video coding device 150. However, the average throughput may be calculated in the video decoding device 151 and transmitted to the video coding device 150 through the feedback loop. The average throughput calculating method will be shown in a thirteen embodiment described later.

Furthermore, although in the fifth embodiment the average throughput in the predetermined constant period of time T is calculated, the time T for obtaining the average may be variable according to the error condition on the communication path. If the time T for obtaining the average is shortened, it is possible to respond quickly to a change in throughput to perform quantization control and frame dropping control. However, if control is made using an average in an extremely short time under conditions where burst type errors periodically occur on the communication line, the average throughput value largely decreases when the burst error occurs, and otherwise, the average throughput value becomes large and control is not stabilized. According to "Improvement Techniques of Picture Coding Quality Deteriorations for Mobile Communications (Hisashi IBARAKI, et al., Society of Video Electronics, vol.23, No.5 (1994), pp.445–453), when the Doppler frequency is constant, the burst error periodically occurs 0.35 times more than the Doppler frequency. In such a case, taking the section in which the number of bits received from the video coding device 150 in the unit time t is smaller than a certain threshold as a burst error section, detecting the period by measuring intervals at which the burst error section occurs, and obtaining the mean value taking the period as a time T provide stable quantization control and frame dropping control which do not go unstable even when a burst error occurs. In this situation, the operation becomes more stable if the period is obtained by averaging the interval at which a plurality of burst error sections occur.

Further, when the interval at which the burst error section occurs exceeds a certain length, it is determined that there is no burst error, and when the time T for obtaining the average, the change of the throughput is immediately responded.

The video data outputted from the transmission control portion 432 through the output device 18 may be multiplexed by sound and other data and transmitted to the video decoding device 151. In this case, the transmission rate of the video data outputted from the transmission control portion 432 changes according to the multiplexing ratio. That is, the throughput of the video data changes according to not only the condition where the errors occur but also whether the sound and other data for multiplexing occur. Also in this situation, since the throughput of the video data can be known once the number of bits of the video data received without error is known, this invention can have the same effect.

Sixth Embodiment

Figure 10:
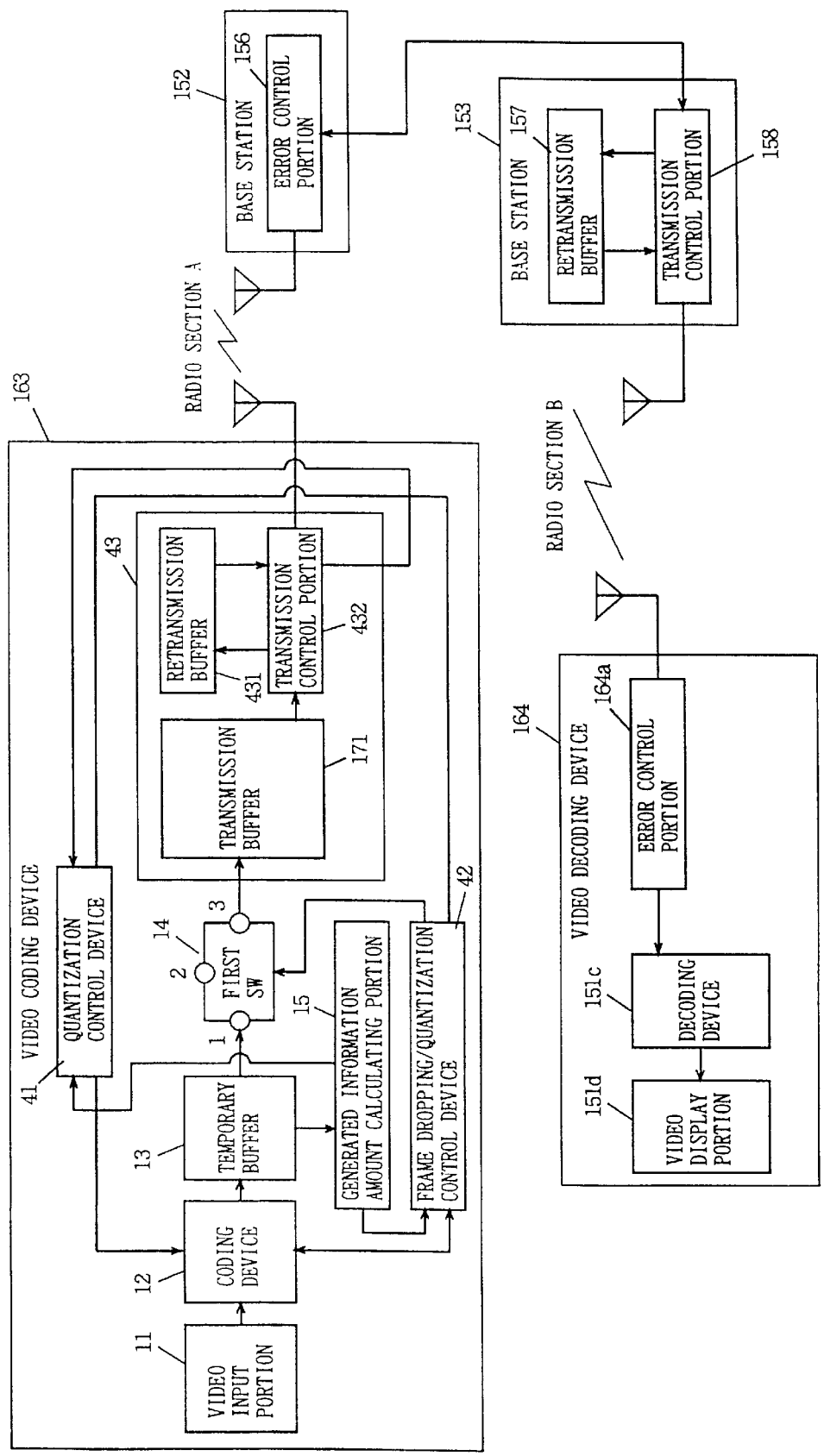
FIG. 10 is a block diagram showing the structure of an image transmission system according to a sixth embodiment of the present invention.

FIG. 10 is a block diagram showing the structure of a video transmission system according to a sixth embodiment of the present invention. In FIG. 10, the video coding device 163 and the video decoding device 164 are respectively connected to base stations 152 and 153 by radio. The base stations 152 and 153 are connected by wire. Like the fifth embodiment, the situation is considered in which retransmission is controlled in the radio section A (between the video coding device 163 and the base station 152) and the radio section B (between the base station 153 and the video decoding device 164).

The structure of the video coding device 163 is almost the same as that of the video coding device 40 (refer to FIG. 4) in the second embodiment, and the structures of the base stations 152 and 153 are the same as those in the fifth embodiment. (Refer to FIG. 9.) The structure of the video decoding device 164 is almost the same as that of the video decoding device 151 of the fifth embodiment, but when the error control portion 164a detects an error in received data and makes retransmission, it transmits retransmission occurrence information to the video coding device 163 through the feedback loop (radio section B→base station 153→base station 152→radio section A.)

The transmission control portion 432 of the video coding device 163 outputs the error notice when it received the above retransmission occurrence information from the video decoding device 164 and made retransmission by itself or when it received the retransmission occurrence information.

When the video coding device 163 performs retransmission control directly with the video decoding device 164, it can know the situation of occurrence of errors between it and the video decoding device 164 on the basis whether it has made retransmission by itself or not. However, in such a case as shown in FIG. 10 where a plurality of retransmission control sections exist between the video coding device 163 and the video decoding device 164, the video coding device 163 can not grasp the error occurrence situation in the radio section B.

Accordingly, the video decoding device 164 transmits the retransmission occurrence information to the video coding device 163 through the feedback loop when retransmission is made, and then the video coding device 163 can know the situation of error occurrence between the video coding device 163 and the video decoding device 164. Thus, the video coding device 163 can perform correct quantization control and frame dropping control on the basis of the known error occurrence situation.

In the quantization control device 41, the video frame may be divided into a priority area in which an object will be displayed and a non-priority area in which a background will be displayed with a new function provided for setting the quantization step size for each area. Then, in the error mode, the quantization step size for the non-priority area will be set to a quantization step size with a quantization step size larger than that of the quantization step size determined in the third quantization control portion 412 and sent to the coding device 12. Furthermore, in the error mode, for the non-priority area, the quantization control device 41 may control the coding device 12 so that it does not perform coding operation and transmission operation, or the high-frequency component of the input video may be eliminated with a prefilter, or low-frequency component of the DCT coefficient only may be coded.

In the frame dropping/quantization control device 42, the video frame may be divided into a priority area and a non-priority area, with a new function provided for setting the quantization step size for each area. Then, when frame dropping takes place, a quantization step size for the non-priority area of the next video frame will be set to a quantization step size with a quantization step size larger than that of the quantization step size determined in the first quantization control portion 163 and sent to the coding device 12. Furthermore, the coding device 12 may be controlled not to perform coding operation and transmission operation for the non-priority area if frame dropping takes place, or the high-frequency component of the input video may be eliminated by a prefilter, or the low-frequency component of the DCT coefficient only may be coded.

When the video frame is divided into the priority area and the non-priority area, the frame dropping/quantization control device 42 may make control when frame dropping takes place to enlarge the range of the non-priority area.

Or, when the video frame is divided into the priority area and the non-priority area, if frame dropping takes place, the frame dropping/quantization control device 42 may set the quantization step size for the non-priority area to a quantization step size with a quantization step size larger than that of the quantization step size used to code the non-priority area of the dropped video frame and provide it to the coding device 12.

Or, when the video frame is divided into the priority area and the non-priority area, if frame dropping takes place, the frame dropping/quantization control device 42 may control the coding device 12 so that it does not perform coding operation and transmission operation for the non-priority area, or the high-frequency component of the input video may be omitted by a prefilter, or the low-frequency component of the DCT coefficient only may be coded.

When retransmission occurs, the retransmission occurrence information is transmitted from the video decoding device 164 to the video coding device 163 through the feedback loop in the above sixth embodiment, but it may be so constructed that the retransmission occurrence information is transmitted from the base station 153 (the device which has made the retransmission) to the video coding device 163 when retransmission occurs.

Seventh Embodiment

Figure 11:
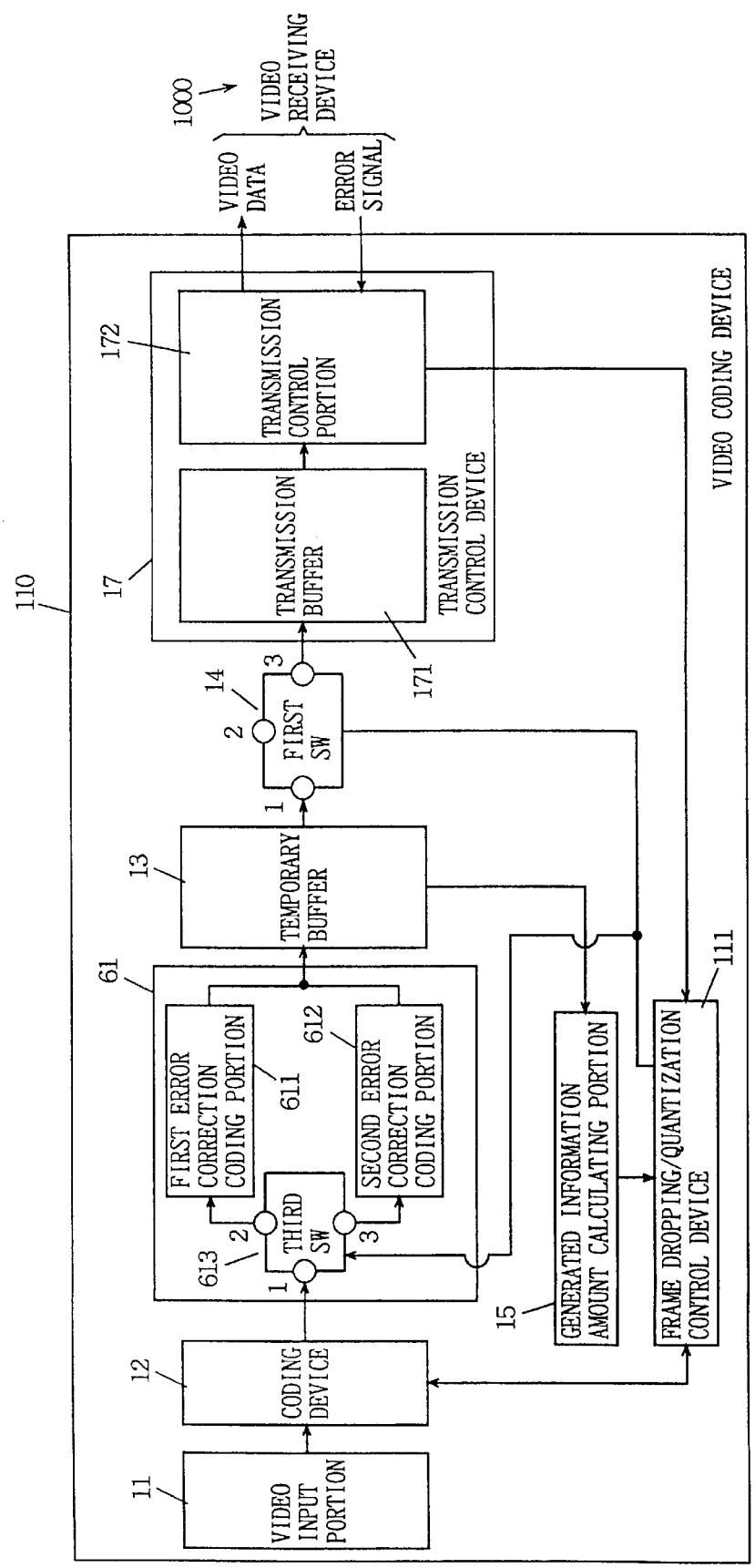
FIG. 11 is a block diagram showing the structure of an image coding device according to a seventh embodiment of the present invention.

FIG. 11 is a block diagram showing the structure of a video coding device according to a seventh embodiment of the present invention. In FIG. 11, the video coding device 110 includes a video input portion 11, a coding device 12, a temporary buffer 13, a first SW 14, a generated information amount calculating portion 15, a transmission control device 17, a frame dropping/quantization control device 111 and an error correction coding device 61. Furthermore, the error correction coding device 61 includes a first error correction coding portion 611, a second error correction coding portion 612 and a second SW 613. The transmission control device 17 includes a transmission buffer 171 and a transmission control portion 172.

The transmission control portion 172 transmits the video data at a predetermined transmission rate to the video receiving device 1000, and when it receives an error signal from the video receiving device 1000, it outputs error notice indicating reception of the error signal to the frame dropping/quantization control device 111. The first error correction coding portion 611 adds an error correcting code with low error correcting capability to the video data coded in the coding device 12 and stores it in the temporary buffer 13. The second error correction coding portion 612 adds an error correcting code having higher error correcting capability than the error correcting code added in the first error correction coding portion 611 to the coded video data and stores it in the temporary buffer 13. The connection of the third SW 613 is switched by the frame dropping/quantization control device 111. Similarly to the frame dropping/quantization control device 42 in the second embodiment shown in FIG. 4, the frame dropping/quantization control device 111 includes the frame dropping control portion 161, the first quantization control portion 163, the threshold switching portion 421, the second SW 422 and the second threshold switching portion 424. The frame dropping control portion 161 has a function of switching the connection of the third SW 613 according to the error free mode and the error mode in the second embodiment.

The video input portion 11, the coding device 12 and the transmission buffer 171 have the same structures and functions as those of the corresponding blocks in the first conventional example of FIG. 18, so that the description thereof is not repeated here. The temporary buffer 13, the first SW 14, and the generated information amount calculating portion 15 have the same structures and functions as the corresponding blocks in the second embodiment (FIG. 4), so its description is not repeated here. Furthermore, the first error correction coding device 611 and the second error correction coding device 612 have the same structures and functions as the corresponding blocks in the third embodiment (FIG. 7), so description thereof is not repeated.

Next, operation of the video coding device 110 shown in FIG. 11 will be described. Note that the coding operation in the coding device 12 is the same as that in the first conventional example of FIG. 18, so it is not described here. Accordingly, operation in the case in which the video coding device 110 receives an error signal will now be described.

Here, the video receiving device 1000 connected by radio or by wire with the video coding device 110 has a function of calculating the error rate of received video data, and also has a function of sending an error signal to the video transmission device if the calculated error rate is larger than a predetermined threshold. In the description of operation made below, it is assumed that the error rate of the video data is larger than the predetermined threshold.

In the above case, the video receiving device 1000 outputs the error signal to the video coding device 60. When receiving the error signal, the transmission control portion 172 in the video coding device 110 outputs error notice indicating the reception of the error signal to the frame dropping/quantization control device 111. The frame dropping/quantization control device 111, when receiving the error notice, changes its state from the error free mode to the error mode and performs the same frame dropping and quantization control as in the error mode in the second embodiment. Furthermore, the frame dropping/quantization control device 111 changes the connection of the third SW 613 so that the devices 1 and 3 are connected. Hence, the video frame inputted from the video input portion 11 is provided with an error correcting code with high error correcting capability in the second error correction coding portion 612 and then outputted to the video receiving device 1000.

If the transmission control portion 172 did not receive the error signal from the video receiving device 1000 over a predetermined time, that is, if the transmission control portion 172 did not transfer the error notice to the frame dropping/quantization control device 111 over a constant period of time, the frame dropping/quantization control device 111 changes its state from the error mode to the error free mode and performs the same frame dropping, quantization control as those in the error free mode in the second embodiment. Furthermore, the frame dropping/quantization control device 111 changes the connection of the third SW 613 so that the devices 1 and 2 are connected. Hence, the video frame inputted from the video input portion 11 is provided with an error correcting code with low error correcting capability in the first error correction coding portion 611 and then outputted to the video receiving device 1000.

This way, in the seventh embodiment, the frame dropping/quantization control device 111 performs coding control to add an error correcting code with low error correcting capability in the error free mode and performs coding control to add an error correcting code with high error coding capability (the amount of the error correcting code increases) in the error mode. When the amount of generated information increases due to movement of the object, for example, to cause frame dropping, it controls the coding device 12 so that coding is performed with a quantization step size with a larger quantization step size than that of the quantization step size used to code the video frame undergoing the frame dropping. Hence, coding control corresponding to the communication condition can be realized easily, and even if the communication condition is deteriorated, the delay time until the moving picture is displayed in the video receiving device 1000 can be reduced.

Although the communication condition is determined on the basis of the error rate in the video receiving device 1000 in the seventh embodiment, the video receiving device 1000 may transmit the error rate to the video coding device 110 instead of the error signal so that the video coding device 110 can determine the error mode or the error free mode on the basis of the magnitude of the received error rate. The video coding device 110 may calculate an average of the error rate received from the video receiving device 1000 to determine the error mode or the error free mode on the basis of the calculated average error rate. The video receiving device 1000 may calculate the average of the error rate calculated in a predetermined constant period of time to transmit the error signal to the video coding device 110 when the calculated average error rate exceeds a certain threshold, and then the video coding device 110 can perform the same operation as in the seventh embodiment on the basis of the received error signal. Or, the video receiving device 1000 may transmit the calculated average error rate to the video coding device 110 so that the video coding device 110 can perform the same operation as in the seventh embodiment on the basis of the magnitude of the received average error rate.

In the frame dropping/quantization control device 111, the video frame may be divided into a priority area and a non-priority area, with a new function provided for setting the quantization step size for each area. Then, when frame dropping takes place, a quantization step size for the non-priority area of the next video frame will be set to a quantization step size with a quantization step size larger than that of the quantization step size determined in the first quantization control portion 163 and provided to the coding device 12. Furthermore, the coding device 12 may be controlled not to perform coding operation and transmission operation for the non-priority area if frame dropping takes place, or the high-frequency component of the input video may be omitted by a prefilter, or the low-frequency component of the DCT coefficient only may be coded.

Eighth Embodiment

Now, the method of determining the quantization step size in the first quantization control portion 163 in the first through seventh embodiments will be described referring to FIG. 12.

Figure 12:
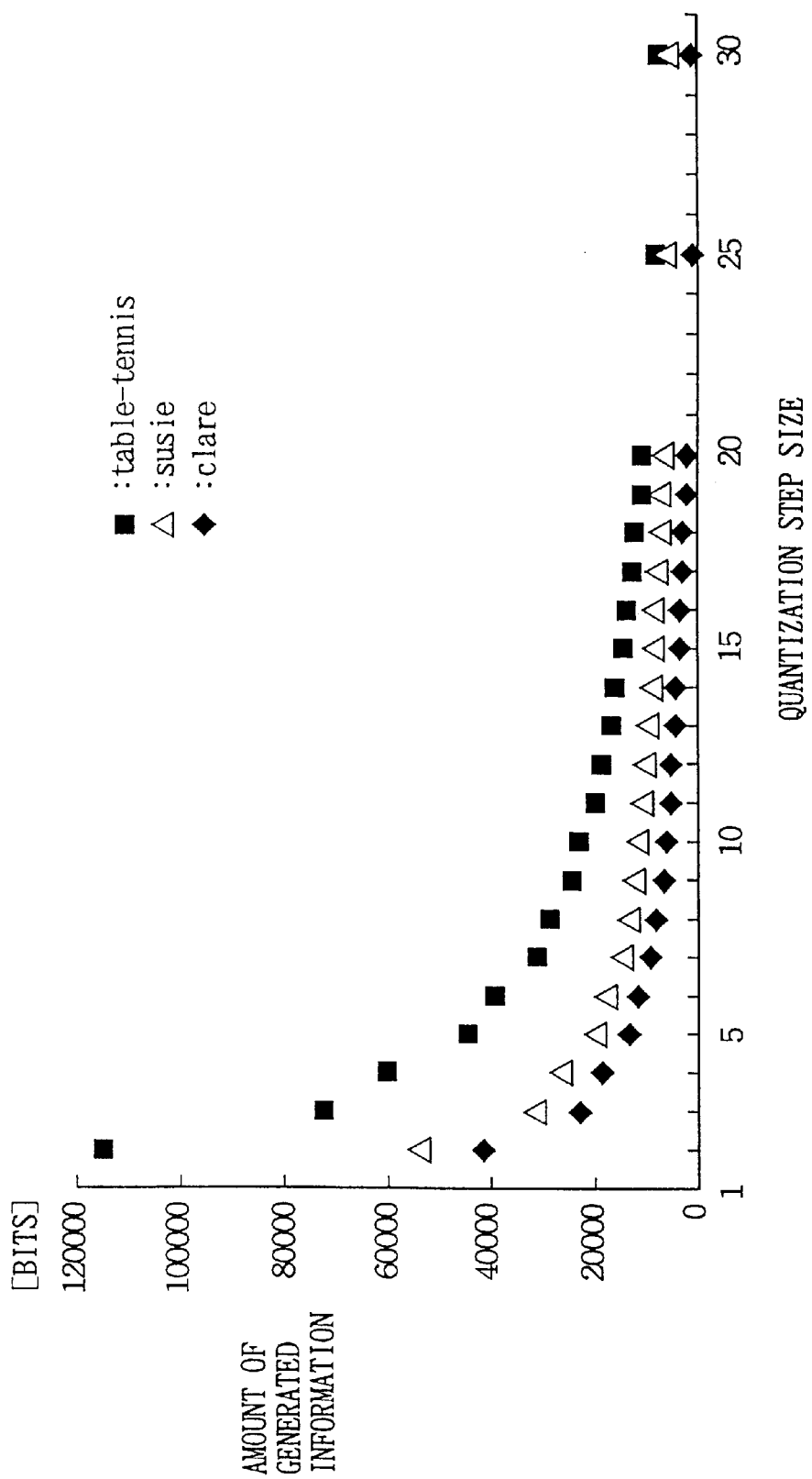
FIG. 12 is a graph showing the amount of generated information with respect to the quantization step size in an eighth embodiment of the present invention.

FIG. 12 is a graph showing the relation between the quantization step size and the amount of generated information when the video frame in which movement of an object becomes large is coded with changed quantization step sizes. In FIG. 12, the vertical axis shows the amount of generated information and the horizontal axis shows the quantization step size. The evaluation video for the television conference, Table-tennis, Susie, Clare, were used as the testing video in FIG. 12, and the simulation was made with a large frame dropping size so that the movement of the object becomes large.

As is clear from FIG. 12, the amount of generated information has the property of being almost inversely proportional to the ratio of the quantization step size with respect to video frames with large movement of the object, that is, video frames with transmission delay time exceeding the maximum delay time (500msec) which does not cause visually unnatural impression.

Accordingly, the first quantization control portion 163 in the first through third, sixth and seventh embodiments determines the quantization step size for the next video frame using the expression (2) given below.

$$\text{Next\_Q} = (\text{Now\_Q} * \text{Bits}) / (\text{Max\_Delay\_Time} * \text{Rate}) \quad (2)$$

In the expression (2) above,

Next_Q: the quantization step size used for the video frame coded next,

Now_Q: the quantization step size used when coding a video frame with a large movement of an object, Bits: the amount of generated information resulting from coding the video frame with the large movement of the object, Max_Delay_Time: the maximum permissible delay time (transmission delay time which does not cause visually unnatural impression:500 msec), and Rate: transmission rate.

Figure 21:
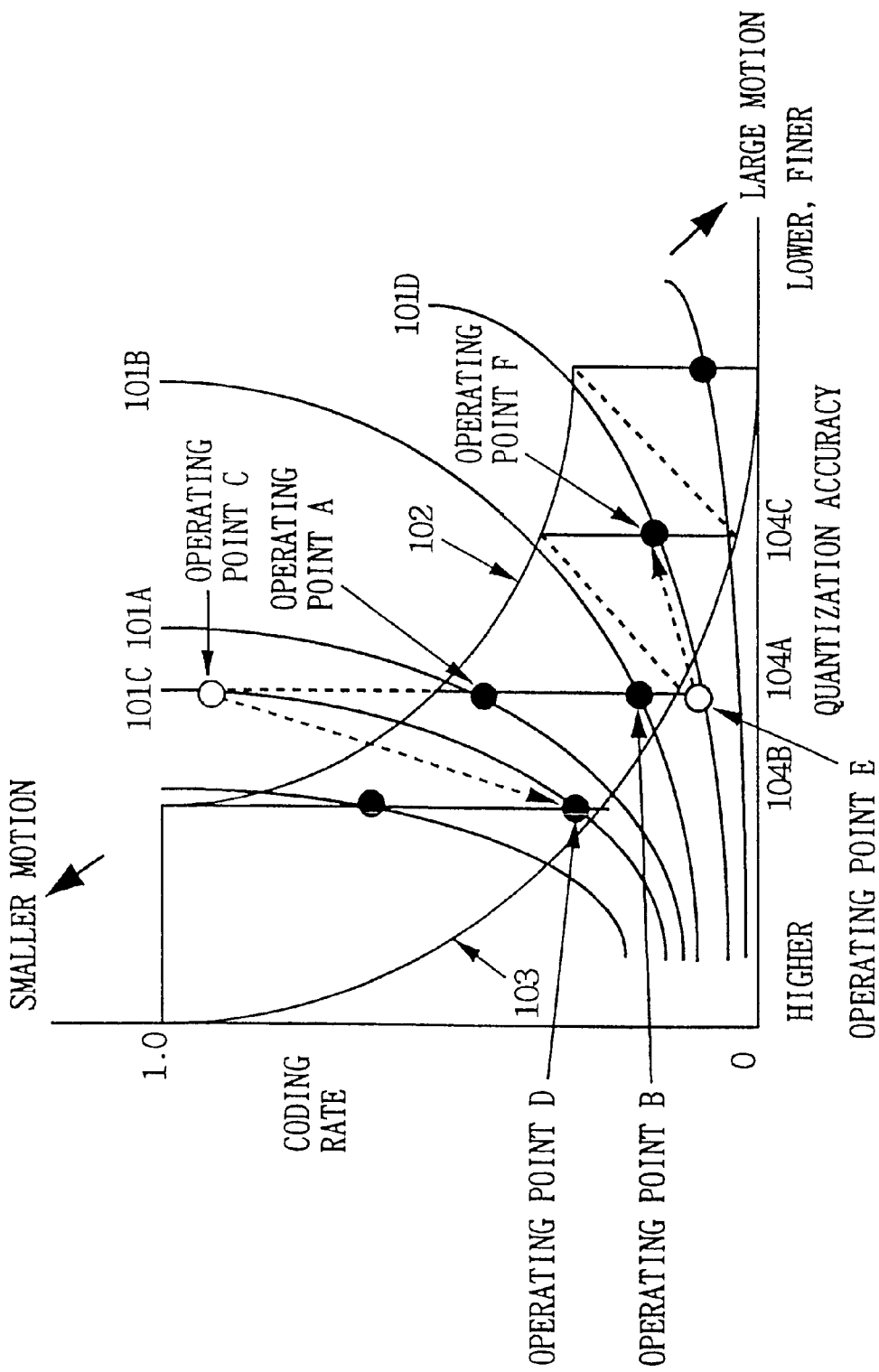
FIG. 21 is a diagram for describing the quantization control in the conventional image coding device.
Figure 22:
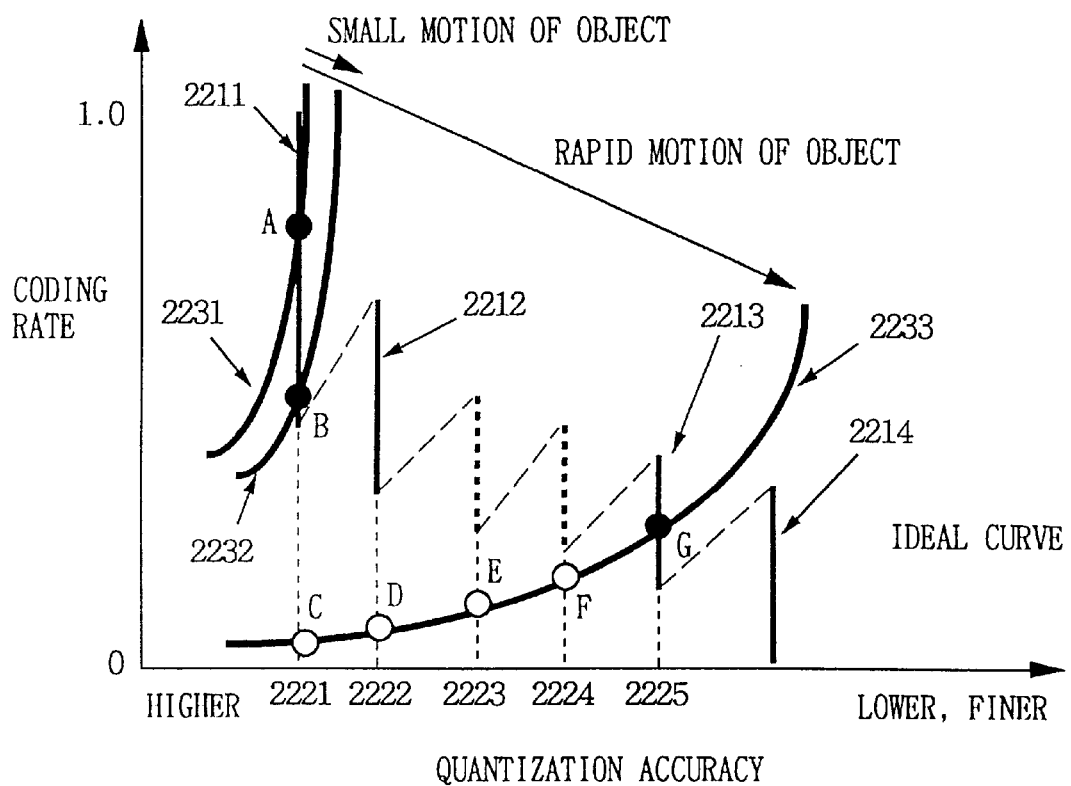
FIG. 22 is a diagram for describing the quantization control when a rapid motion of the object takes place in the conventional image coding device.
Figure 23:
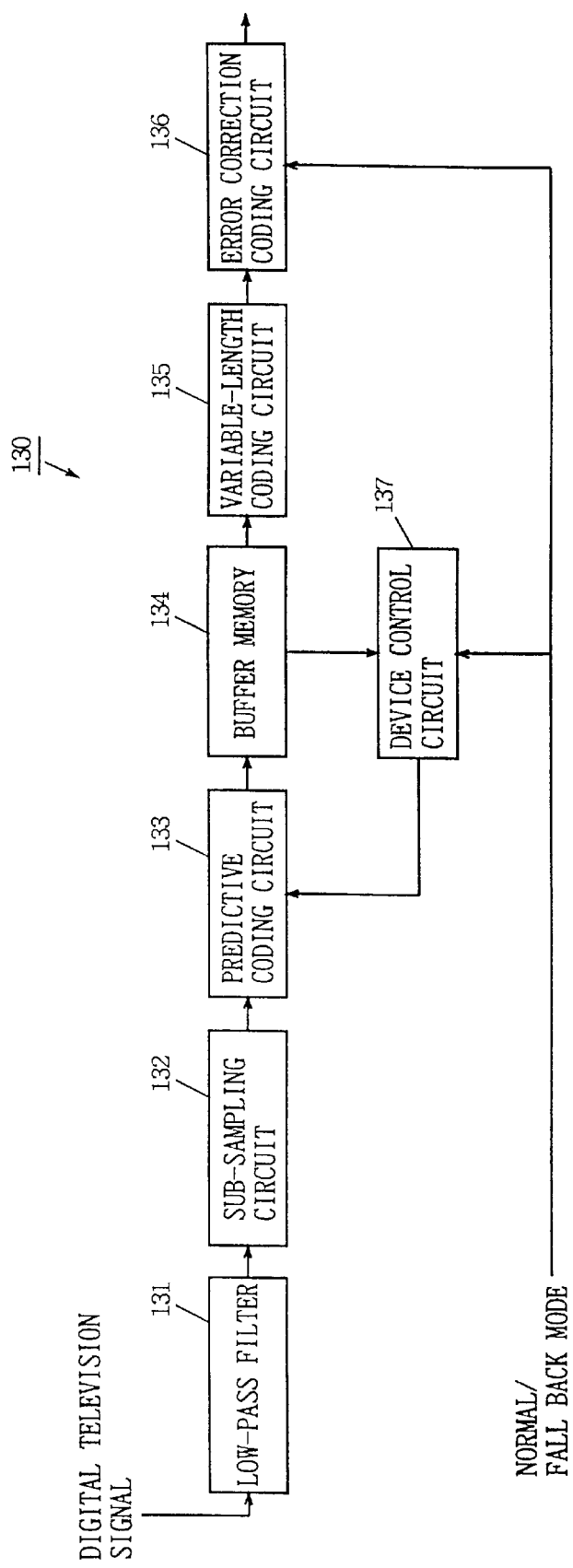
FIG. 23 is a block diagram showing an example of the structure of a conventional low bit rate coding device for television signals.
Figure 24:
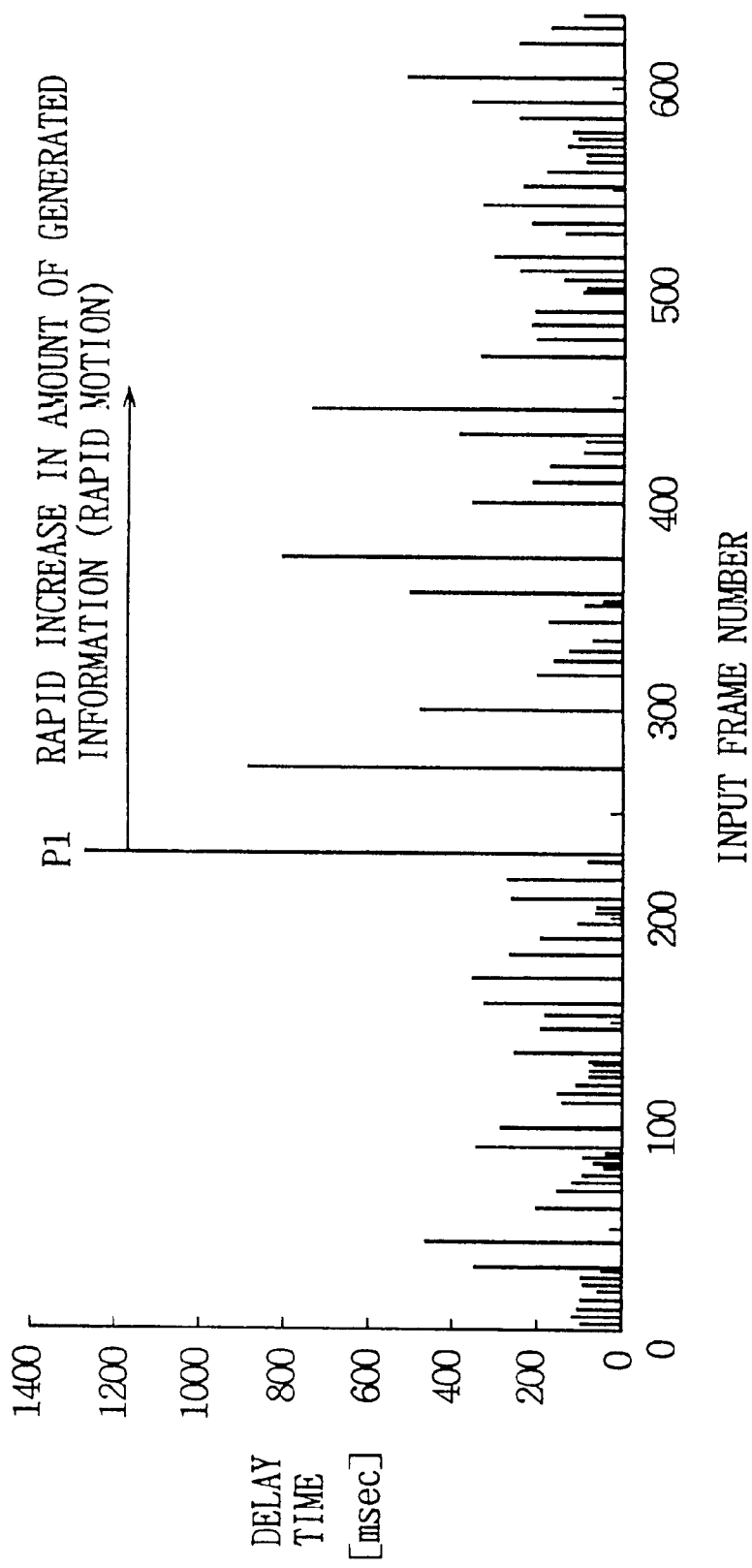
FIG. 24 is a diagram showing the measurements of the delay time and the transmitted frame interval in the conventional image coding device.

The first quantization control portion 163 in the fourth and fifth embodiments predicts the amount of generated information when the quantization step size is changed using the expression (3) given below, calculates the coding rate using the expression (1) in the fourth embodiment from the predicted amount of information, the transmission rate and the average throughput, and determines a quantization step size so that the coding rate falls between the upper limit 102 of the visually most suitable coding rate and the lower limit 103 of the visually most suitable coding rate in FIG. 21.

$$\text{Pred\_Bits} = (\text{Quant}/\text{Parameter}) * \text{Bits} \quad (3)$$

In the above expression (3),

Pred_Bits: the predicted amount of the generated information,

Quant: the quantization step size used to code a video frame with large movement of an object, Parameter: the quantization step size for which the amount of generated information is to be predicted, and Bits: the amount of generated information resultant from coding of the video frame with large movement of the object.

Thus, even when the coding rate-quantization accuracy characteristic largely changes due to large movement of an object, the most suitable quantization step size can be instantaneously determined corresponding to the changed coding rate-quantization accuracy characteristic by simple calculation.

In the first through third, sixth and seventh embodiments, if the video frame is divided into a priority area in which an object will be displayed and a non-priority area where a background will be displayed, the first quantization control device 163 may determine the quantization step size for the non-priority area using the expression (4) shown below.

$$\text{Next\_BG\_Q} = (\text{Now\_BG\_Q} * \text{BG\_Bits}) / (\text{Max\_Delay\_Time} * \text{Rate-Clear\_Bits}) \quad (4)$$

In the above expression (4),

Next_BG_Q: the quantization step size used for a non-priority area to be coded next, Now_BG_Q: the quantization step size used to code a non-priority area of a video frame with large movement of an object, BG_Bits: the amount of generated information resulting from coding of the non-priority area of the video frame with large movement of an object, Max_Delay_Time: the maximum permissible delay time (a transmission delay time which does not cause visually unnatural impression: 500msec), Rate: transmission rate, and Clear_Bits: the amount of generated information resulting from coding of the priority area of the video frame with large movement of the object.

In the fourth and fifth embodiments, when the video frame is divided into a priority area and a non-priority area, the video coding device 70 in the fourth embodiment (FIG. 7) and the video coding device 150 in the fifth embodiment (FIG. 9) may be constructed as follows. That is to say, the video coding device 70 and the video coding device 150 may store the upper limit of the visually most suitable coding rate and the lower limit of the visually most suitable coding rate as shown in FIG. 21 for the case where the video frame is divided into the priority area and the non-priority area, and calculate the prediction amount of the generated information for the priority area and the prediction amount of the generated information for the non-priority area when the quantization step size is changed from the expressions (5) and (6) given below, thereby to determine the most suitable quantization step size for each area from the prediction amount of generated information of each quantization step size for each area and the upper limit and the lower limit of the coding rate for the case where the video frame is divided into the priority area and the non-priority area.

$$\text{Clear\_Pred\_Bits} = (\text{Clear\_Quant}/\text{Parameter}) * \text{Clear\_Bits} \quad (5)$$

$$\text{BG\_Pred\_Bits} = (\text{BG\_Quant}/\text{Parameter}) * \text{BG\_Bits} \quad (6)$$

In the expression (5) above;

Clear_Pred_Bits: the predicted amount of the generated information for the priority area, Clear_Quant: the quantization step size used to code the priority area of a video frame with large movement of the object, Parameter: the quantization step size at which the amount of generated information is to be predicted, and Clear_Bits: the amount of generated information resultant from coding of the priority area of a video frame with large movement of the object.

In the expression (6) above;

BG_Pred_Bits: the predicted amount of generated information for the non-priority area, BG_Quant: the quantization step size used to code the non-priority area of the video frame with large movement of the object, Parameter: the quantization step size for which the amount of generated information is to be predicted, and BG_Bits: the amount of generated information resultant from coding the non-priority area of the video frame with large movement of the object.

The transmission rate Rate in the above expressions (2), (3) and (4) may be set by considering the average throughput rate with the actual transmission rate, as shown in the expression (7) shown below, to determine the quantization step size suitable for the throughput.

$$\text{Rate} = \text{transmission rate} * \text{average throughput rate} \quad (7)$$

Ninth Embodiment

Figure 13:
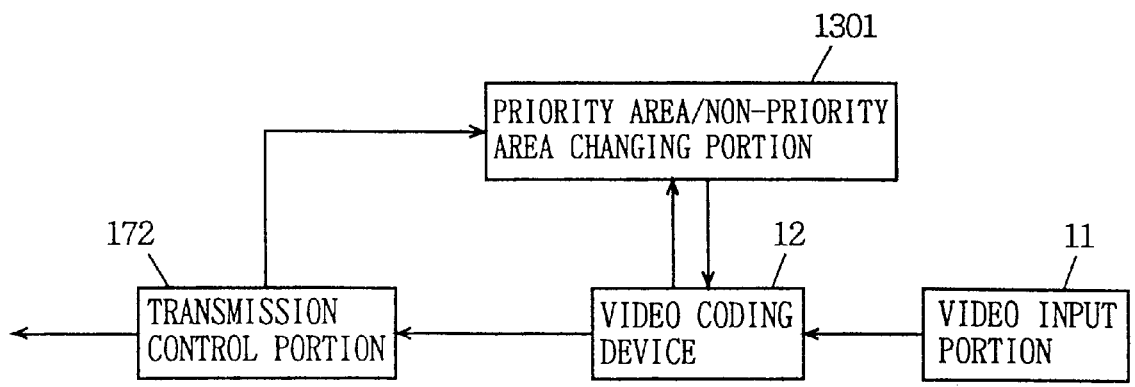
FIG. 13 is a block diagram showing the structure of an image coding device according to a ninth embodiment of the present invention.

FIG. 13 is a block diagram showing the structure of a video coding device according to a ninth embodiment of the present invention. In FIG. 13, the video coding device of this embodiment includes a video input portion 11, a video coding device 12, a priority area/non-priority area changing portion 1301 and a transmission control portion 172.

The coding device 12 codes a moving picture of the QCIF size captured from the video input portion 11 according to ITU Recommendation H.261 and generates the coded bit string. Here, the coded video of the QCIF is divided into a priority area and a non-priority area, which are coded with different quantization accuracies. The priority area/non-priority area changing portion 1301 determines a priority area and a non-priority area of the QCIF (176×144 dots size) coded video on the basis of the amount of generated information of the previous coded frame. The transmission control portion 172 transmits this coded bit string and also monitors the communication throughput.

Figure 15:
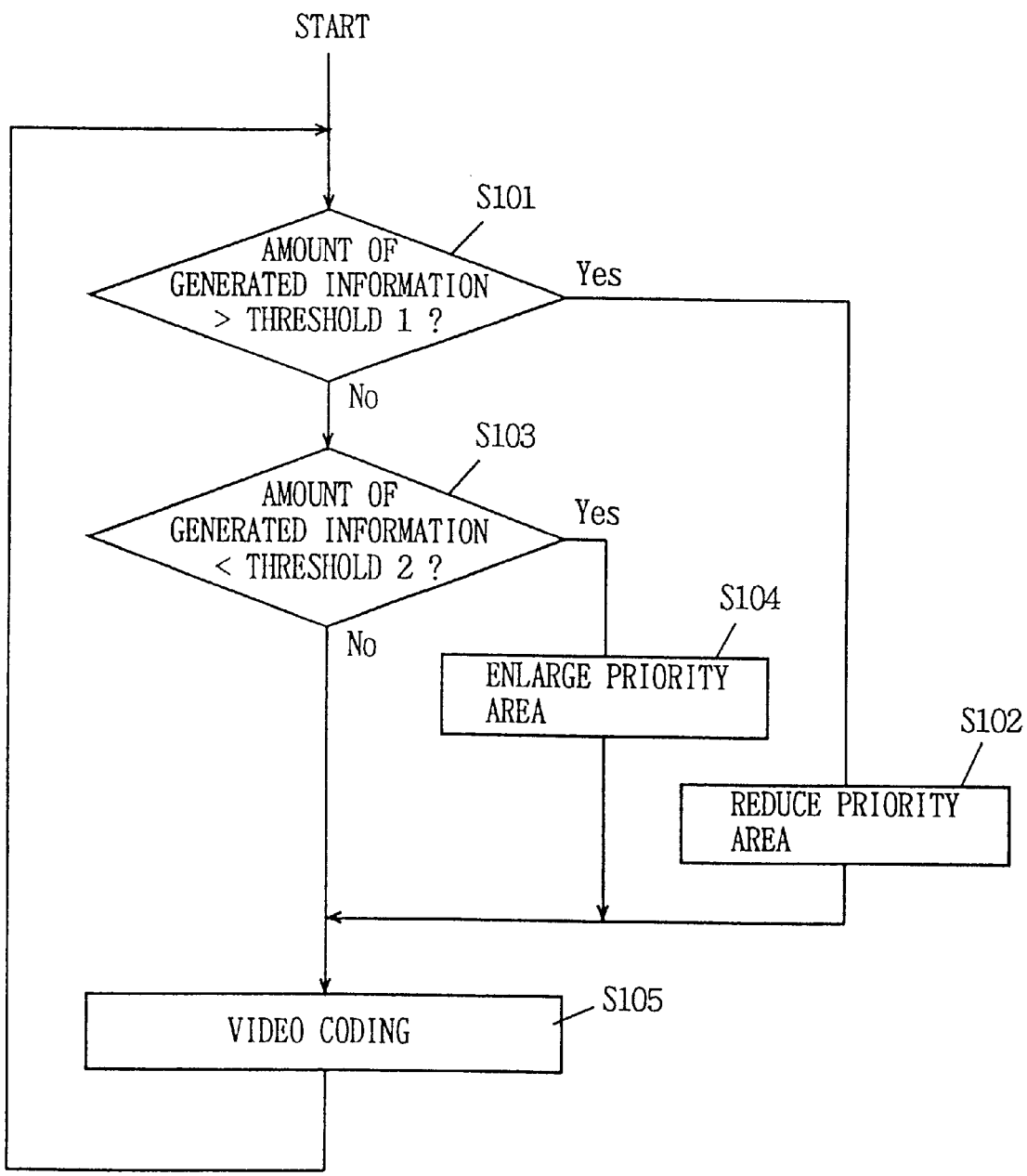
FIG. 15 is a process flow in the case in which the size of the priority area is changed in the ninth embodiment of the present invention.

As an example, operation of changing the size of the priority area in two steps will be described using the flow of FIG. 15.

Figure 14:
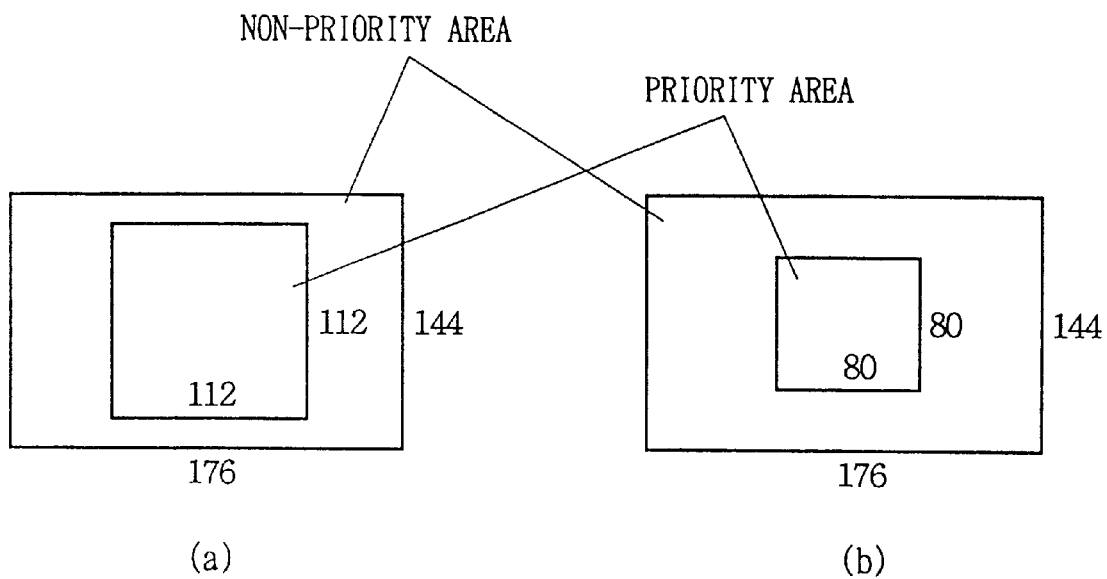
FIG. 14 is an example of division of an image frame in the case in which the size of the priority area is changed in two steps in the ninth embodiment of the present invention.

The initial value of the priority area is the size of the center of the QCIF video shown in FIG. 14(*a*). (The size of 112×112 dots.) One frame is coded (Step S105), and then if the amount of generated information exceeds a certain threshold 1 (Step S101), the priority area is reduced to the size of the center of the video shown in FIG. 14(*b*) (80×80 dots) (Step S102) to reduce the amount of generated information. On the other hand, if the amount of generated information falls below a certain threshold 2 (Step S103), then the priority area is enlarged again to the size of the center of the video of FIG. 14(a) (the size of 112×112) (Step S104) to enlarge the clear area. Subsequently, the areas are coded with different quantization accuracies (Step S105.)

The priority area and the non-priority area are changed in two steps in the ninth embodiment, but they can be changed in a larger number of steps.

Although the priority area and the non-priority area are determined on the basis of the amount of generated information of the previous coded frame in the ninth embodiment, the priority area and the non-priority area may be changed on the basis of the communication throughput monitored in the transmission control portion, or on the basis of the coding rate calculated from the amount of generated information and the communication throughput, as explained in the fourth embodiment. In this case, if the coding rate exceeds a predetermined threshold, the video coding device 12 may be controlled not to do coding operation and transmission operation for the non-priority area, or the high-frequency component of the input video may be eliminated by a prefilter, or the low-frequency component of the DCT coefficient only may be coded.

Although the non-priority area is coded with quantization accuracy different from that for the priority area in the ninth embodiment, it may be configured so that the non-priority area is not coded, or the high-frequency component of the input video may be eliminated using a prefilter, or the low-frequency component of the DCT coefficient only may be coded. In this case, the video range to be coded changes according to the amount of generated information and the communication throughput.

It may be constructed so that coding operation and transmission operation are not made for the non-priority area when the amount of generated information of the previous coded frame exceeds a predetermined threshold, or the high-frequency component of the input video may be eliminated with a prefilter, or the low-frequency component of the DCT coefficient only may be coded.

This way, according to the ninth embodiment, even if the amount of generated information extremely increases or the communication throughput decreases, the video quality of the priority area is not largely deteriorated.

Tenth Embodiment

Now, a tenth embodiment of the present invention will be described referring to the drawings.

Figure 16:
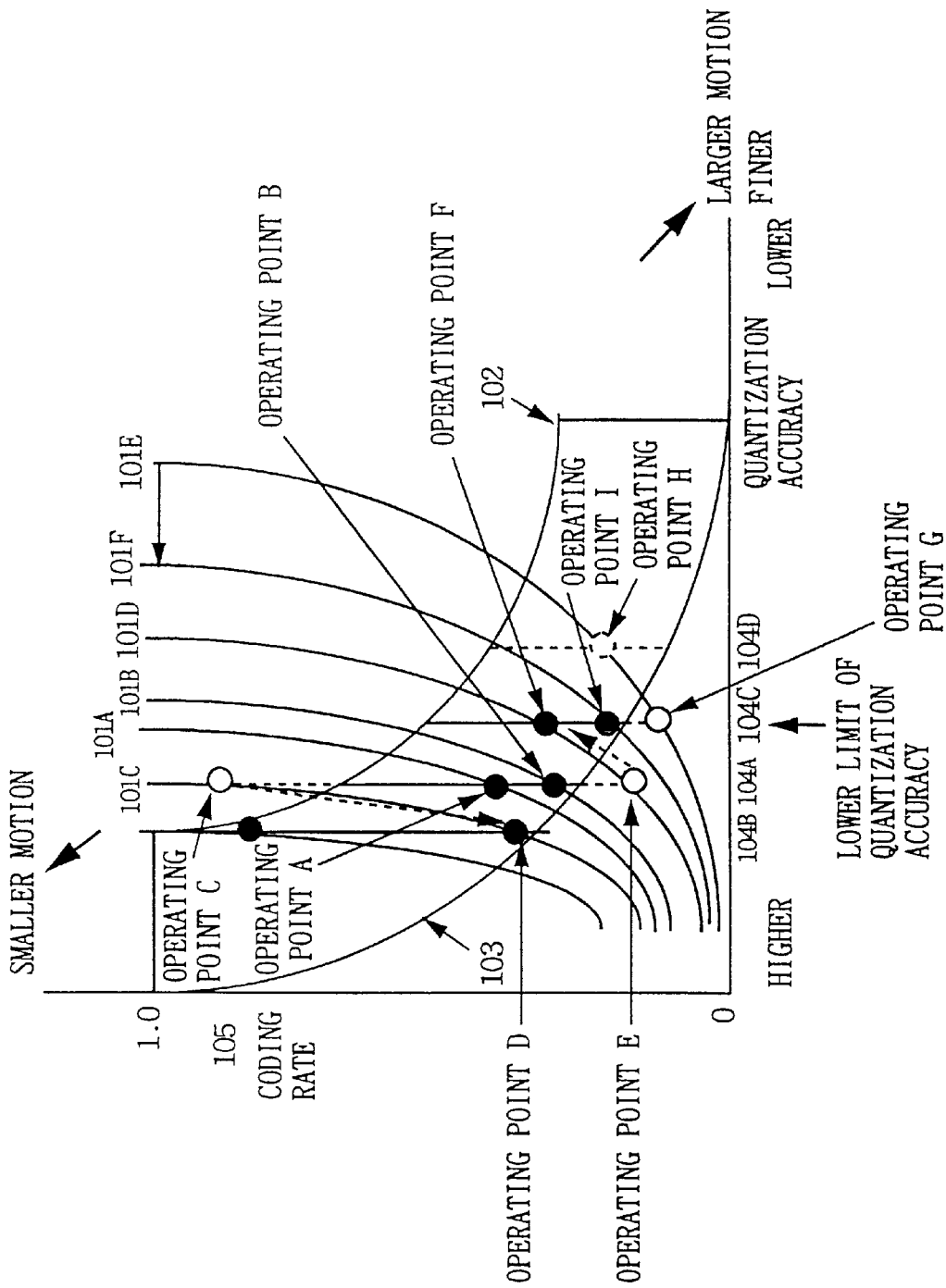
FIG. 16 is a diagram for describing the area control for the priority area and non-priority area and the quantization control in a tenth embodiment of the present invention.

FIG. 16 is a diagram for describing the principle of the coding control method according to the tenth embodiment of the present invention. In FIG. 16, 101 indicates coding rate-quantization accuracy characteristics $$Ss(q)=UR(q),$$

which change according to the magnitude of motion in time of the input video and the spacial frequency components, and moves down to the right when large motion or fine pattern is included, and moves up to the left if less motion is included. While the coding rate-quantization accuracy characteristics and objects of the present invention are not explained here because they have been described in detail in the Description of the Background Art, the coding rate-quantization accuracy characteristics 101A to 101D are shifted up to the left in FIG. 16 as compared with those described in the conventional art because the lower limit value for the quantization accuracy is set in FIG. 16. However, the operating principle is the same.

The reference character 102 denotes the upper limit value of the visually most suitable coding rate, and 103 denotes the lower limit value of the visually most suitable coding rate. The objective function can be assumed to be a set of points at which the combination of the coding rate 105 and the quantization accuracy 104 becomes visually most suitable, but this is actually a subjectively obtained value, which changes according to the distance and angle when seeing the video and tastes of individuals. Hence, a visually most suitable region is assumed on the video quality trade-off function and it is assumed that the group of points at which the coding rate is the largest in that region forms the upper limit value 102 of the visually most suitable coding rate, and the group of points at which the coding rate is the smallest in that region forms the lower limit value 103 of the visually most suitable coding rate. Here, the lower limit value 104C of the quantization accuracy is newly set. That is to say, it is an object to locate the operating point in the region surrounded by the upper limit value of the visually most suitable coding rate, the lower limit value of the visually most suitable coding rate and the lower limit value of the quantization accuracy.

Figure 17:
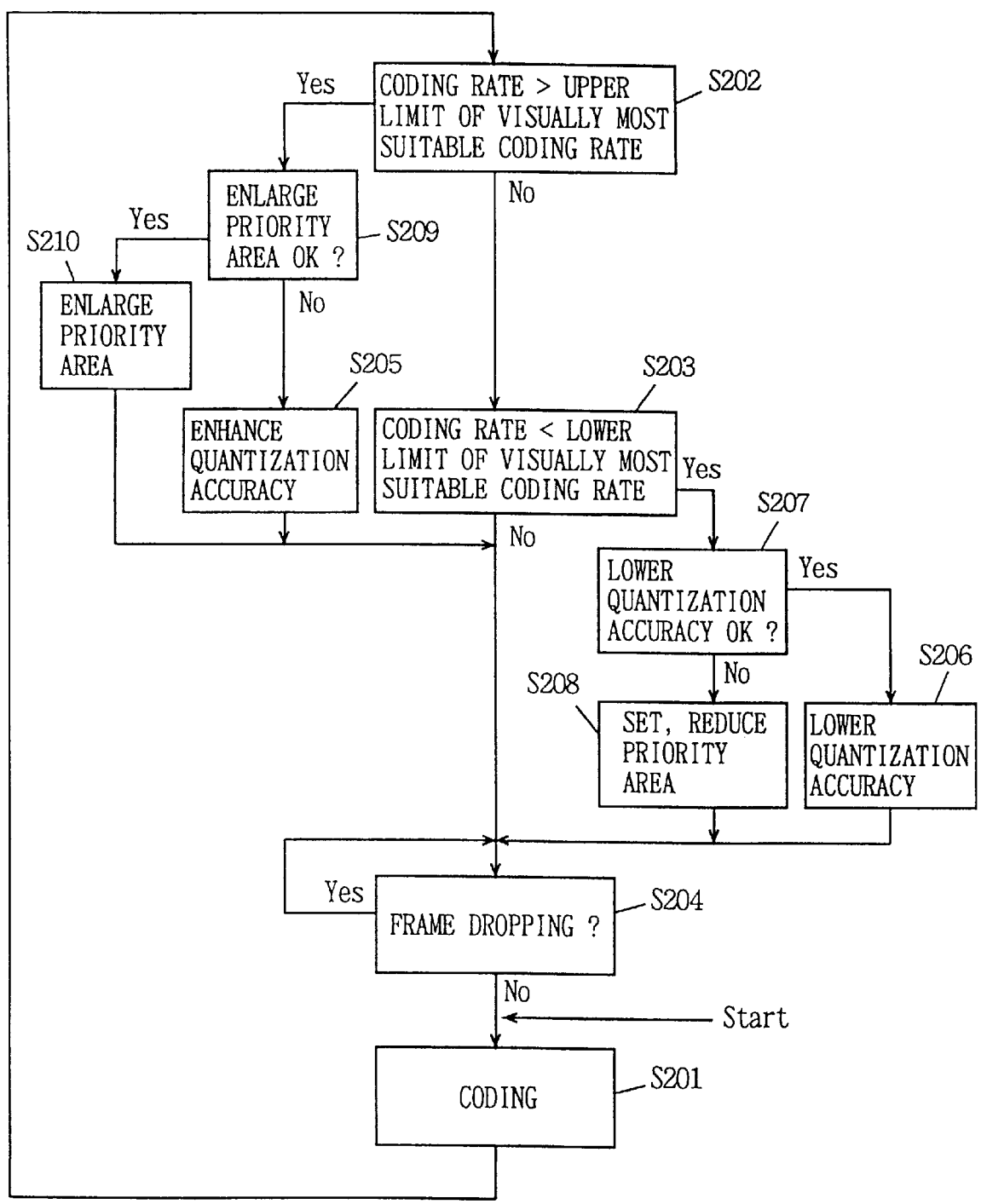
FIG. 17 is a control flow of the area control for the priority area and non-priority area and the quantization control in the tenth embodiment of the present invention.

FIG. 17 is a flow chart showing the procedure of the coding control method according to the tenth embodiment of the present invention. Referring to FIG. 16 and FIG. 17, the coding control method according to the tenth embodiment of the present invention will be described.

Now, suppose that coding is performed with a first quantization accuracy 104A in Step S201, for example. Then, if the coding rate-quantization accuracy characteristic of the input video is 101A or 101B in FIG. 16, the operating point A or B is within the visually most suitable region, and the coding rate does not exceed the upper limit of the visually most suitable coding rate (the determination in Step S202 is "NO"), and does not fall below the lower limit of the visually most suitable coding rate (the determination in Step S203 is "NO") Accordingly, the quantization accuracy is not changed and remains at 104A. Next, frame dropping is made according to the amount of generated code (Step S204) and then next coding is performed (Step S201.)

If the coding rate-quantization accuracy characteristic of the input video comes to 101C while the processings in Step S201 to S204 are repeated, for example, the operating point moves to the transient operating point C. The coding rate at the operating point C is over the upper limit value of the visually most suitable coding rate for the quantization accuracy 104A (the determination in Step S202 is "YES"), so that the quantization accuracy is enhanced to 104B, for example. (Step S205) Then, frame dropping is done corresponding to the amount of generated code (Step S204), and then, coding is made with the quantization accuracy 104B. (Step S201) If the coding rate-quantization accuracy characteristic for the input video remains at 101C, then the next operating point is the operating point D, which is within the visually most suitable region again.

Similarly, if the coding rate-quantization accuracy characteristic of the input video comes to 101D while operating at the operating point B, then the operating point moves to the transient operating point E. The coding rate at this time is under the lower limit value of the visually most suitable coding rate (the determination in Step S203 is "YES"), so that the quantization accuracy is decreased to 104C, for example. (Step S206) Next, frame dropping corresponding to the amount of generated code is performed (Step S204), and then next coding is performed. (Step S201) Thus the operating point is set to the visually most suitable operating point F.

Next, if the coding rate-quantization accuracy characteristic of the input video comes to 101E while operating at the operating point F, the operating point is then the transient operating point G. At this time, according to the conventional algorithm, as the coding rate is under the lower limit value 103 of the visually most suitable coding rate, the quantization accuracy for the next coding is brought to 104D, and the operating point is brought to H. On the other hand, in the tenth embodiment, since the quantization accuracy value 104D is under the lower limit value 104C of the quantization accuracy, the determination as to whether the quantization accuracy can be decreased or not in Step S207 is "NO". In this case, a priority area is set, which is quantized without decreasing the quantization accuracy, and the non-priority area is quantized with a quantization accuracy which is lower than that for the priority area. (Step S208) Then, the area quantized with the quantization accuracy 104C becomes smaller so that the amount of generated information decreases, and the coding rate-quantization accuracy characteristic comes to 101F. As a result, the operating point moves to 1, which is within the region surrounded by the upper limit value of the visually most suitable coding rate, the lower limit value of the visually most suitable coding rate and the lower limit value of the quantization accuracy.

If the operating point does not satisfy the lower limit value of the visually most suitable coding rate in the first setting of the priority area, however, the priority area is further reduced in the next coding. (Step S208) If the operating point exceeds the upper limit of the visually most suitable coding rate (the determination in Step S202 is "YES"), then the priority area is enlarged. (Step S210) If the priority area can not be further enlarged (the determination in Step S209 is "NO"), however, the quantization accuracy is moved to 104A.

This way, according to the tenth embodiment, a coding control method is realized in which reproducibility of motion, spacial resolution and noise are most suitably balanced in view of visual properties by simple control.

The visually most suitable operating region can be narrowed down more as the unit control size of the quantization accuracy is made smaller. In this case, however, the speed for following the change of the input video becomes slower, and if the speed of change of the input video can not be followed, control may be diverged. If the unit control size of the quantization accuracy is made larger, the speed of following the change of input video increases, but the operating region is enlarged and the accuracy of control is deteriorated. Accordingly, it is preferred that the unit control size of the quantization accuracy is set so that the accuracy of control is around the cognizable limit of the visual properties.

Although the method of setting the priority area is not discussed in detail, it may be set to the area in which a face of a person is displayed, or may be set to the center of three divisions of the frame.

Although the quantization accuracy is decreased for coding of the non-priority area in the description of the embodiments above, it may be configured so that information is not transmitted at all, or the high-frequency component of the input video may be eliminated with a prefilter, or the low-frequency component of the DCT coefficient only may be coded.

Or, the coding rate may be corrected with the communication throughput, or, it may be constructed so that coding operation and transmission operation are not conducted for the non-priority area if the coding rate exceeds a predetermined threshold.

Eleventh Embodiment

In FIG. 7, the transmission control portion 432 outputs data at a certain rate, for example, in the case of the PHS, 32 kbps. When no transmission error occurs and no reject is sent from the receiving side, all data read from the transmission buffer 171 is framed to be outputted. However, for a frame in which an transmission error occurs and reject is sent from the receiving side, the frame is read from the retransmission buffer 431 to be outputted, not read from the transmission buffer. The transmission control portion 432 sends the number of bits of data read from the transmission buffer for the unit time t to the average throughput calculating portion 711. If the unit time t is a time for transmitting one frame, for example, 20 ms, in the case of the frame of 80 byte when the frame has a fixed length, synchronization can be easily taken. If it is possible to synchronize with the period of video of the video inputting portion 11, it is also possible to synchronize with the coding timing, and If the unit time t is the least common multiple between the transmission frame time and the period of the video, it is possible to synchronize with both of them. The average throughput calculating portion 711 calculates the mean value of the throughput for the constant period of time T from the number of bits read from the transmission buffer for the unit time t received from the transmission control portion 432. For a simplified calculating method, it is suggested that the mean value obtained by dividing the sum of the number of bits for the constant period of time T by the constant period of time T is calculated for each of the constant period of time T to be outputted for each of the constant period of time T. Since the processing of the method is extremely easy but rough, in the case of the PHS where burst-like errors occur etc., decrease in the average throughput in a section where an burst error occurs has an effect on all video to be coded during the constant period of time T. Therefore, the constant period of time T has to be sufficiently long. For a second calculating method, it is suggested that the mean value obtained by dividing the sum of the number of bits for the constant period of time T by the constant period of time T is calculated for each of the unit time t to be outputted for each of the unit time t. In this case, although the processing of the method is complicated, the average throughput is updated for each of the unit time t to permit more precise control.

Twelfth Embodiment

In FIG. 9, the transmission control portion 432 is assumed to output data at a certain rate, for example, in the case of the PHS, 32 kbps. The video receiving device 151 calculates the number of bits of the video data received without error during the unit time t. If the unit time t is a time for transmitting one frame, for example, 20 ms, in the case of the frame of 80 byte when the frame has a fixed length, synchronization can be easily taken. Further, if the video receiving device 151 has a function of coding and transmitting video, such as the video coding device 150, it is possible to synchronize with the coding timing as long as it is possible to synchronize with the sampling cycle of the video, and if the unit time t is the least common multiple between the transmission frame time and the sampling cycle of the video, it is possible to synchronize with both of them.

Two methods can be suggested for transmitting the number of bits of the video data received without error for the constant period of time T.

In a first method, the bit number counting portion 151b calculates the number of bits of video data received without error for the constant period of time T from the number of bits of the video data received without error for the unit time t from the video coding device 150, and transmits the number of bits to the video coding device 150 for each of the constant period of time T. In this method, since the processing is extremely easy but rough, in the case of the PHS where burst-like errors occur etc., decrease in the average throughput in a section where an burst error occurs has an effect on all video to be coded during the constant period of time T. Therefore, the constant period of time T has to be sufficiently long.

In this method, if the unit time t is the constant period of time T, the processing can be easier.

A second calculating method is to calculate, for each of the unit time t, the sum of the number of bits for the constant period of time T and output the sum for each of the unit time t. In this case, although the processing of the method is complicated, the average throughput is updated for each of the unit time t in the video coding device 150 to permit more precise control.

The average throughput calculating method will be shown in a thirteenth embodiment described later.

Thirteenth Embodiment

In FIG. 9, the transmission control portion 432 is assumed to output data at the certain rate, for example, in the case of the PHS, 32 kbps. The video receiving device 151 calculates the number of bits of the video data received without error during the unit time t. If the unit time t is a time for transmitting one frame, for example, 20 ms, in the case of the frame of 80 byte when the frame has a fixed length, synchronization can be easily taken. Further, if the video receiving device 151 has a function of coding and transmitting video, such as the video coding device 150, it is possible to synchronize with the coding timing as long as it is possible to synchronize with the sampling cycle of the video, and if the unit time t is the least common multiple between the transmission frame time and the sampling cycle of the video, it is possible to synchronize with both of them.

Two methods can be suggested for calculating the average throughput for the constant period of time T.

In a first method, the bit number counting portion 151*b* calculates the number of bits of video data received without error for the constant period of time T from the number of bits of the video data received without error for the unit time t from the video coding device 150, calculates, for each of the constant period of time T, the mean value obtained by dividing the sum of the number of bits of the constant period of time T by the constant period of time T, and outputs the mean value for each of the constant period of time T. In this method, since the processing is extremely easy but rough, in the case of the PHS where burst-like errors occur etc., decrease in the average throughput in a section where an burst error occurs has an effect on all video to be coded during the constant period of time T. Therefore, the constant period of time T has to be sufficiently long.

In this method, if the unit time t is the constant period of time T, the processing can be easier.

A second calculating method is to calculate, for each of the unit time t, the mean value obtained by dividing the sum of the number of bits for the constant period of time T by the constant period of time T and output the mean value for each of the unit time t. In this case, although the processing of the method is complicated, the average throughput is updated for each of the unit time t in the video coding device 150 to permit the precise control.

While the invention has been described in detail, the foregoing description is in all aspects illustrative and not restrictive. It is understood that numerous other modifications and variations can be devised without departing from the scope of the invention.

What is claimed is:

1. A video coding device for coding and transmitting a moving picture, said video coding device comprising:
    a video input portion operable to form a video frame from a picture signal and to output the video frame;
    a coding device operable to code the video frame formed in said video input portion;
    a transmission buffer operable to store video data of the video frame coded in said coding device;
    a transmission controller operable to transmit the video data in said transmission buffer at a certain transmission rate;
    a temporary buffer disposed between said coding device and said transmission buffer for temporarily storing the video data of the video frame coded in said coding device; and
    a frame dropping/quantization controller operable to determine whether to store into said transmission buffer the video data in said temporary buffer and to determine a quantization step size for a video frame to be coded next;
        wherein said frame dropping/quantization controller is operable when the amount of information of the video frame stored in said temporary buffer is larger than a predetermined frame dropping threshold, to perform frame dropping control so as not to store the video data in said temporary buffer into said transmission buffer and set a quantization step size with a quantization step size larger than a quantization step size used to code the video frame stored in said temporary buffer and send the quantization step size to said coding device, and
    said coding device is operable to code the video frame coded next with the quantization step size sent from said frame dropping/quantization controller.

2. The video coding device according to claim 1, wherein said transmission controller is operable, when a communication error occurs and the video data can not be normally decoded on a receiving device side, to make automatic retransmission and send error information indicating the occurrence of the retransmission to said frame dropping/quantization controller, and
    said frame dropping/quantization controller is further operable to perform threshold control of lowering the frame dropping threshold for determining whether to store the video data in said temporary buffer into said transmission buffer from the predetermined value when receiving the notice of error information from said transmission controller, and returning the frame dropping threshold to the predetermined value when not receiving the notice of error information from said transmission controller in a predetermined constant period of time.

3. The video coding device according to claim 1, wherein said transmission controller is further operable to calculate an average throughput in a predetermined constant period of time and to send the average throughput to said frame dropping/quantization controller, and
    said frame dropping/quantization controller is further operable to:
        calculate a maximum amount of the information transmittable in a maximum permissible delay time on basis of a predetermined maximum permissible delay time and the average throughput calculated in said transmission controller, and use the calculated maximum amount of the information as the frame dropping threshold.

4. The video coding device according to claim 3, wherein said frame dropping/quantization controller is further operable to calculate an average delay time based on an average amount of the generated information of the video frame transmitted in a constant period of time and the average throughput, and to use the calculated average delay time as the maximum permissible delay time.

5. A video coding device for coding and transmitting a moving picture, said video coding device comprising:
   a video input portion operable to form a video frame from a picture signal and to output the video frame;
   a coding device operable to code a video frame formed in said video input portion;
   a transmission buffer operable to store the video data coded in said coding device;
   a first quantization controller operable to determine a most suitable quantization step size in view of both reproducibility of motion and video quality;
   a second quantization controller operable to control a quantization step size according to communication conditions; and
   a transmission controller operable to transmit the video data in said transmission buffer at a certain transmission rate, and when a communication error occurs and the video data can not be normally decoded on a receiving device side, said transmission controller is operable to make automatic retransmission and send error information indicating the occurrence of the retransmission to said second quantization controller;
   wherein when said second quantization controller receives the notice of error information from said transmission controller, said second quantization controller is operable to set a quantization step size with a larger quantization step size than a quantization step size corresponding to the quantization step size determined in said first quantization controller and send the quantization step size to said coding device, and
   when said second quantization controller does not receive the notice of the error information from said transmission controller in a predetermined constant period of time, said second quantization controller is operable to send the quantization step size determined in said first quantization controller unchanged to said coding device, and
   said coding device is operable to code a video frame coded next with the quantization step size sent from said second quantization controller.

6. The video coding device according to claim 5, further comprising,
   a temporary buffer disposed between said coding device and said transmission buffer operable to temporarily store the video data of the video frame coded in said coding device, and
   a frame dropping/quantization controller operable to determine whether to store the video data in said temporary buffer into said transmission buffer and to determine a quantization step size for a video frame to be coded next;
   wherein said transmission controller is operable to send the information indicating occurrence of the retransmission further to said frame dropping/quantization controller, and
   said frame dropping/quantization controller is operable to:
      perform threshold control of lowering a frame dropping threshold for determining whether to store the video data in said temporary buffer into said transmission buffer from a predetermined value when receiving the notice of error information from said transmission controller, and to return the frame dropping threshold to the predetermined value when not receiving the notice of error information from said transmission controller in a predetermined constant period of time, and
      when the amount of information of the video data in said temporary buffer is larger than the frame dropping threshold controlled in the threshold control, perform frame dropping control of not storing the video data in said temporary buffer into said transmission buffer and also set a quantization step size with a larger quantization step size than a quantization step size used to code the video frame stored in said temporary buffer and send the quantization step size to said coding device.

7. The video coding device according to claim 6, wherein said transmission controller is further operable to calculate an average throughput in a predetermined constant period of time and to send the average throughput to said frame dropping/quantization controller, and
   said frame dropping/quantization control means is further operable to:
      calculate a maximum amount of the information transmittable in a maximum permissible delay time based on a predetermined maximum permissible delay time and the average throughput calculated in said transmission controller, and
      use the calculated maximum amount of the information as the frame dropping threshold.

8. The video coding device according to claim 7, wherein said frame dropping/quantization controller is further operable to calculate an average delay time based on an average amount of the generated information of the video frame transmitted in a constant period of time and the average throughput, and
   use the calculated average delay time as the maximum permissible delay time.

9. A video coding device for use with operating points that are predetermined as a balance between timewise distortion due to frame dropping according to a coding rate, which is a rate of frames transmittable per unit time, and spacial distortion due to a quantization step size when low bit rate compression and for use in coding a moving picture and transmitting the coded video data through a communication line with a low bit rate, said video coding device comprising:
   a video input portion operable to form a video frame from a picture signal and to output the video frame;
   a coding device operable to code the video frame formed in said video input portion;
   a transmission buffer operable to store the video data coded in said coding device;
   a quantization controller operable to determine a quantization step size corresponding to communication conditions; and
   a transmission controller operable to transmit the video data in said transmission buffer at a certain transmission rate;

wherein said quantization controller is operable to calculate an average throughput in a predetermined constant period of time, calculate the coding rate based on the calculated average throughput and the amount of generated information per one frame resulting from coding in said coding device, determine a quantization step size most suitable in view of visual properties corresponding to the calculated coding rate and send the quantization step size to said coding device, and send said coding device a notice to code one video frame when the remaining amount of data in said transmission buffer falls below a certain threshold.

10. The video coding device according to claim 9, further comprising;
a temporary buffer disposed between said coding device and said transmission buffer for temporarily storing the video data of the video frame coded in said coding device; and
a frame dropping/quantization controller operable to determine whether to store the video data in said temporary buffer into said transmission buffer and to determine a quantization step size for a video frame to be coded next;
wherein said frame dropping/quantization controller is operable to:
calculate the amount of information transmittable in a maximum permissible delay time based on a predetermined maximum permissible delay time and the average throughput calculated in said quantization controller, and
perform frame dropping control so as not to store the video data in said temporary buffer into said transmission buffer if the amount of information of the video frame stored in said temporary buffer is larger than the amount of information transmittable in the maximum permissible delay time and to set a quantization step size with a larger quantization step size than a quantization step size used to code the video frame stored in said temporary buffer and send the quantization step size to said coding device.

11. The video coding device according to claim 9, further comprising;
a temporary buffer disposed between said coding device and said transmission buffer for temporarily storing the video data of the video frame coded in said coding device, and
a frame dropping/quantization controller operable to determine whether to store the video data in said temporary buffer into said transmission buffer and to determine a quantization step size for a video frame to be coded next,
wherein said frame dropping/quantization controller is operable to:
calculate an average delay time based on an average amount of the generated information of the video frame transmitted in a constant period of time and the average throughput calculated in said quantization controller,
calculate the amount of information transmittable in the average delay time based on the average throughput and the average delay time, and
perform frame dropping control of not storing the video data in said temporary buffer into said transmission buffer if the amount of information of the video frame stored in said temporary buffer is larger than the amount of information transmittable in the average delay time and to set a quantization step size with a larger quantization step size than a quantization step size used to code the video frame stored in said temporary buffer and send the quantization step size to said coding device.

12. The video coding device according to claim 9, wherein when said quantization controller calculates the average throughput, the time over which the average is calculated is variable according to whether a burst error occurs or not.

13. The video coding device according to claim 9, wherein the predetermined constant period of time for calculating the average throughput is not less than 300 msec.

14. A video coding device for coding and transmitting a moving picture, said video coding device comprising:
a video input portion operable to form a video frame from a picture signal and to output the video frame;
a coding device operable to code the video frame formed in said video input portion;
a transmission buffer operable to store the video data of the video frame coded in said coding device;
a quantization controller operable to determine a quantization step size used in coding;
a transmission controller operable to transmit the video data in said transmission buffer at a certain transmission rate;
a motion threshold memory operable to store a motion threshold for determining whether motion of an object is large or small; and
a maximum permissible delay time memory operable to store a maximum permissible delay time which is a limit of a transmission delay which does not cause visually unnatural impression;
wherein said coding device is operable, when the amount of generated information per one frame resulting from coding in said coding device is larger than the motion threshold, to:
obtain a quantization ratio which is a ratio of a quantization step size used to code the video frame exceeding the motion threshold and a quantization step size for which the amount of generated information is to be predicted,
predict the amount of information generated when the quantization step size is changed from the amount of generated information of the video frame exceeding the motion threshold and the quantization ratio, and
determine a quantization step size transmittable in the maximum permissible delay time from the predicted amount of generated information, the transmission rate and the maximum permissible delay time and send the quantization step size to said coding device; and
said coding device is operable to code the video frame with the quantization step size sent from said quantization controller.

15. The video coding device according to claim 14, wherein said transmission controller is further operable to calculate an average throughput in a predetermined constant period of time and send the average throughput to said quantization controller, and
said quantization controller is operable, if the amount of generated information per one frame resulting from coding in said coding device is larger than the motion threshold, to:

obtain a quantization ratio which is a ratio of a quantization step size used to code the video frame exceeding the motion threshold and a quantization step size for which the amount of generated information is to be predicted, predict the amount of information generated when the quantization step size is changed from the amount of generated information of the video frame exceeding the motion threshold and the quantization ratio, and determine a quantization step size transmittable in the maximum permissible delay time from the predicted amount of the generated information, the transmission rate, the average throughput and the maximum permissible delay time and send the quantization step size to said coding device.

16. The video coding device according to claim 15, wherein when said transmission controller calculates the average throughput, the time for obtaining the average is variable according to whether a burst error occurs or not.

17. The video coding device according to claims 15, wherein the predetermined constant period of time for calculating the average throughput is not less than 300 msec.

18. A video coding device for coding and transmitting a moving picture, said video coding device comprising:

a video input portion operable to form a video frame from a picture signal and to output the video frame;

a coding device operable to code the video frame formed in said video input portion;

a transmission buffer operable to store video data of the video frame coded in said coding device;

a quantization controller operable to determine a quantization step size used in coding;

a transmission controller operable to transmit the video data in said transmission buffer at a certain transmission rate;

a motion threshold memory operable to store a motion threshold for determining whether motion of an object is large or small; and an ideal curve memory operable to store an ideal curve with predetermined operating points, most suitable in view of visual properties as a balance between timewise distortion due to frame dropping according to a coding rate which is a rate of frames transmittable per unit time and spacial distortion due to a quantization step size;

wherein said quantization controller is operable, if the amount of generated information per one frame resulting from coding in said coding device is larger than said motion threshold, to:

obtain a quantization ratio which is a ratio of a quantization step size used to code the video frame exceeding the motion threshold and a quantization step size for which the amount of generated information is to be predicted, predict the amount of information generated when the quantization step size is changed from the amount of generated information of the video frame exceeding the motion threshold and the quantization ratio, calculate the coding rate from the predicted amount of the generated information and the transmission rate, and determine a quantization step size most suitable in view of visual properties from the calculated coding rate and the ideal curve and send the quantization step size to said coding device, and said coding device is operable to code the video frame with the quantization step size sent from said quantization controller.

19. The video coding device according to claim 18, wherein said transmission controller is further operable to calculate an average throughput in a predetermined constant period of time and to send the average throughput to said quantization controller, and said quantization controller is operable, when the amount of generated information per one frame resulting from coding in said coding device is larger than said motion threshold, quantization control to obtain a quantization ratio which is a ratio of a quantization step size used to code the video frame exceeding the motion threshold and a quantization step size the amount of generated information for which is to be predicted, predict the amount of information generated when the quantization step size is changed from the amount of generated information of the video frame exceeding the motion threshold and the quantization ratio, calculate the coding rate from the predicted amount of the generated information, the transmission rate and the average throughput, and determine a quantization step size most suitable in view of visual properties from the calculated coding rate and the ideal curve and send the quantization step size to said coding device.

20. The video coding device according to claim 19, wherein when said transmission controller calculates the average throughput, the time over which the average is obtained is variable according to whether a burst error occurs or not.

21. The video coding device according to claim 19, wherein the predetermined constant period of time for calculating the average throughput is not less than 300 msec.

22. A video transmission system comprising a video coding device operable to code and transmit a moving picture, and a video receiving device operable to apply certain processing to received video data, wherein said video coding device and said video receiving device are connected so that they can communicate, wherein said video receiving device is operable to calculate an error rate of the received video data and if the calculated error rate exceeds a certain threshold, to transmit an error signal to said video coding device, and said video coding device comprises, a video input portion operable to form a video frame from a picture signal and to output the video frame, a coding device operable to code the video frame formed in said video input portion, a transmission buffer operable to store the video data coded in said coding device, a transmission controller operable to transmit the video data in said transmission buffer at a certain transmission rate, a first quantization controller operable to determine a most suitable quantization step size in view of both reproducibility of motion and video quality, an error correction coding device operable to add error correcting codes with different error correcting capabilities to the video data coded in said coding device, and a second quantization controller operable to determine a quantization step size corresponding to communication conditions and to control said error correction coding device according to the error signal, wherein when said second quantization controller receives the error signal from said video receiving device, said second quantization controller is operable to set a quantization step size with a larger quantization step size than a quantization step size corresponding to the quantization step size determined in said first quantization controller and send the quantization step size to said coding device and output a selection signal instructing said error correction coding device to add an error correcting code with a high error correcting capability, and when said second quantization controller does not receive the notice of error signal in a predetermined constant period of time, said second quantization controller is operable to send the quantization step size determined in said first quantization controller unchanged to said coding device and output a selection signal instructing said error correction coding device to add an error correcting code with a low error correcting capability, said coding device is operable to code the video frame with the quantization step size sent from said second quantization controller, and said error correction coding device is operable to add the error correcting code indicated by the selection signal to the video data coded in said coding device.

23. The video transmission system according to claim 22, wherein said video receiving device is operable to calculate an average of the error rate calculated in a predetermined constant period of time and if the calculated average error rate exceeds a certain threshold, to send the error signal to said video coding device.

24. The video transmission system according to claim 22 or 23, wherein said video coding device further comprises, a temporary buffer, disposed between said coding device and said transmission buffer, operable to temporarily store the video data of the video frame coded in said coding device, and a frame dropping/quantization controller operable to determine whether to store the video data in said temporary buffer into said transmission buffer and to determine a quantization step size for a video frame to be coded next, wherein said frame dropping/quantization controller is operable to:

perform threshold control of lowering a frame dropping threshold for determining whether to store the video data in said temporary buffer into said transmission buffer from a predetermined value when receiving the error signal from said video receiving device, and when not receiving notice of the error signal in a predetermined constant period of time, to return the frame dropping threshold to the predetermined value, and if the amount of information of the video data in said temporary buffer is larger than the frame dropping threshold controlled in the threshold control, to perform frame dropping control not to store the video data in said temporary buffer into said transmission buffer, and also set a quantization step size with a larger quantization step size than a quantization step size used to code the video frame stored in said temporary buffer and sends the quantization step size to said coding device.

25. A video transmission system comprising a video coding device operable to code and transmit a moving picture, and a video receiving device operable to apply certain processing to received video data, wherein said video coding device and said video receiving device are communicably connected, wherein said video receiving device is operable to calculate an error rate of the received video data and to transmit the error rate to said video coding device, and said video coding device comprises, a video input portion operable to form a video frame from a picture signal and to output the video frame, a coding device operable to code the video frame formed in said video input portion, a transmission buffer operable to store the video data coded in said coding device, a transmission controller operable to transmit the video data in said transmission buffer at a certain transmission rate, a first quantization controller operable to determine a most suitable quantization step size in view of both reproducibility of motion and video quality, an error correction coding device operable to add error correcting codes with different error correcting capabilities to the video data coded in said coding device, and a second quantization controller operable to determine a quantization step size corresponding to communication conditions and to control said error correction coding device according to the error rate, wherein if the error rate received by said video coding device from said video receiving device exceeds a predetermined threshold, said second quantization controller is operable to set a quantization step size with a larger quantization step size than a quantization step size corresponding to the quantization step size determined in said first quantization controller and send the quantization step size to said coding device, and output a selection signal instructing said error correction coding device to add the error correcting code with a high error correcting capability, and if said error rate received by said video coding device from said video receiving device does not exceed the threshold in a predetermined constant period of time, said second quantization controller is operable to send the quantization step size determined in said first quantization controller unchanged to said coding device and output a selection signal instructing said error correction coding device to add the error correcting code with a low error correcting capability, said coding device is operable to code the video frame with the quantization step size sent from said second quantization controller, and said error correction coding device is operable to add the error correcting code indicated by the selection signal to the video data coded in said coding device.

26. The video transmission system according to claim 25, wherein;

said second quantization controller is operable to calculate an average of the error rate received from said video receiving device in a predetermined constant period of time, and if the calculated average error rate exceeds a predetermined threshold, said second quantization controller is operable to set a quantization step size with a larger quantization step size than a quantization step size corresponding to the quantization step size determined in said first quantization controller and send the quantization step size to said coding device and output a selection signal instructing said error correction coding device to add the error correcting code with a high correcting capability, and if the average error rate does not exceed the threshold in a predetermined constant period of time, said second quantization controller is operable to send the quantization step size determined in said first quantization controller unchanged to said coding device and output a selection signal instructing said error correction coding device to add the error correcting code with a low error correcting capability.

27. The video transmission system according to claim 26, wherein said video coding device further comprises:

a temporary buffer, disposed between said coding device and said transmission buffer, operable to temporarily store the video data of the video frame coded in said coding device, and a frame dropping/quantization controller operable to determine whether to store the video data in said temporary buffer into said transmission buffer and to determine a quantization step size for a video frame coded next, wherein said frame dropping quantization controller is operable to:

perform threshold control of lowering a frame dropping threshold for determining whether to store the video data in said temporary buffer into said transmission buffer from a predetermined value when the average error rate calculated in said second quantization controller exceeds a predetermined threshold, and returning the frame dropping threshold to the predetermined value when the average error rate does not exceed the threshold in a predetermined constant period of time, and perform frame dropping control of not storing the video data in said temporary buffer into said transmission buffer if the amount of information of the video data in said temporary buffer is larger than the frame dropping threshold controlled in the threshold control and also set a quantization step size with a larger quantization step size than a quantization step size used to code the video frame stored in said temporary buffer and send the quantization step size to said coding device.

28. The video transmission system according to claim 25, wherein said video coding device further comprises:

a temporary buffer, disposed between said coding device and said transmission buffer, operable to temporarily store the video data of the video frame coded in said coding device, and a frame dropping/quantization controller operable to determine whether to store the video data in said temporary buffer into said transmission buffer and to determine a quantization step size for a video frame coded next, wherein said frame dropping/quantization controller is operable to:

perform threshold control of lowering a frame dropping threshold for determining whether to store the video data in said temporary buffer into said transmission buffer from a predetermined value when the error rate received from said video receiving device exceeds a predetermined threshold, and return the frame dropping threshold to the predetermined value when the error rate does not exceed the threshold in a predetermined constant period of time, and perform frame dropping control not to store the video data in said temporary buffer into said transmission buffer if the amount of information of the video data in said temporary buffer is larger than the frame dropping threshold controlled in the threshold control and also set a quantization step size with a larger quantization step size than a quantization step size used to code the video frame stored in said temporary buffer and send the quantization step size to said coding device.

29. A video transmission system comprising a video coding device operable to code and transmit a moving picture, and a video receiving device operable to apply certain processing to received video data, wherein said video coding device and said video receiving device are connected so that they can communicate, wherein said video coding device is operable to obtain an error rate of the received video data, calculate an average of the error rate obtained in a predetermined constant period of time, and transmit the calculated average error rate to said video coding device, said video coding device comprises, a video input portion operable to form a video frame from a picture signal and to output the video frame, a coding device operable to code the video frame formed in said video input portion, a transmission buffer operable to store the video data coded in said coding device, a transmission controller operable to transmit the video data in said transmission buffer at a certain transmission rate, a first quantization controller operable to determine a most suitable quantization step size in view of both reproducibility of motion and video quality, an error correction coding device operable to add error correcting codes with different error correcting capabilities to the video data coded in said coding device, and a second quantization controller operable to determine a quantization step size corresponding to communication conditions and to control said error correction coding device according to the average error rate, wherein, when the average error rate received by said video coding device from said video receiving device exceeds a predetermined threshold, said second quantization controller is operable to set a quantization step size with a larger quantization step size than a quantization step size corresponding to the quantization step size determined in said first quantization controller and send the quantization step size to said coding device and output a selection signal instructing said error correction coding device to add the error correcting code with a high error correcting capability, and when the average error rate does not exceed the threshold in a predetermined constant period of time, said second quantization controller is operable to send the quantization step size determined in said first quantization controller unchanged to said coding device and output a selection signal instructing said error correction coding device to add the error correcting code with a low error correcting capability, said coding means is operable to code the video frame with the quantization step size sent from said second quantization controller, and said error correction coding device is operable to add the error correcting code indicated by the selection signal to the video data coded in said coding device.

30. The video transmission system according to claim 29, wherein said video coding device further comprises,
- a temporary buffer, disposed between said coding device and said transmission buffer, operable to temporarily store the video data of the video frame coded in said coding device, and
- a frame dropping/quantization controller operable to determine whether to store the video data in said temporary buffer into said transmission buffer and to determine a quantization step size for a video frame to be coded next,
- wherein said frame dropping/quantization controller is operable to:
  - perform threshold control of lowering a frame dropping threshold for determining whether to store the video data in said temporary buffer into said transmission buffer from a predetermined value when the average error rate received from said video receiving device exceeds a predetermined threshold, and to return the frame dropping threshold to the predetermined value when the average error rate does not exceed the threshold in a predetermined constant period of time, and
  - perform frame dropping control of not storing the video data in said temporary buffer into said transmission buffer if the amount of information of the video data in said temporary buffer is larger than the frame dropping threshold controlled in the threshold control and also set a quantization step size with a larger quantization step size than a quantization step size used to code the video frame stored in said temporary buffer and send the quantization step size to said coding device.

31. A video transmission system comprising a video coding device operable to code and transmit a moving picture and a video receiving device operable to apply certain processing to received video data, wherein said video coding device and said video receiving device are connected so that they can communicate,
- wherein said video receiving device is operable to calculate an error rate of the received video data and transmit an error signal to said video coding device if the calculated error rate exceeds a certain threshold, and
- said video coding device comprises,
  - a video input portion operable to form a video frame from a picture signal and output the video frame,
  - a coding device operable to code the video frame formed in said video input portion,
  - a transmission buffer operable to store the video data coded in said coding device,
  - a transmission controller operable to transmit the video data in said transmission buffer at a certain transmission rate,
  - a temporary buffer, disposed between said coding device and said transmission buffer, operable to temporarily store the video data of the video frame coded in said coding device,
  - a frame dropping/quantization controller operable to determine whether to store into said transmission buffer the video data in said temporary buffer and to determine a quantization step size for a video frame coded next, and
  - an error correction coding device operable to add error correcting codes with different error correcting capabilities to the video data in said temporary buffer and to store the data in said transmission buffer,
  - wherein said frame dropping/quantization controller is operable to:
    - perform threshold control of lowering a frame dropping threshold for determining whether to store the video data in said temporary buffer into said transmission buffer from a predetermined value when receiving the error signal, and to output a selection signal instructing said error correction coding device to add an error correcting code with a high error correcting capability,
    - perform threshold control of returning the frame dropping threshold to the predetermined value if not receiving notice of the error signal in a predetermined constant period of time, and to output a selection signal instructing said error correction coding device to add an error correcting code with a low error correcting capability, and
    - perform frame dropping control not to store into said transmission buffer the video data in said temporary buffer if the amount of information of the video data in said temporary buffer is larger than the frame dropping threshold controlled in the threshold control and also set a quantization step size with a larger quantization step size than a quantization step size used to code the video frame stored in said temporary buffer and send the quantization step size to said coding device, and
  - said error correction coding device is operable to add the error correcting code indicated by the selection signal to the video data coded in said coding device.

32. The video transmission system according to claim 31, wherein said video receiving device is operable to calculate an average of the error rate calculated in a predetermined constant period of time and if the calculated average error rate exceeds a certain threshold, said video receiving device is operable to send the error signal to said video coding device.

33. A video transmission system comprising a video coding device operable to code and transmit a moving picture and a video receiving device operable to apply certain processing to received video data, wherein said video coding device and said video receiving device are communicably connected,
- wherein said video receiving device is operable to calculate an error rate of the received video data and transmit the error rate to said video coding device, and
- said video coding device comprises,
  - a video input portion operable to form a video frame from a picture signal and output the video frame,
  - a coding device operable to code the video frame formed in said video input portion,
  - a transmission buffer operable to store the video data coded in said coding device,
  - a transmission controller operable to transmit the video data in said transmission buffer at a certain transmission rate,
  - a temporary buffer, disposed between said coding device and said transmission buffer, operable to temporarily store the video data of the video frame coded in said coding device,
  - a frame dropping/quantization controller operable to determine whether to store the video data in said temporary buffer into said transmission buffer and to determine a quantization step size for a video frame to be coded next, and
  - an error correction coding device operable to add error correcting codes with different error correcting capabilities to the video data in said temporary buffer and to store the data in said transmission buffer,
wherein said frame dropping/quantization controller is operable to:
perform threshold control of lowering a frame dropping threshold for determining whether to store into said transmission buffer the video data in said temporary buffer from a predetermined value when the error rate exceeds a predetermined threshold, and to output a selection signal instructing said error correction coding device to add the error correcting code with a high error correcting capability,
perform threshold control of returning the frame dropping threshold to the predetermined value when the error rate does not exceed the predetermined threshold in a predetermined constant period of time, and to output a selection signal instructing said error correction coding device to add the error correcting code with a low error correcting capability, and
perform frame dropping control of not storing the video data in said temporary buffer into said transmission buffer if the amount of information of the video data in said temporary buffer is larger than the frame dropping threshold controlled in the threshold control and also set a quantization step size with a larger quantization step size than a quantization step size used to code the video frame stored in said temporary buffer and send the quantization step size to said coding device, and
said error correction coding device adds the error correcting code indicated by said selection signal to the video data coded in said coding device.

34. The video transmission system according to claim 33, wherein said video coding device further comprises an average error rate calculator operable to calculate an average error rate which is an average of the error rate received from said video receiving device in a predetermined constant period of time,
wherein said frame dropping/quantization controller is operable to:
perform threshold control of lowering a frame dropping threshold for determining whether to store the video data in said temporary buffer into said transmission buffer from a predetermined value when said average error rate exceeds a predetermined threshold, and output a selection signal instructing said error correction coding device to add an error correcting code with a high error correcting capability,
perform threshold control of returning the frame dropping threshold to the predetermined value if the average error rate does not exceed the predetermined threshold in a predetermined constant period of time, and outputs a selection signal instructing said error correction coding device to add an error correcting code with a low error correcting capability, and
perform frame dropping control of not storing the video data in said temporary buffer into said transmission buffer if the amount of information of the video data in said temporary buffer is larger than the frame dropping threshold controlled in the threshold control and also set a quantization step size with a larger quantization step size than a quantization step size used to code the video frame stored in said temporary buffer and send the quantization step size to said coding device, and said error correction coding device is operable to add the error correcting code indicated by the selection signal to the video data coded in said coding device.

35. A video transmission system comprising a video coding device operable to code and transmit a moving picture and a video receiving device operable to apply certain processing to received video data, wherein said video coding device and said video receiving device are communicably connected,
wherein said video receiving device is operable to obtain an error rate of the received video data, calculate an average of the error rate obtained in a predetermined constant period of time and transmit the calculated average error rate to said video coding device, and
said video coding device comprises,
a video input portion operable to form a video frame from a picture signal and output the video frame,
a coding device operable to code the video frame formed in said video input portion,
a transmission buffer operable to store the video data coded in said coding device,
a transmission means for controller operable to transmit the video data in said transmission buffer at a certain transmission rate,
a temporary buffer, disposed between said coding device and said transmission buffer, operable to temporarily store the video data of the video frame coded in said coding device,
a frame dropping/quantization controller operable to determine whether to store the video data in said temporary buffer into said transmission buffer and to determine a quantization step size for a video frame coded next, and
an error correction coding device operable to add error correcting codes with different error correcting capabilities to the video data in said temporary buffer and to store the data in said transmission buffer,
wherein, when the average error rate exceeds a predetermined threshold, said frame dropping/quantization controller is operable to perform threshold control of lowering a frame dropping threshold for determining whether to store the video data in said temporary buffer into said transmission buffer from a predetermined value, and to output a selection signal instructing said error correction coding device to add an error correcting code with a high error correcting capability,
when the average error rate does not exceed the predetermined threshold in a predetermined constant period of time, said frame dropping/quantization controller is operable to perform threshold control of returning the frame dropping threshold to the predetermined value, and to output a selection signal instructing said error correction coding device to add an error correcting code with a low error correcting capability, and
when the amount of information of the video data in said temporary buffer is larger than the frame dropping threshold controlled in the threshold control, said frame dropping/quantization controller is operable to perform frame dropping control of not storing the video data in said temporary buffer into said transmission buffer, and also to set a quantization step size with a larger quantization step size than a quantization step size used to code the video frame stored in said temporary buffer and send the quantization step size to said coding device and said error correction coding device is operable to add the error correcting code indicated by the selection signal to the video data coded in said coding device.

36. A video transmission system comprising a video coding device operable to code and transmit a moving picture and a video receiving device operable to apply certain processing to received video data, wherein said video coding device and said video receiving device are connected such that they can communicate, wherein said video receiving device is operable to count the number of bits of data correctly received in a predetermined constant period of time and transmit the counted number of bits to said video coding device, and said video coding device comprises,
- a video input portion operable to form a video frame from a picture signal and output the video frame,
- a coding device operable to code the video frame formed in said video input device,
- a transmission buffer operable to store the video data coded in said coding device,
- a quantization controller operable to determine a quantization step size corresponding to communication conditions, and
- a transmission controller operable to transmit the video data in said transmission buffer at a certain transmission rate and to output said bit number received from said video receiving device to said quantization controller,
- wherein said quantization controller is operable to,
  - calculate an average throughput in the constant period of time on the basis of the bit number received from said transmission controller,
  - calculate a coding rate based on the calculated average throughput and the amount of generated information per one frame resulting from coding in said coding device, and
  - determine a quantization step size most suitable in view of visual properties corresponding to the calculated coding rate and send the quantization step size to said coding device.

37. The video transmission system according to claim 36, wherein when said quantization controller calculates the average throughput, the time for obtaining the average is variable according to variation of the number of bits.

38. The video transmission system according to claim 36, wherein the predetermined constant period of time for calculating the average throughput is not less than 300 msec.

39. A video transmission system comprising a video coding device operable to code and transmit a moving picture and a video receiving device operable to apply certain processing to received video data, wherein said video coding device and said video receiving device are connected so that they can communicate, wherein said video receiving device is operable to count the number of bits of data correctly received in a predetermined constant period of time, calculate an average throughput from the counted bit number and transmit the average throughput to said video coding device, and said video coding device comprises,
- a video input portion operable to form a video frame from a picture signal and output the video frame,
- a coding device operable to code the video frame formed in said video input portion,
- a transmission buffer operable to store the video data coded in said coding device,
- a quantization controller operable to determine a quantization step size corresponding to communication conditions, and
- a transmission controller operable to transmit the video data in said transmission buffer at a certain transmission rate and to output the average throughput received from said video receiving device to said quantization controller,
- wherein said quantization controller is operable to,
  - calculate a coding rate based on the average throughput received from said transmission controller and the amount of generated information per one frame resulting from coding in said coding device, and
  - determine a quantization step size most suitable in view of visual properties corresponding to the calculated coding rate and send the quantization step size to said coding device.

40. A video transmission system comprising a video coding device operable to code and transmit a moving picture and a video receiving device operable to apply certain processing to received video data, wherein said video coding device and said video receiving device are communicably connected through one or more relay stations, wherein when detecting an error of the received data, said video receiving device is operable to make automatic retransmission between an adjacent one of said relay stations and itself and transmit retransmission occurrence information indicating the occurrence of the retransmission to said video coding device, and said video coding device comprises,
- a video input portion operable to form a video frame from a picture signal and output the video frame,
- a coding device operable to code the video frame formed in said video input portion,
- a transmission buffer operable to store the video data coded in said coding device,
- a first quantization controller operable to determine a quantization step size most suitable in view of both reproducibility of motion and video quality,
- a second quantization controller operable to control a quantization step size according to communication conditions, and
- a transmission controller operable to transmit the video data in said transmission buffer at a certain transmission rate, and when a communication error occurs between an adjacent one of said relay stations and said video coding device, said transmission controller is operable to make automatic retransmission between said adjacent relay station and said video coding device, and when said transmission controller it self makes retransmission, or when it receives the retransmission occurrence information from said video receiving device, said transmission controller is operable to send error information indicating the occurrence of the retransmission to said second quantization controller,
- wherein when said second quantization controller receives the notice of the error information from said transmission controller, said second quantization controller is operable to set a quantization step size with a larger quantization step size than a quantization step size corresponding to the quantization step size determined in said first quantization controller and to send the quantization step size to said coding device, and
- when said second quantization controller does not receive the notice of the error information from said transmission controller over a predetermined constant period of time, said second quantization controller is operable to send the quantization step size determined in said first quantization controller unchanged to said coding device, and said coding means is operable to code a video frame to be coded next with the quantization step size sent from said second quantization controller.

41. The video transmission system according to claim 40, wherein said video coding device further comprises, a temporary buffer, disposed between said coding device and said transmission buffer, operable to temporarily store the video data of the video frame coded in said coding device, and a frame dropping/quantization controller operable to determine whether to store into said transmission buffer the video data in said temporary buffer and to determine a quantization step size for a video frame to be coded next, wherein said transmission controller is operable to send the error information indicating the occurrence of the retransmission further to said frame dropping/quantization controller, and said frame dropping/quantization controller is operable to, perform threshold control of lowering a frame dropping threshold for determining whether to store the video data in said temporary buffer into said transmission buffer from a predetermined value when receiving notice of the error information from said transmission controller, and when not receiving the notice of the error information from said transmission controller in a predetermined constant period of time, said frame dropping/quantization controller is operable to return said frame dropping threshold to the predetermined value, and frame dropping control of not storing the video data in said temporary buffer into said transmission buffer if the amount of information of the video data in said temporary buffer is larger than the frame dropping threshold controlled in the threshold control and also set a quantization step size with a larger quantization step size than a quantization step size used to code the video frame stored in said temporary buffer and send the quantization step size to said coding device.

42. A video transmission system comprising a video coding device operable to code and transmit a moving picture and a video receiving device operable to apply certain processing to received video data, wherein said video coding device and said video receiving device are connected so that they can communicate, wherein said video receiving device is operable to count the number of bits of data correctly received in a predetermined constant period of time and to transmit the counted number of bits to said video coding device, and said video coding device comprises, a video input portion operable ton form a video frame from a picture signal and to output the video frame, a coding device operable to code the video frame formed in said video input portion, a transmission buffer operable to store the video data of the video frame coded in said coding device, a temporary buffer, disposed between said coding device and said transmission buffer, operable to temporarily store the video data of the video frame coded in said coding device, a frame dropping/quantization controller operable to determine whether to store the video data in said temporary buffer into said transmission buffer and to determine a quantization step size for a video frame to be coded next, and a transmission controller operable to transmit the video data in said transmission buffer at a certain transmission rate and to calculate an average throughput from the bit number received from said video receiving device, wherein said frame dropping/quantization controller is operable to, calculate the amount of information transmittable in a maximum permissible delay time on the basis of a predetermined maximum permissible delay time and the average throughput, and perform frame dropping control of not storing into said transmission buffer the video data in said temporary buffer if the amount of information of the video frame stored in said temporary buffer is larger than the amount of information transmittable in the maximum permissible delay time and also set a quantization step size with a larger quantization step size than a quantization step size used to code the video frame stored in said temporary buffer and send the quantization step size to said coding device.

43. The video transmission system according to claim 42, wherein said frame dropping/quantization controller is further operable to, calculate an average delay time based on an average amount of the generated information of the video frame transmitted in a constant period of time and the average throughput, and use the calculated average delay time as the maximum permissible delay time.

44. The video transmission system according to claim 42, wherein when said transmission controller calculates said average throughput, the time over which average is obtained is variable according to variation of the number of bits.

45. The video transmission system according to claims 42, wherein the predetermined constant period of time for calculating the average throughput is not less than 300 msec.

46. A video transmission system comprising a video coding device operable to code and transmit a moving picture and a video receiving device operable to apply certain processing to received video data, wherein said video coding device and said video receiving device are connected so that they can communicate, wherein said video receiving device is operable to count the number of bits ofdata correctly received in a predetermined constant period of time, calculate an average throughput from the counted bit number and transmit the average throughput to said video coding device, and said video coding device comprises, a video input portion operable to form a video frame from a picture signal and output the video frame, a coding device operable to code the video frame formed in said video input portion, a transmission buffer operable to store the video data of the video frame coded in said coding device, a temporary buffer, disposed between said coding device and said transmission buffer, operable to temporarily store the video data of the video frame coded in said coding device, a frame dropping/quantization controller operable to determine whether to store into said transmission buffer the video data in said temporary buffer and to determine a quantization step size of a video frame to be coded next, and a transmission controller operable to transmit the video data in said transmission buffer at a certain transmission rate and to output the average throughput received from said video receiving device to said frame dropping/quantization controller, wherein said frame dropping/quantization controller is operable to, calculate an amount of the information transmittable in a maximum permissible delay time based on a predetermined maximum permissible delay time and the average throughput, and perform frame dropping control not to store the video data in said temporary buffer into said transmission buffer if the amount of information of the video frame stored in said temporary buffer is larger than the amount of information transmittable in the maximum permissible delay time and also set a quantization step size with a larger quantization step size than a quantization step size used to code the video frame stored in said temporary buffer and send the quantization step size to said coding device.

47. A video transmission system comprising a video coding device operable to code and transmit a moving picture and a video receiving device operable to apply certain processing to received video data, wherein said video coding device and said video receiving device are communicably connected, wherein said video receiving device is operable to count the number of bits of data correctly received in a predetermined constant period of time and to transmit the counted bit number to said video coding device, and said video coding device, comprises a video input portion operable to form a video frame from a picture signal and to output the video frame, a coding device operable to code the video frame formed in said video input portion, a transmission buffer operable to store the video data of the video frame coded in said coding device, a quantization controller operable to determine a quantization step size used in coding, a transmission controller operable to transmit the video data in said transmission buffer at a certain transmission rate and to calculate an average throughput from the number of bits received from said video receiving device and to output the average throughput to said quantization control controller, a motion threshold memory operable to store a motion threshold for determining whether motion of an object is large or small, and a maximum permissible delay time memory operable to store a maximum permissible delay time which is a limit of a transmission delay which does not cause visually unnatural impression, wherein if the amount of generated information per one frame resulting from coding in said coding device is larger than the motion threshold, said quantization controller is operable to:

obtain a quantization ratio which is a ratio of a quantization step size used to code the video frame exceeding the motion threshold and a quantization step size for which the amount of generated information is to be predicted, predict the amount of information generated when the quantization step size is changed from the amount of generated information of the video frame exceeding the motion threshold and the quantization ratio, and determine a quantization step size transmittable in the maximum permissible delay time from the predicted amount of the generated information, the average throughput, the transmission rate and the maximum permissible delay time and send the quantization step size to said coding device, and said coding device is operable to code the video frame with the quantization step size sent from said quantization controller.

48. The video transmission system according to claim 47, wherein when said transmission controller calculates the average throughput, the time for averaging is variable according to variation of the number of bits.

49. The video transmission system according to claims 47, wherein the predetermined constant period of time for calculating the average throughput is not less than 300 msec.

50. A video transmission system comprising a video coding device operable to code and transmit a moving picture and a video receiving device operable to apply certain processing to received video data, wherein said video coding device and said video receiving device are connected such that they can communicate, wherein said video receiving device is operable to count the number of bits of data correctly received in a predetermined constant period of time, calculate an average throughput from the counted bit number and to transmit the average throughput to said video coding device, and said video coding device comprises, a video input portion operable to form a video frame from a picture signal and to output the video frame, a coding device operable to code the video frame formed in said video input portion, a transmission buffer operable to store video data of the video frame coded in said coding device, a quantization controller operable to determine a quantization step size used in coding, a transmission controller operable to transmit the video data in said transmission buffer at a certain transmission rate, and to calculate the average throughput from the bit number received from said video receiving device to output to said quantization controller, a motion threshold memory operable to store a motion threshold for determining whether motion of an object is large or small, and a maximum permissible delay time memory operable to store a maximum permissible delay time which is a limit of a transmission delay which does not cause visually unnatural impression, wherein when the amount of generated information per one frame resulting from coding in said coding device is larger than the motion threshold, said quantization controller is operable to:

obtain a quantization ratio which is a ratio of a quantization step size used to code the video frame exceeding the motion threshold and a quantization step size the amount of generated information for which is to be predicted, predict the amount of information generated when the quantization step size is changed from the amount of information of the video frame exceeding the motion threshold and the quantization ratio, and determine a quantization step size transmittable in the maximum permissible delay time from the predicted amount of the generated information, the average throughput, the transmission rate and the maximum permissible delay time and send the quantization step size to said coding device, and said coding device is operable to code the video frame with the quantization step size sent from said quantization controller.

51. A video transmission system comprising a video coding device operable to code and transmit a moving picture and a video receiving device operable to apply certain processing to received video data, wherein said video coding device and said video receiving device are communicably connected, wherein said video receiving device is operable to count the number of bits of data correctly received in a predetermined constant period of time and to transmit the counted bit number to said video coding device, and said video coding device, comprises
 a video input portion operable to form a video frame from a picture signal and to output the video frame,
 a coding device operable to code the video frame formed in said video input portion,
 a transmission buffer operable to store video data of the video frame coded in said coding device,
 a quantization controller operable to determine a quantization step size used in coding,
 a transmission controller operable to transmit the video data in said transmission buffer at a certain transmission rate and to calculate an average throughput from the number of bits transmission confirmed in a predetermined constant period of time and to output the average throughput to said quantization controller,
 a motion threshold memory operable to store a motion threshold for determining whether motion of an object is large or small, and
 an ideal curve memory operable to store an ideal curve with predetermined operating points most suitable in view of visual properties as a balance between distortion in time due to frame dropping according to a coding rate which is a rate of frames transmittable per unit time and spacial distortion due to a quantization step size,
 wherein when the amount of generated information per one frame resulting from coding in said coding device is larger than the motion threshold, said quantization controller is operable to:
 obtain a quantization ratio which is a ratio of a quantization step size used to code the video frame exceeding the motion threshold and a quantization step size for which the amount of generated information is to be predicted,
 predict the amount of information generated when the quantization step size is changed from the amount of generated information of the video frame exceeding the motion threshold and the quantization ratio,
 calculate the coding rate from the predicted amount of the generated information, the transmission rate and the average throughput, and
 determine a quantization step size most suitable in view of visual properties from the calculated coding rate and the ideal curve and send the quantization step size to said coding device, and said coding device is operable to code the video frame with the quantization step size sent from said quantization controller.

52. The video transmission system according to claim 51, wherein when said transmission controller calculates the average throughput, the time over which average is obtained is variable according to variation of the number of bits.

53. The video coding device according to claims 51, wherein the predetermined constant period of time for calculating the average throughput is not less than 300 msec.

54. A video transmission system comprising a video coding device operable to code and transmit a moving picture and a video receiving device operable to apply certain processing to received video data, wherein said video coding device and said video receiving device are connected such that they can communicate, wherein said video receiving device is operable to count the number of bits of data correctly received in a predetermined constant period of time and to calculate an average throughput from the counted bit number and to transmit the average throughput to said video coding device, and said video coding device, comprises
 a video input portion operable to form a video frame from a picture signal and to output the video frame,
 a coding device operable to code the video frame formed in said video input portion,
 a transmission buffer operable to store video data of the video frame coded in said coding device,
 a quantization controller operable to determine a quantization step size used in coding,
 a transmission controller operable to transmit the video data in said transmission buffer at a certain transmission rate and to output the average throughput received from said video receiving device to said quantization controller,
 a motion threshold memory operable to store a motion threshold for determining whether motion of an object is large or small, and
 an ideal curve memory operable to store an ideal curve with predetermined operating points most suitable in view of visual properties as a balance between distortion in time due to frame dropping according to a coding rate which is a rate of frames transmittable per unit time and spacial distortion due to the quantization step size,
 wherein when the amount of generated information per one frame resulting from coding in said coding device is larger than the motion threshold, said quantization controller is operable to:
 obtain a quantization ratio which is a ratio of a quantization step size used to code the video frame exceeding the motion threshold and a quantization step size the amount of generated information for which is to be predicted,
 predict the amount of information generated when the quantization step size is changed from the amount of generated information of the video frame exceeding the motion threshold and the quantization ratio,
 calculate the coding rate from the predicted amount of generated information, the transmission rate and the average throughput, and
 determine a quantization step size most suitable in view of the visual properties from the calculated coding rate and the ideal curve and send the quantization step size to said coding device, and said coding device is operable to code the video frame with the quantization step size sent from said quantization controller.

55. A video transmission system comprising a video coding device operable to code and transmit a moving picture and a video receiving device operable to apply certain processing to received video data, wherein said video coding device and said video receiving device are connected through one or more relay stations so that they can communicate,
   wherein when detecting an error of the received data, said video receiving device is operable to make automatic retransmission between adjacent one of said relay stations and itself,
   said relay station is operable to make automatic retransmission between an adjacent one of said relay stations and itself when detecting an error of received data and to transmit retransmission occurrence information indicating the occurrence of the retransmission to said video coding device, and
   said video coding device comprises,
      a video input portion operable to form a video frame from a picture signal and to output the video frame,
      a coding device operable to code the video frame formed in said video input portion,
      a transmission buffer operable to operate video data coded in said coding device,
      a first quantization controller operable to control a quantization step size most suitable in view of both reproducibility of motion and video quality,
      a second quantization controller operable to control a quantization step size according to communication conditions, and
      a transmission controller operable to transmit the video data in said transmission buffer at a certain transmission rate, and if a communication error occurs between adjacent one of said relay stations and the video coding device, said transmission controller is operable to make automatic retransmission between said adjacent relay station and the video coding device, and when said transmission controller itself makes a retransmission, or when it receives the retransmission occurrence information from said video receiving device, said transmission controller is operable to send error information indicating the occurrence of the retransmission to said second quantization controller,
         wherein when said second quantization controller receives the notice of the error information from said transmission controller, said second quantization controller is operable to set a quantization step size with a larger quantization step size than a quantization step size corresponding to the quantization step size determined in said first quantization control means and send the quantization step size to said coding device, and
         when said second quantization controller does not receive the notice of said error information from said transmission controller over a predetermined constant period of time, said second quantization controller is operable to send the quantization step size determined in said first quantization controller unchanged to said coding device, and
      said coding device is operable to code a video frame coded next with the quantization step size sent from said second quantization controller.

56. A video transmission system comprising a video coding device operable to code and transmit a moving picture and a video receiving device operable to apply certain processing to received video data, wherein said video coding device and said video receiving device are connected through one or more relay stations so that they can communicate,
   wherein when said video receiving device detects an error of the received data, said video receiving device is operable to make automatic retransmission between an adjacent one of said relay stations and itself,
   said relay station is operable to make automatic retransmission between an adjacent one of said relay stations and itself when detecting an error of the received data and transmit retransmission occurrence information indicating the occurrence of the retransmission to said video coding device, and
   said video coding device comprises,
      a video input portion operable to form a video frame from a picture signal and to output the video frame,
      a coding device operable to code the video frame formed in said video input portion,
      a transmission buffer operable to store video data of the video frame coded in said coding device,
      a transmission controller operable to transmit the video data in said transmission buffer at a certain transmission rate,
      a temporary buffer, disposed between said coding device and said transmission buffer, operable to temporarily store the video data of the video frame coded in said coding device, and
      a frame dropping/quantization controller operable to determine whether to store the video data in said temporary buffer into said transmission buffer and to determine a quantization step size for a video frame to be coded next, wherein
      said frame dropping/quantization controller is operable to
         perform threshold control of lowering a frame dropping threshold for determining whether to store the video data in said temporary buffer into said transmission buffer from a predetermined value when receiving notice of the error information from said transmission controller, and return the frame dropping threshold to the predetermined value when not receiving the notice of the error information from said transmission controller in a predetermined constant period of time, and
         perform frame dropping control of not storing into said transmission buffer the video data in said temporary buffer when the amount of information of the video frame stored in said temporary buffer is larger than the frame dropping threshold and also set a quantization step size with a larger quantization step size than a quantization step size used to code the video frame stored in said temporary buffer and send the quantization step size to said coding device, and
      said coding device is operable to code the video frame coded next with the quantization step size sent from said frame dropping/quantization controller.

57. A method for controlling quantization operation when coding a video frame in a video coding device in which operating points most suitable in view of visual properties are predetermined as a balance between distortion in time due to frame dropping according to a coding rate which is a rate of frames transmittable per unit time and spacial distortion due to quantization accuracy when low bit rate compression coding a moving picture and transmitting the coded moving picture through a communication line with a low bit rate, comprising:

a first operation mode including determining a quantization accuracy for next coding according to the relation in magnitude between a coding rate resulting from coding an entire video frame with a certain quantization accuracy and a coding rate at a point most suitable in view of the visual properties corresponding to that quantization accuracy; and a second operation mode including dividing a video area to be coded into a priority area and a non-priority area, coding the priority area with a relatively high first quantization accuracy and coding the non-priority area with a relatively low second quantization accuracy, and determining the quantization accuracy and sizes of the priority area and the non-priority area for the next coding according to the relation in magnitude between a coding rate resulting from coding with the first and second quantization accuracies and a coding rate at a point most suitable in view of the visual properties corresponding to the quantization accuracies, wherein when the quantization accuracy determined in said first operation mode falls below a predetermined permissible lower limit value of the quantization accuracy, the operation mode moves from said first operation mode to said second operation mode, and when the size of said priority area determined in said second operation mode reaches its maximum, the operation mode moves from said second operation mode to said first operation mode.

58. The quantization control method according to claim 57, comprising determining coding rates most suitable in view of the visual properties corresponding to each of the quantization accuracies as a set of points in a region surrounded by an upper limit value and a lower limit value, wherein said first and second operation modes include, increasing the quantization accuracy for the next coding when the coding rate resulting from coding with a certain quantization accuracy exceeds the upper limit value, decreasing the quantization accuracy for the next coding when the coding rate resulting from coding with a certain quantization accuracy falls below the lower limit value, and not changing the quantization accuracy for the next coding when the coding rate resulting from coding with a certain quantization accuracy is within the region between the upper limit value and the lower limit value.

59. The quantization control method according to claim 58, comprising choosing a minimum size of the quantization accuracy, when changed in said first and second operation modes, to a size not less than a value at which a difference of spacial distortion is visually recognizable.

60. The video coding device according to claim 3, wherein when said transmission controller calculates the average throughput, the time over which average is obtained is variable according to whether a burst error occurs or not.

61. The video coding device according to claim 3, wherein the predetermined constant period of time for calculating the average throughput is not less than 300 msec.

62. The video coding device according to claim 7, wherein when said transmission controller calculates the average throughput, the time over which the average is obtained is variable according to whether a burst error occurs or not.

63. The video coding device according to claim 7, wherein the predetermined constant period of time for calculating the average throughput is not less than 300 msec.

64. The video transmission system according to claim 46, wherein said frame dropping/quantization controller is further operable to, calculate an average delay time based on the average amount of the generated information of the video frame transmitted in a constant period of time and the average throughput, and use the calculated average delay time as the maximum permissible delay time.

65. The video transmission device according to claim 46, wherein when said video receiving device calculates the average throughput, the time over which average is obtained is variable according to variation of the number of bits of the data correctly received.

66. The video transmission system according to claim 46, wherein the predetermined constant period of time for calculating the average throughput is not less than 300 msec.

67. The video transmission system according to claim 50, wherein when said video receiving device calculates the average throughput, the time for obtaining the average is variable according to variation of the number of bits of data correctly received.

68. The video transmission system according to claim 50, wherein the predetermined constant period of time for calculating the average throughput is not less than 300 msec.

69. The video transmission device according to claim 54, wherein when said video receiving device calculates the average throughput, the time over which average is obtained is variable according to variation of the number of bits of correctly received data.

70. The video transmission system according to claim 54, wherein the predetermined constant period of time for calculating the average throughput is not less than 300 msec.

71. The video coding device according to claim 10, wherein when said quantization controller calculates the average throughput, the time for calculating the average is variable according to whether burst errors occur or not.

72. The video coding device according to claim 11, wherein when said quantization controller calculates the average throughput, the time for calculating the average is variable according to whether burst errors occur or not.

73. The video coding device according to claim 10, wherein the predetermined certain time for calculating the average throughput is not less than 300 msec.

74. The video coding device according to claim 11, wherein the predetermined certain time for calculating the average throughput is not less than 300 msec.

75. The video coding device according to claim 4, wherein when said transmission controller calculates the average throughput, the time for calculating the average is variable according to whether burst errors occur or not.

76. The video coding device according to claim 4, wherein the predetermined certain time for calculating the average throughput is not less than 300 msec.

77. The video coding device according to claim 8, wherein when said transmission controller calculates the average throughput, the time for calculating the average is variable according to whether burst errors occur or not.

78. The video coding device according to claim 8, wherein the predetermined certain time for calculating the average throughput is not less than 300 msec.

79. The video coding device as in any of claims 3 to 4, 7 to 13, 15 to 17, 19 to 21, 60 to 63, or 71 to 78, wherein the average throughput for the certain time is calculated based on the amount of data outputted in a unit time t from said transmission buffer which temporarily stores the coded data.

80. The video coding device as in any of claims 3, to 4, 7 to 13, 15 to 17, 19 to 21, 60 to 63, or 71 to 78, wherein said transmission controller is operable to calculate the average throughput for the certain time as each of the certain time passes, by dividing by the certain time the amount of data outputted for the certain time, which is obtained by accumulating the amount of data outputted in the unit time t for the certain time, as each of the certain time passes.

81. The video coding device as in any of claims 3 to 4, 7 to 13, 15 to 17, 19 to 21, 60 to 63, or 71 to 78, wherein said transmission controller is operable to calculate the average throughput for the certain time as each of a unit time passes, by dividing by the certain time the amount of data outputted in the certain time, which is the result of accumulating the amount of data outputted in the unit time t between a present time and the certain time prior to the present time t.

82. The video coding device according to any of claims 3 to 4, 7 to 13, 15 to 17, 19 to 21, 60 to 63, or,71 to 78, wherein said transmission controller is operable to calculate the average throughput for the certain time based on the amount of data outputted in a unit time t which is equal to the video frame period of the coded video from said transmission buffer temporarily storing the coded data.

83. The video coding device as in any of claims 3 to 4, 7 to 13, 15 to 17, 19 to 21, 60 to 63, or 71 to 78, wherein said transmission controller is operable to calculate the average throughput for the certain time as each of the certain time passes, by dividing by the certain time the amount of data outputted for the certain time, which is obtained by accumulating the amount of data outputted in the unit time t equal to a video frame period of the coded video for the certain time, as each of the certain time passes.

84. The video coding device as in any of claims 3 to 4, 7 to 13, 15 to 17, 19 to 21, 60 to 63, or 71 to 78, wherein said transmission controller is operable to calculate the average throughput as each of a unit time t equal to the video frame period of the coded video passes, by dividing by the certain time the amount of data outputted for the certain time, which is the result of accumulating the amount of data outputted in the unit time t between the certain time prior to the present time to the present time.

85. The video coding device as in any of claims 3 to 4, 7 to 13, 15 to 17, 19 to 21, 60 to 63, or 71 to 78, wherein said transmission controller is operable to calculate the average throughput for the certain time based on the amount of data outputted in a unit time t equal to a one frame time of the transmitted frames from said transmission buffer temporarily storing the coded data.

86. The video coding device as in any of claims 3 to 4, 7 to 13, 15 to 17, 19 to 21, 60 to 63, or 71 to 78, wherein said transmission controller is operable to calculate the average throughput for the certain time as each of the certain time passes, by dividing by the certain time the amount of data outputted for the certain time, which is the result of accumulating for the certain time the amount of data outputted in a unit time t equal to the one frame time of the transmitted frames.

87. The video coding device as in any of claims 3 to 4, 7 to 13, 15 to 17, 19 to 21, 60 to 63, or 71 to 78, wherein said transmission controller is operable to calculate the average throughput for the certain time as each of a unit time t equal to the one frame time of the transmitted frames passes, by dividing by the certain time the amount of data outputted for the certain time, which is the result of accumulating the amount of data outputted in the unit time t between the certain time prior to the present time and the present time.

88. The video coding device as in any of claims 3 to 4, 7 to 13, 15 to 17, 19 to 21, 60 to 63, or 71 to 78, wherein said transmission controller is operable to calculate the average throughput for the certain time based on the amount of data outputted for a unit time t which is equal to a least common multiple of the video frame period of the coded video and the one frame time of the transmission frames from said transmission buffer temporarily storing the coded data.

89. The video coding device as in any of claims 3 to 4, 7 to 13, 15 to 17, 19 to 21, 60 to 63, or 71 to 78, wherein said transmission controller is operable to calculate the average throughput for the certain time as each of the certain time passes by dividing by the certain time the amount of data outputted for the certain time, which is obtained by accumulating for the certain time the amount of data outputted in a unit time t equal to the least common multiple of the video frame period of the coded video and the one frame time of the transmission frames, as each of the certain time passes.

90. The video coding device as in any of claims 3 to 4, 7 to 13, 15 to 17, 19 to 21, 60 to 63, or 71 to 78, wherein said transmission controller is operable to calculate the average throughput for the certain time as each of a unit time t equal to the least common multiple of the video frame period of the coded video and the one frame time of the transmitted frames passes, by dividing by the certain time the amount of data outputted for the certain time, which is the result of accumulating the amount of data outputted in the unit time t between the certain time before the present time and the present time.

91. The video transmission system according to claim 39, wherein when said video receiving device calculates the average throughput, the time for calculating the average is variable according to variation of the number of bits of correctly received data.

92. The video transmission system according to claim 39, wherein the predetermined certain time for calculating the average throughput is not less than 300 msec.

93. The video coding device as in any of claims 12, 16, 20, 60, 62 ,71 to 72, 75, or 77, wherein a period in which the amount of data outputted in an unit time t is smaller than a predetermined threshold is detected from said transmission buffer temporarily storing the coded data and taken as said averaging time used in calculating the average throughput.

94. The video coding device as in any of claims 12, 16, 20, 60, 62, 71 to 72, 75, or 77, wherein the period in which the amount of data outputted in a unit time t equal to a one frame time of transmission frames is smaller than the predetermined threshold is detected from said transmission buffer temporarily storing the coded data and taken as said averaging time used in calculating the average throughput.

95. The video coding device as in any of claims 12, 16, 20, 60, 62, 71 to 72, 75, or 77, wherein a period in which the amount of data outputted in a unit time t equal to a video frame period of coded video is smaller than the predetermined threshold is detected from said transmission buffer temporarily storing the coded data and taken as said averaging time used in calculating the average throughput.

96. The video coding device as in any of claims 12, 16, 20, 60, 62, 71 to 72, 75, or 77, wherein the period in which the amount of data outputted in a unit time t equal to a least common multiple of the video frame period of the coded video and the one frame time of the transmission frames is smaller than the predetermined threshold is detected from said transmission buffer temporarily storing the coded data and taken as said averaging time used in calculating the average throughput.

97. The video transmission system according to claim 39, wherein When said video receiving device calculates said average throughput, the time for calculating the average is variable according to variation of said number of bits correctly received data.

98. The video transmission system according to claim 39, wherein said predetermined certain time for calculating said average throughput is not less than 300 msec.

99. The video transmission system as in any of claims 36 or 42, wherein the number of bits received without errors for said certain time, which is obtained by, as each of said certain time passes, accumulating for said certain time the number of bits received without errors for a predetermined unit time t, is sent to said video coding device as each of said certain time passes.

100. The video transmission system as in any of claims 39 or 46, wherein, as each of said certain time passes, by dividing by said certain time the number of bits received without errors for said certain time, which is obtained by accumulating for said certain time the number of bits received without errors for the predetermined unit time t, the average throughput for said certain time is sent to said video coding device as each of said certain time passes.

101. The video coding device as in any of claims 36 or 42, wherein the number of bits received without errors for said certain time, which is obtained by, as each of the predetermined unit time t passes, accumulating the number of bits received without errors for said unit time t between said certain time before a present time and the present time, is sent to said video coding device as each of said unit time t passes.

102. The video transmission system as in any of claims 39 or 46, wherein, as each of the predetermined unit time passes, by dividing by said certain time the bit number received without errors for said certain time, which is obtained by accumulating the bit number received without errors for said unit time t between said certain time before the present time and the present time, the average throughput for said certain time is sent to said video coding device as each of said unit time t passes.

103. The video transmission system as in any of claims 36 or 42, wherein said video receiving device has the same function of coding to transmit videos as said video coding device does, and the bit number received without errors for said certain time, which is obtained by,as each of said certain time passes, accumulating for said certain time the bit number received without errors for the unit time t equal to a video frame period of the coded videos, is transmitted to said video coding device as each of said certain time passes.

104. The video transmission system as in any of claims 39 or 46, wherein said video receiving device has the same function of coding to transmit videos as said video coding device does, and
   a as each of said constant period of time passes, by dividing by said constant period of time the bit number received without errors for said constant period of time, which is the result of accumulating the bit number received without errors for the unit time t equal to the video frame period of the coded videos for said constant period of time, an average throughput for said constant period of time is sent to said video coding device as each of said constant period of time passes.

105. The video transmission system as in any of claims 36 or 42, wherein said video receiving device has the same function of coding to transmit videos as said video coding device does, and
   the bit number received without errors for said constant period of time, which is the result of, as each, of the unit time t equal to the video frame period of the coded videos passes, accumulating the bit number received without errors for said unit time t which is between said constant period of time before the present time and the present time, is sent to said video coding device as each of said unit time t passes.

106. The video transmission system as in any of claims 39 or 46, wherein said video receiving device has the same function of coding to transmit videos as said video coding device does, and
   as each of the unit time t equal to the video frame period of the coded videos passes, by dividing by said constant period of time the bit number received without errors for said constant period of time, which is the result of accumulating the bit number received without errors for said unit time t which is between said constant period of time prior to the present time and the present time, the average throughput for said constant period of time is sent to the video coding device as each of said unit time t passes.

107. The video transmission system as in any of claims 36 or 42, wherein the bit number received without errors for said constant period of time, which is the result of, as each of said constant period of time passes, accumulating the bit number received without errors for the unit time t equal to the one frame time of the transmitted frames for said constant period of time is sent to said video coding device as each of said constant period of time passes.

108. The video transmission system as in any of claims 39 or 46, wherein, as each of said constant period of time passes, by dividing by said constant period of time the bit number received without errors for said constant period of time, which is the result of accumulating the bit number received without errors for the unit time t equal to the one frame time of the transmitted frames for said constant period of time, the average throughput for said constant period of time is sent to said video coding device as each of said constant period of time passes.

109. The video transmission system as in any of claims 36 or 38, wherein the bit number received without errors for said constant period of time, which is the result of, as each of the unit time t equal to the one frame time of the transmission frames passes, accumulating the bit number received without errors for said unit time t between said constant period of time before the present time and the present time, is sent to said video coding device as each of said unit time t passes.

110. The video transmission system as in any of claims 39 or 46, wherein, as each of the unit time t equal to the one frame period of the transmitted frames passes, by dividing by said constant period of time the bit number received without errors for said constant period of time, which is obtained by accumulating the bit number received without errors for said unit time t between said constant period of time before the present time and the present time, the average throughput for said constant period of time is sent to said video coding device as each of said unit time t passes.

111. The video transmission system as in any of claims 36 or 42, wherein said video receiving device has the same function of coding to transmit videos as said video coding device does, and
   the bit number received without errors for said constant period of time, which is obtained, as each of said constant period of time passes, by accumulating the bit number received without errors for the unit time t equal to the least common multiple of the video frame time of the coded videos and the one frame time of the transmitted frames for said constant period of time, is sent to said video coding device as each of said constant period of time passes.

112. The video transmission system as in any of claims 39 or 46, wherein said video receiving device has the same function of coding to transmit videos as said video coding device does, and as each of said constant period of time passes, by dividing by said constant period of time the bit number received without errors for said constant period of time, which is the result of accumulating the bit number received without errors for the unit time t equal to the least common multiple of the video frame period of the coded videos and the one frame time of the transmitted frames for said constant period of time, the average throughput for said constant period of time is transmitted to said video coding device as each of said constant period of time passes.

113. The video transmission system as in any of claims 36 or 42, wherein said video receiving device has the same function of coding to transmit the videos as said video coding device does, and the bit number received without errors for said constant period of time, which is the result of, as each of the unit time t equal to the least common multiple of the video frame period of the coded videos and the one frame time of the transmitted frames passes, accumulating the bit number received without errors for said unit time t between said constant period of time before-the present time and the present time, is transmitted to said video coding device as each of said unit time t passes.

114. The video transmission system as in any of claims 39 or 46, wherein said video receiving device has the same function of coding to transmit videos as said video coding device does, and as each of the unit time t equal to the least common multiple of the video frame time of the coded videos and the one frame time of the transmitted frames passes, by dividing by said constant period of time the bit number received without errors for said constant period of time, which is the result of accumulating the bit number received without errors for said unit time t between said constant period of time before the present time and the present time, the average throughput for said constant period of time is sent to said video coding device as each of said unit time t passes.

115. An average throughput calculation method for calculating an average throughput in a data transmission system in which a coding device for coding to transmit data and a receiving device for applying certain processing to received data are connected so that they can communicate, wherein said receiving device transmits the bit number received without errors for said constant period of time T, which is the result of, as each of a predetermined constant period of time T passes, accumulating the bit number received without errors for a predetermined unit time t for said constant period of time T, to said coding device as each of said constant period of time T passes, and said coding device calculates the average throughput for said constant period of time T on the basis of the bit number received from said receiving device.

116. An average throughput calculation method for calculating the average throughput in a data transmission system in which a video coding device for coding to transmit data and a receiving device for applying certain processing to received data are connected so that they can communicate, wherein by dividing by said constant period of time T the bit number received without errors for said constant period of time T as each of a predetermined constant period of time T passes, which is the result of accumulating the bit number received without errors for a predetermined unit time t for said constant period of time T, said receiving device calculates the average throughput for said constant period of time T as said constant period of time T passes.

117. An average throughput calculation method for calculating the average throughput in a data transmission system in which a coding device for coding and transmitting data and a receiving device for applying certain processing to received data are connected so that they can communicate, wherein said video receiving device transmits the bit number received without errors for a predetermined constant period of time T, which is the result of accumulating, as each of the predetermined unit time t passes, the bit number received without errors for said unit time t between said constant period of time T before a present time and the present time, to said coding device as each of said unit time t passes, and said coding device calculates the average throughput for said constant period of time T on the basis of the bit number received from said receiving device.

118. An average throughput calculation method for calculating the average throughput in a data transmission system in which a coding device for coding to transmit data and a receiving device for applying certain processing to received data are connected so that they can communicate, wherein said receiving device divides, as each of a predetermined unit time t passes, by a predetermined constant period of time T the bit number received without errors for said constant period of time T, which is the result of accumulating the bit number received without errors for said unit time t between said constant period of time T before the present time and the present time, to calculate the average throughput for said constant period of time T as each of said unit time t passes.

119. The average throughput calculation method as in claims 115, 116, 117, or 118, wherein said unit time t is taken as a one frame time of the transmitted frames.

120. The average throughput calculation method as in claims 115, 116, 117, or 118, wherein said receiving device, further, has the same function of coding to transmit data as said coding device does, and takes said unit time t as the data frame period of the coded data.

121. The average throughput calculation method as in claims 115, 116, 117, or 118, wherein said receiving device, further, has the same function of coding to transmit data as said coding device does, and taking said unit time t as the least common multiple of the data frame period of the coded data and the one frame time of the transmitted frames.

122. The rodeo transmission system according to claim 39, wherein said video receiving device makes the time for averaging is variable according to whether a burst error occurs or not when the average throughput is calculated.

123. The video transmission system according to claim 46, wherein said video receiving device makes the averaging time is variable according to whether burst errors occur or not when said average throughput is calculated.

124. The image transmission system according to claim 50, wherein said video receiving device makes the time for averaging is variable according to whether burst errors occur or not when said average throughput is calculated.

125. The image transmission system according to claim 54, wherein said video receiving device makes the time for averaging is variable according to whether burst errors occur or not when said average throughput is calculated.

126. The video transmission system as in any of claims 122 or 123, wherein a period in which the bit number received without errors for a predetermined unit time t is smaller than a predetermined threshold is detected and taken as said averaging time for use in calculating the average throughput.

127. The video transmission system according to any of claims 122 or 123, wherein the period in which the bit number received without errors for the unit time t equal to the one frame time of the transmitted frames is smaller than the predetermined threshold is detected and taken as said averaging time used for calculating the average throughput.

128. The video transmission system as in any of claims 122 or 123, wherein said video receiving device has the same function of coding and transmitting videos as said video coding device does, the period in which the bit number received without errors for the unit time t equal to the video frame period of the coded videos is smaller than the predetermined threshold is detected and taken as said averaging time used for calculating the average throughput.

129. The video transmission system as in any of claim 122 or 123, wherein said video receiving device has the same function of coding to transmit videos as said video coding device does, the period in which the bit number received without errors for the unit time t equal to a least common multiplex between the video frame period of the coded videos and the one frame time of the transmission frames is smaller than the predetermined threshold is detected and taken as said averaging time used for calculating the average throughput.

* * * * *